(12) United States Patent
Tanabe et al.

(10) Patent No.: US 12,337,742 B2
(45) Date of Patent: Jun. 24, 2025

(54) HEADREST FOR A PASSENGER SEAT OF A VEHICLE

(71) Applicant: TS TECH CO., LTD., Asaka (JP)

(72) Inventors: Jinichi Tanabe, Tochigi (JP); Takayoshi Ito, Tochigi (JP); Kazumasa Narita, Tochigi (JP); Kazuhiro Oshima, Tochigi (JP); Nobuyuki Tezuka, Tochigi (JP); Yasuo Inose, Tochigi (JP); Atsushi Yamabe, Tochigi (JP); Takashi Takahara, Tochigi (JP); Akihiro Matsumoto, Tochigi (JP); Akihito Kobayashi, Tochigi (JP); Akira Kodama, Tochigi (JP); Takako Miyoshi, Tochigi (JP); Akira Miyoshi, Tochigi (JP); Yoshitomo Sato, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 121 days.

(21) Appl. No.: 18/043,496

(22) PCT Filed: Aug. 26, 2021

(86) PCT No.: PCT/JP2021/031389
§ 371 (c)(1),
(2) Date: Feb. 28, 2023

(87) PCT Pub. No.: WO2022/045258
PCT Pub. Date: Mar. 3, 2022

(65) Prior Publication Data
US 2023/0311732 A1   Oct. 5, 2023

Related U.S. Application Data

(60) Provisional application No. 63/121,539, filed on Dec. 4, 2020, provisional application No. 63/072,518, filed on Aug. 31, 2020.

(51) Int. Cl.
*B60N 2/879* (2018.01)

(52) U.S. Cl.
CPC ................................. *B60N 2/879* (2018.02)

(58) Field of Classification Search
CPC ...... B60N 2/879; B60N 2002/899; A47C 7/36
(Continued)

(56) References Cited

U.S. PATENT DOCUMENTS

| 480,822 | A | * | 8/1892 | Mayes | ................ | B60N 2/286 |
| | | | | | | 297/410 |
| 3,512,605 | A | * | 5/1970 | McCorkle | ............. | B60N 2/812 |
| | | | | | | 381/301 |

(Continued)

FOREIGN PATENT DOCUMENTS

| CN | 110545508 A | 12/2019 |
| FR | 3015934 A1 | 7/2015 |

(Continued)

OTHER PUBLICATIONS

International Search Report (with English translation) for PCT/JP2021/031389, mailed on Nov. 16, 2021, 3 pages.

(Continued)

Primary Examiner — Milton Nelson, Jr.
(74) Attorney, Agent, or Firm — Dority & Manning, P.A.

(57) ABSTRACT

Provided is a headrest in which devices can be placed and which is easy to manufacture. A headrest comprises a pillar supported by a seat back on which the headrest is provided; a core supported by the pillar and having one or more receiving recesses recessed inward from an outer surface of the core; one or more devices, each device received in a corresponding receiving recess; and a skin material covering the core and the devices.

19 Claims, 38 Drawing Sheets

(58) Field of Classification Search
USPC .............................................. 297/217.4, 410
See application file for complete search history.

(56) References Cited

U.S. PATENT DOCUMENTS

| | | | | |
|---|---|---|---|---|
| 4,027,112 | A * | 5/1977 | Heppner | A47C 7/727 |
| | | | | 381/301 |
| 4,042,791 | A * | 8/1977 | Wiseman | H04R 5/023 |
| | | | | 5/904 |
| 4,191,423 | A * | 3/1980 | Goldner | B60N 2/838 |
| | | | | 297/410 |
| 4,490,842 | A * | 12/1984 | Watanabe | B60N 2/803 |
| | | | | 381/86 |
| 5,257,853 | A * | 11/1993 | Elton | B60N 2/868 |
| | | | | 297/DIG. 2 |
| 6,094,496 | A * | 7/2000 | Stowers, Sr. | H04R 5/023 |
| | | | | 381/361 |
| 6,412,872 | B2 * | 7/2002 | Takeda | B60N 2/847 |
| | | | | 297/391 |
| 9,088,842 | B2 * | 7/2015 | Silverstein | H04R 1/02 |
| 9,975,459 | B2 * | 5/2018 | Takada | H04R 5/023 |
| 2016/0039320 | A1 | 2/2016 | Subat et al. | |
| 2017/0106775 | A1 | 4/2017 | Takada et al. | |
| 2019/0184881 | A1 | 6/2019 | Kakishima et al. | |
| 2020/0238872 | A1 | 6/2020 | Switalski | |

FOREIGN PATENT DOCUMENTS

| | | | | |
|---|---|---|---|---|
| JP | S 61-52957 U | | 4/1986 | |
| JP | S 61-082712 A | | 4/1986 | |
| JP | H02119840 U | * | 9/1990 | |
| JP | 2008-193502 A | | 8/2008 | |
| JP | 2008188099 A | * | 8/2008 | |
| WO | WO-9415815 A1 | * | 7/1994 | .......... B60N 2/4876 |
| WO | WO-2019038915 A1 | * | 2/2019 | |

OTHER PUBLICATIONS

Chinese Office Action (w/English translation) for corresponding Application No. 202180053173.8, dated Jan. 25, 2025, 15 pages.

* cited by examiner

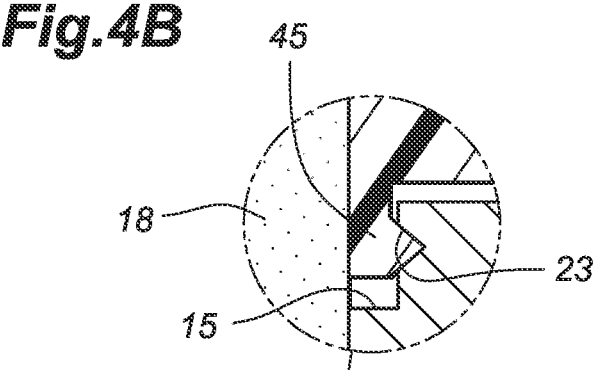
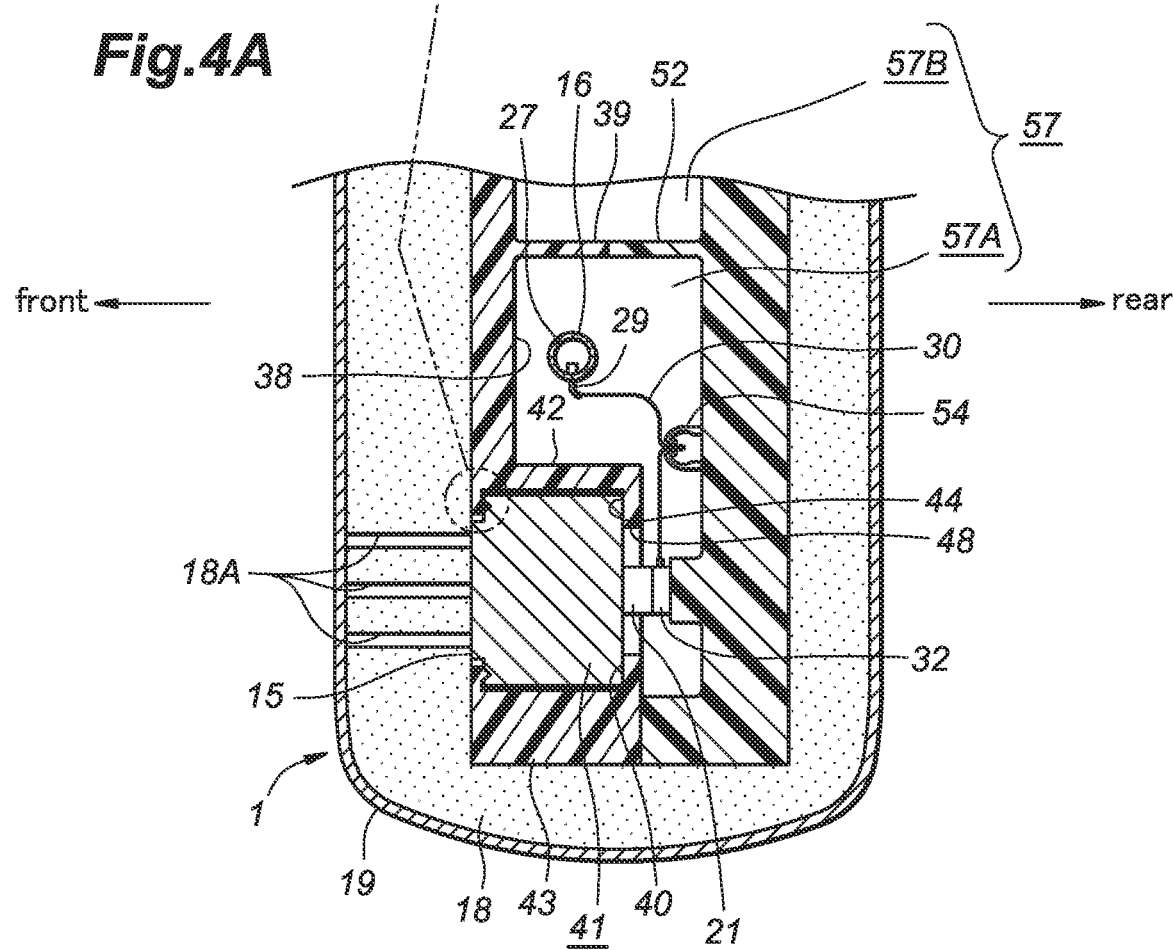

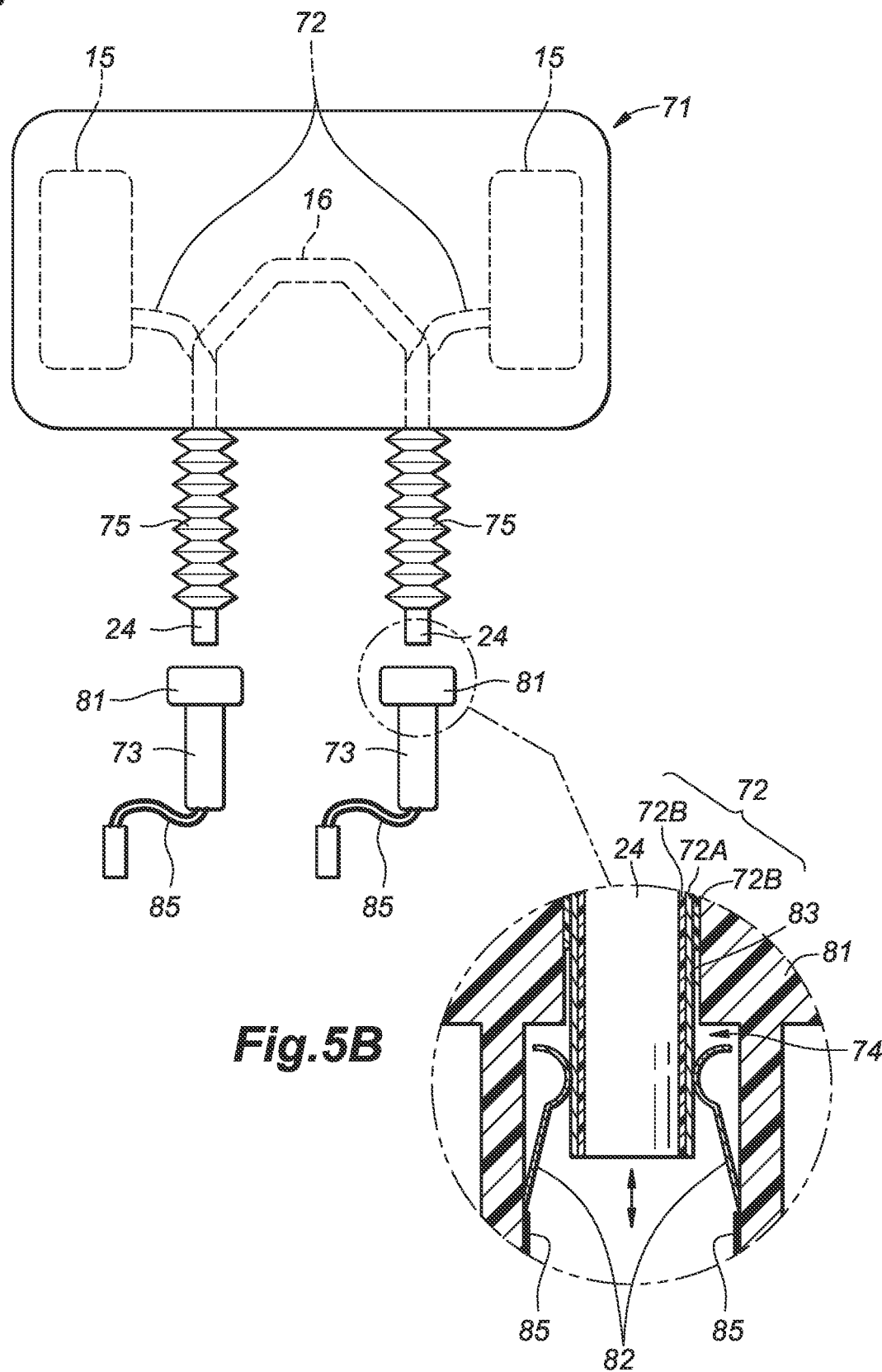

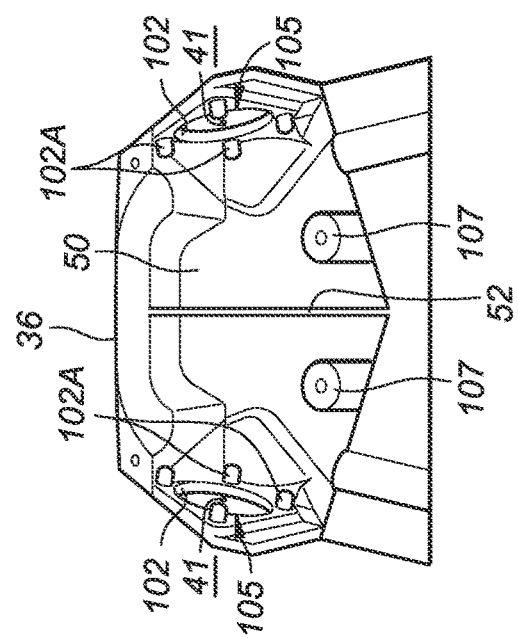
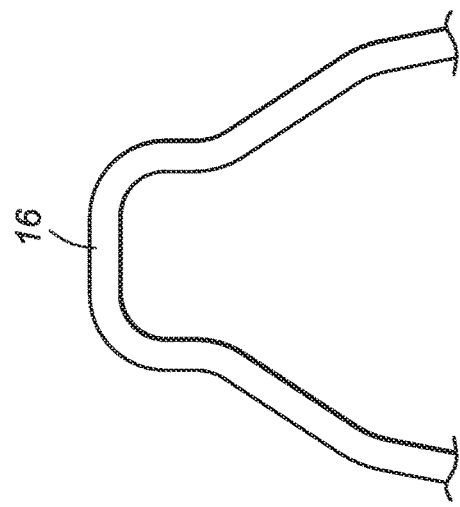
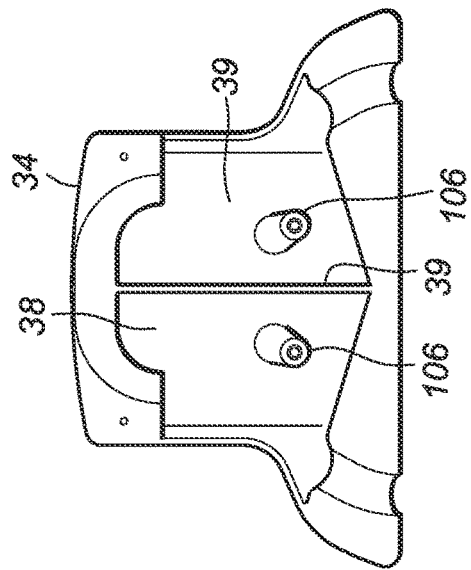
Fig. 6C
Fig. 6B
Fig. 6A

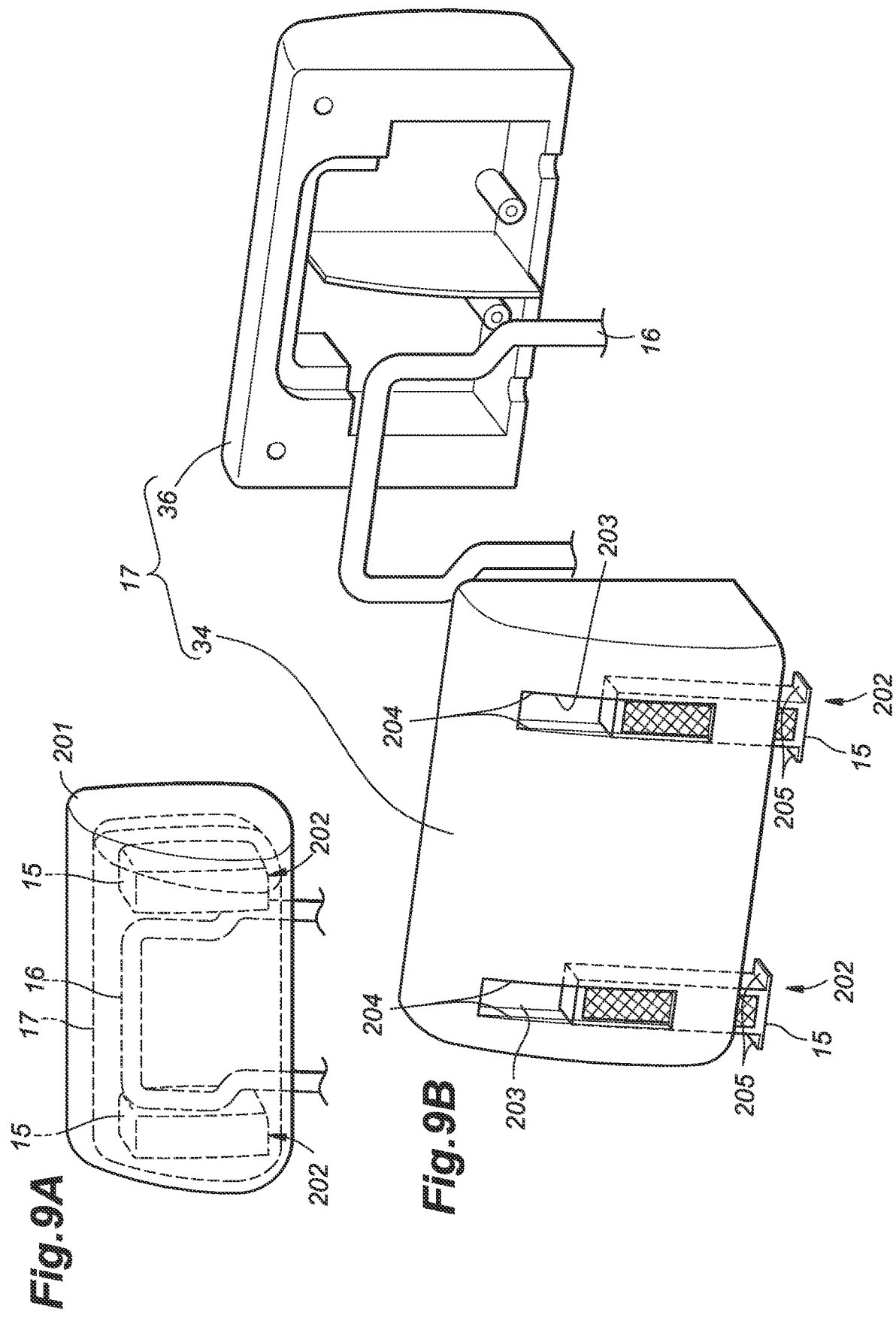

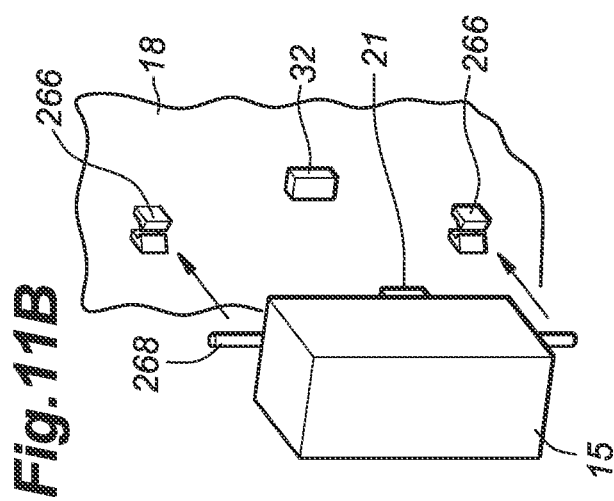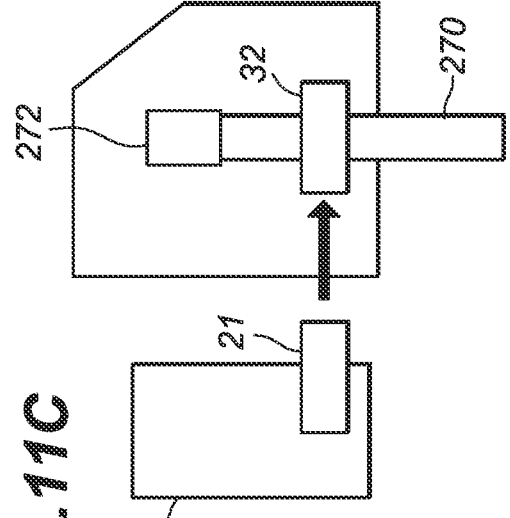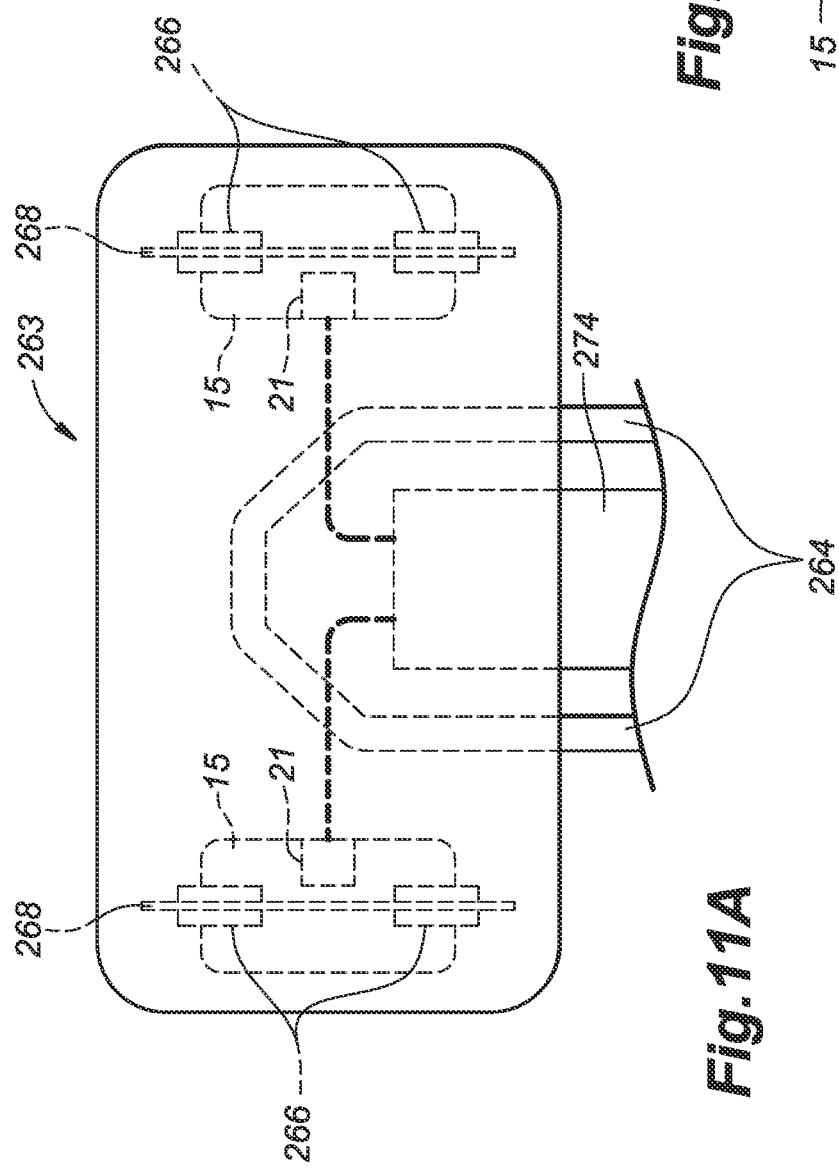

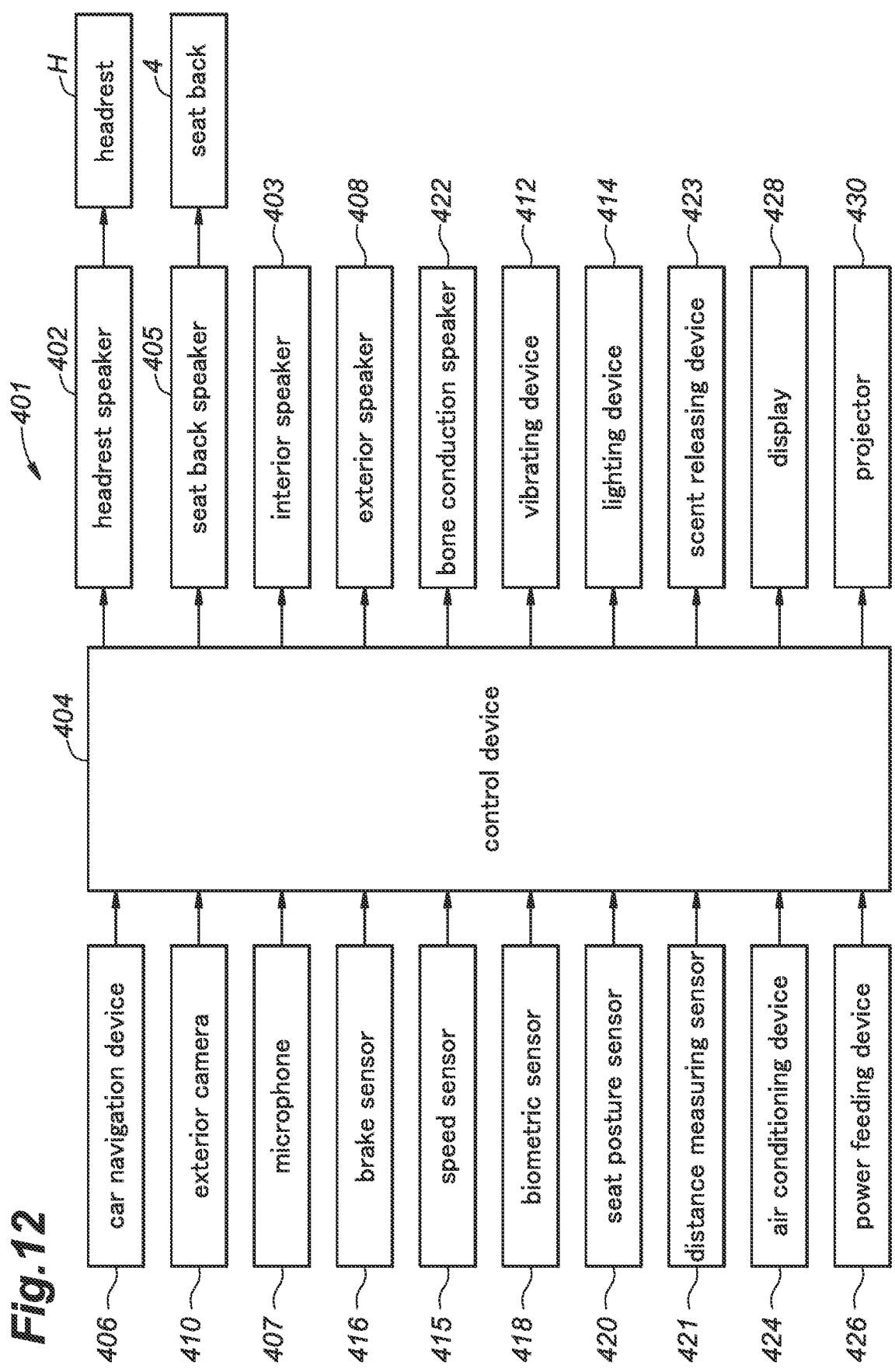

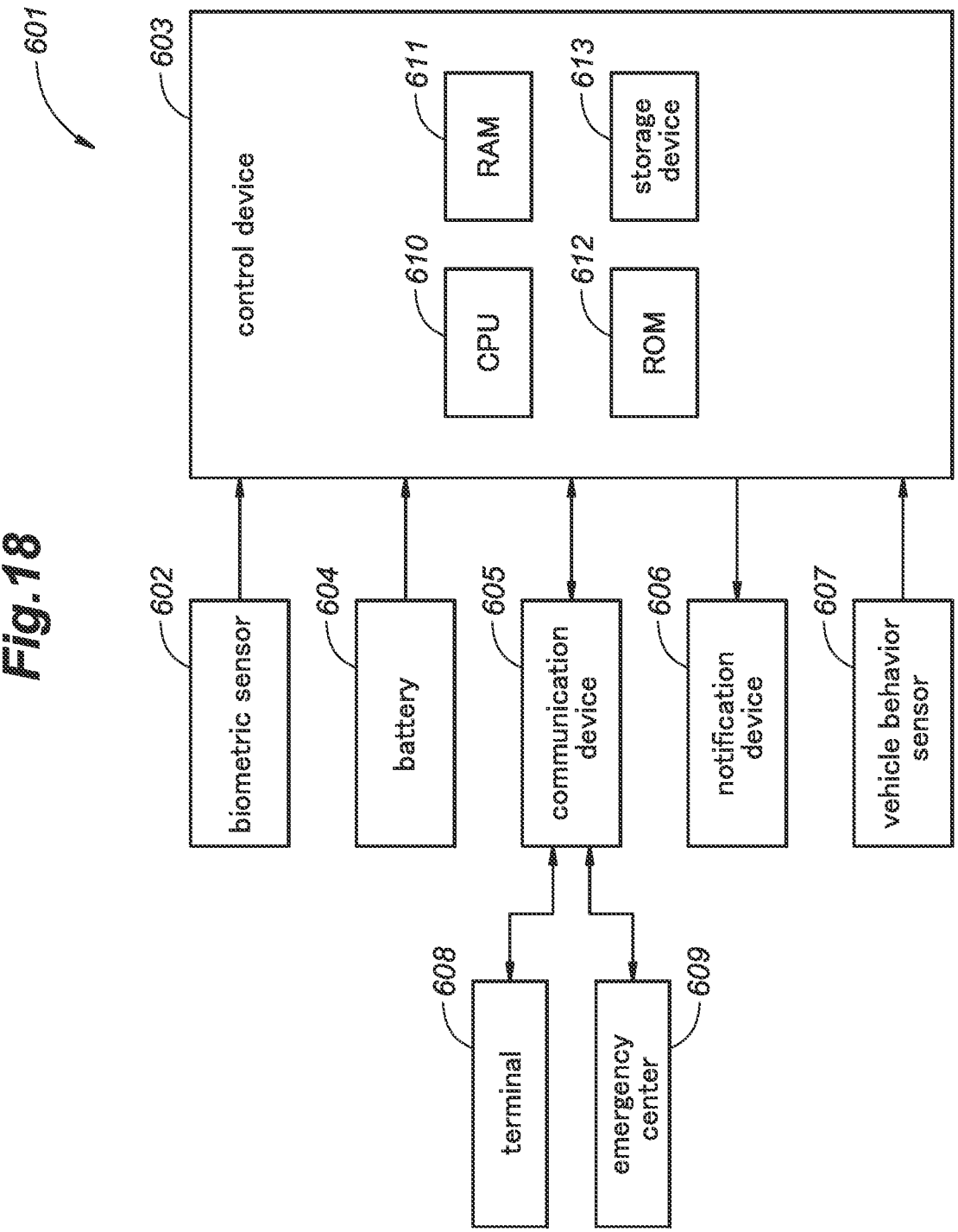

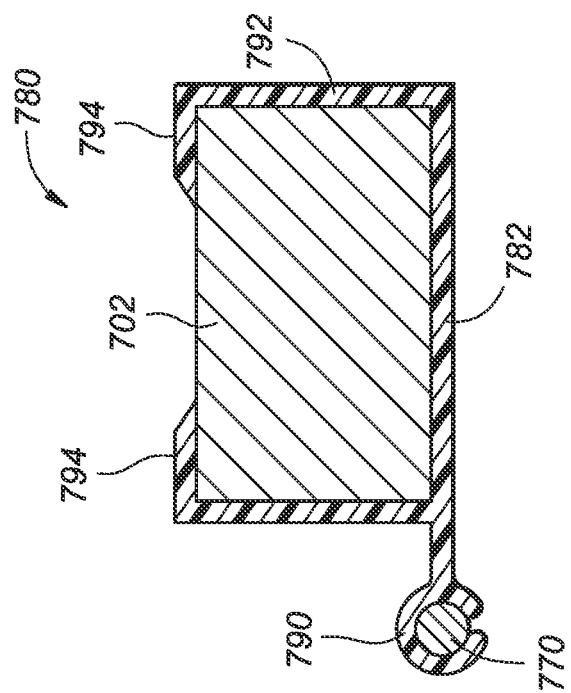
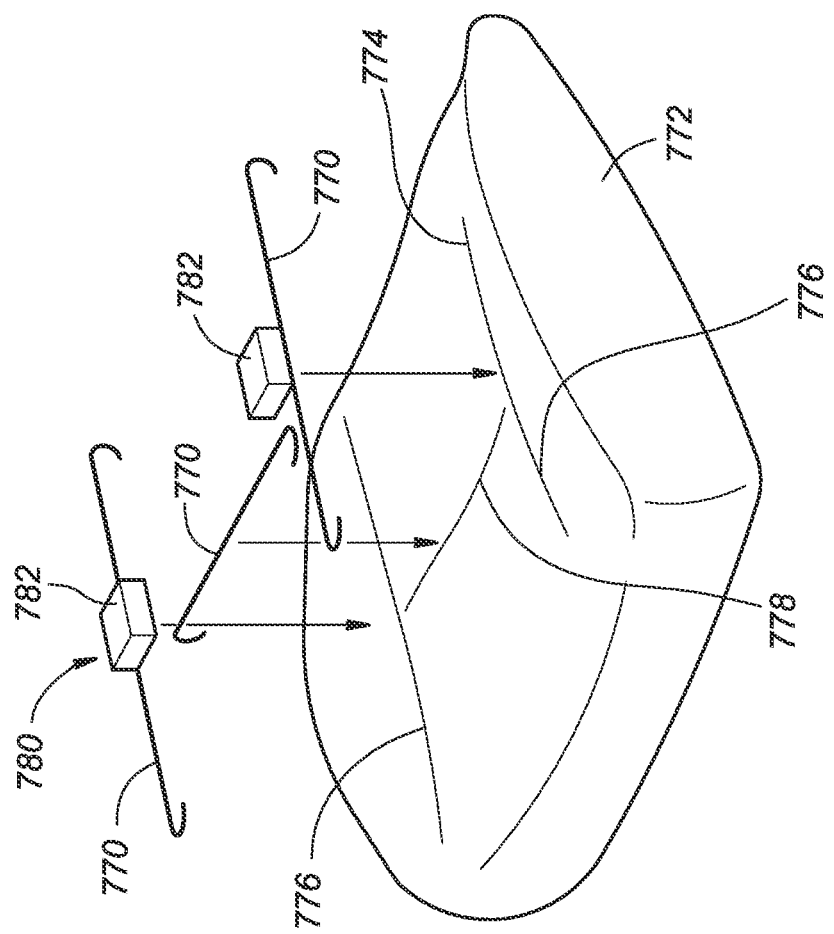
Fig. 24B
Fig. 24A

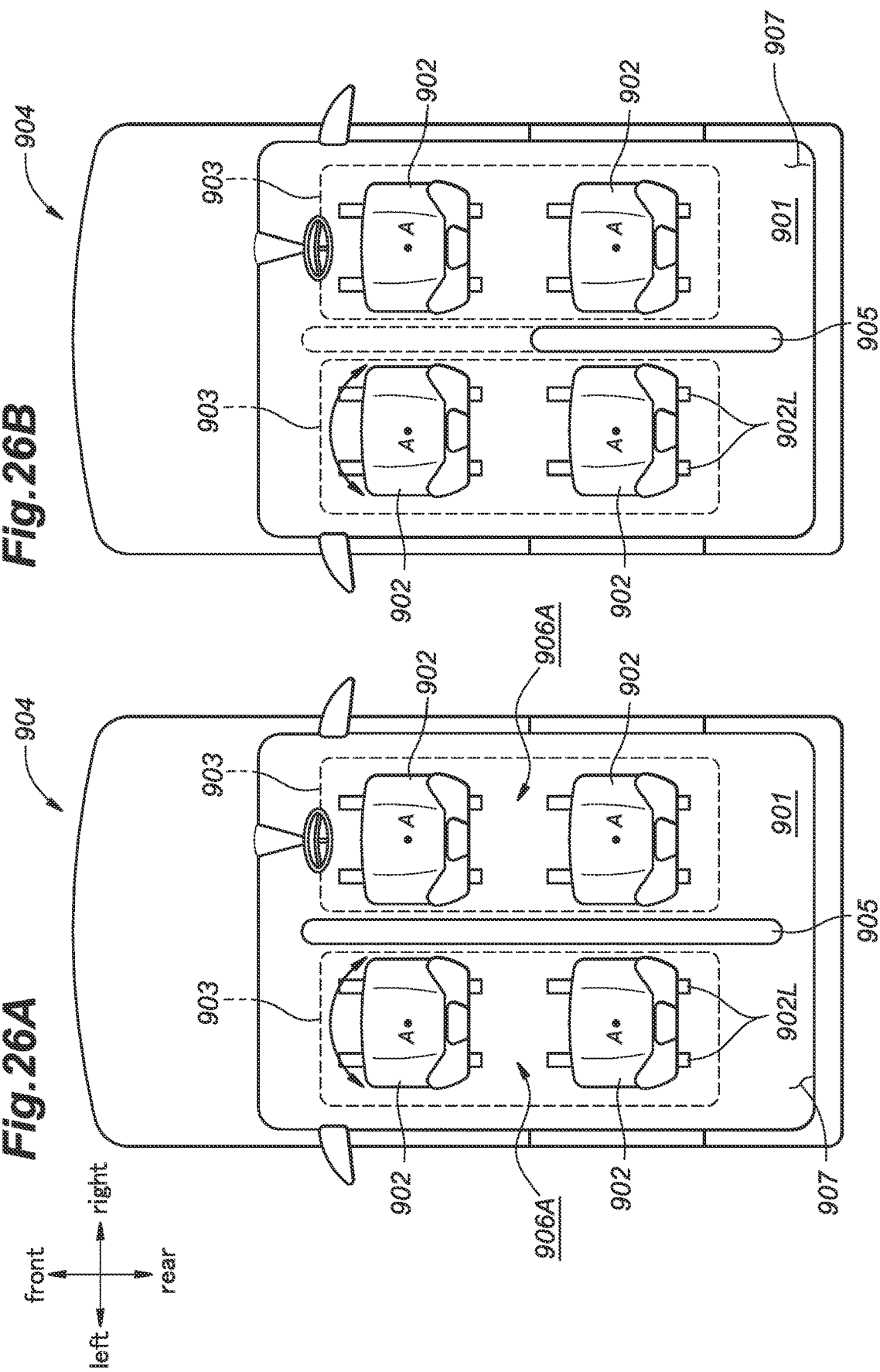

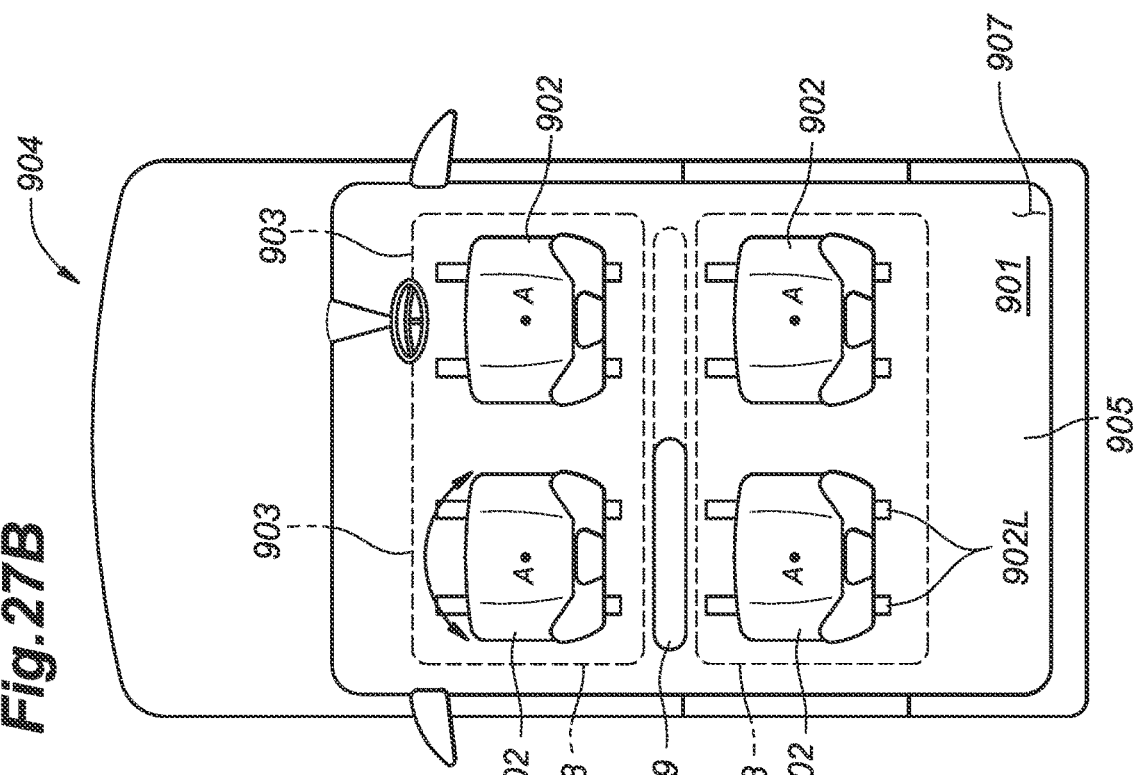
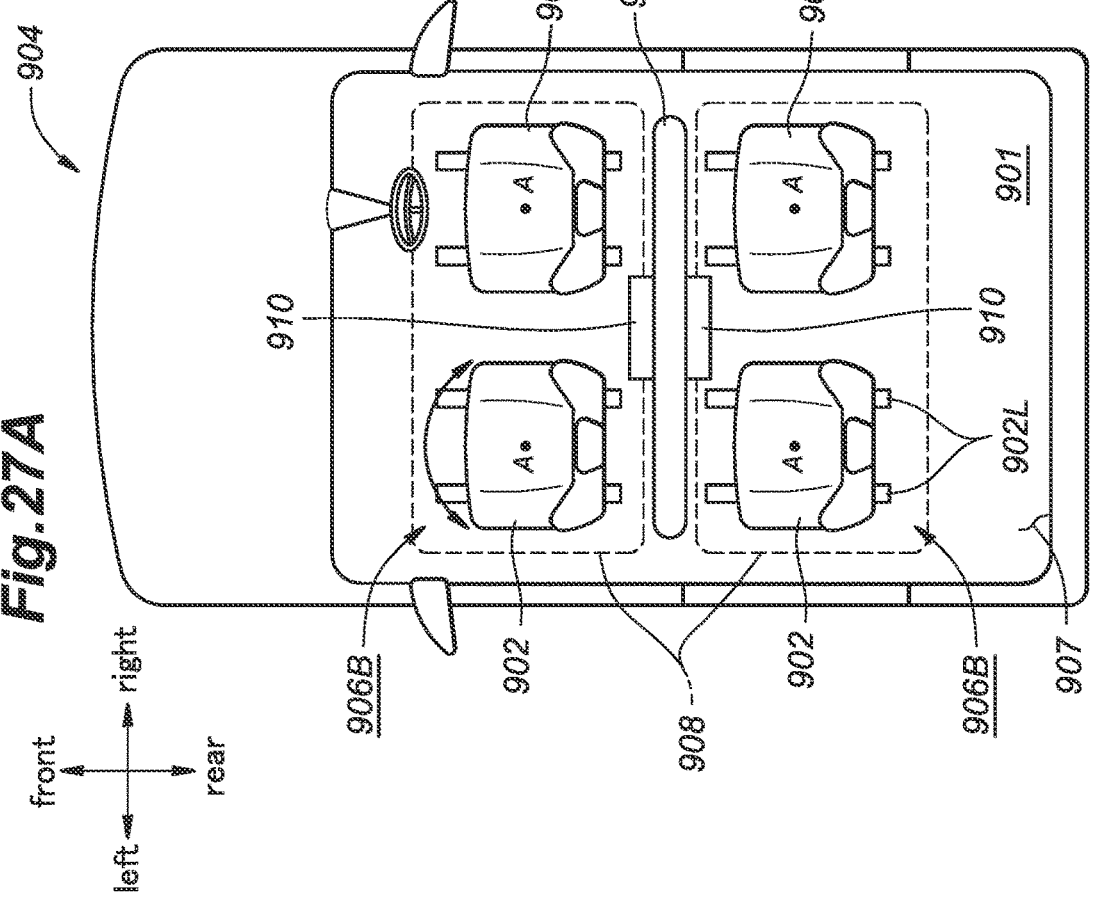

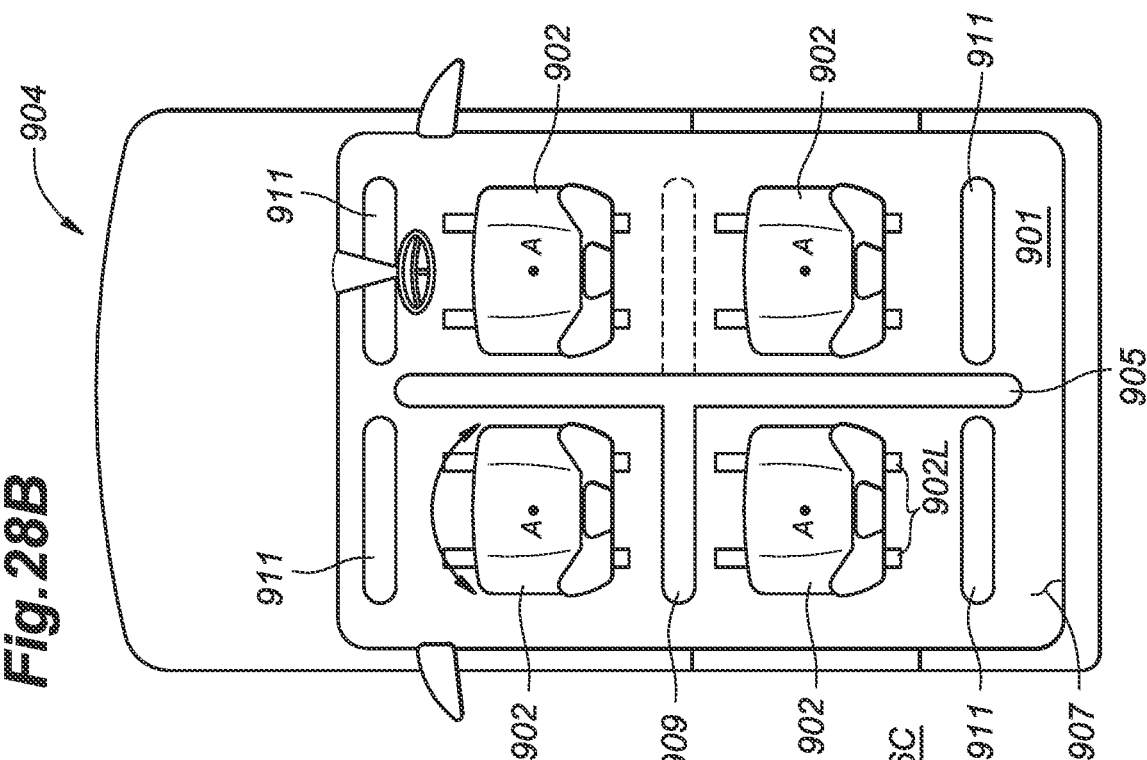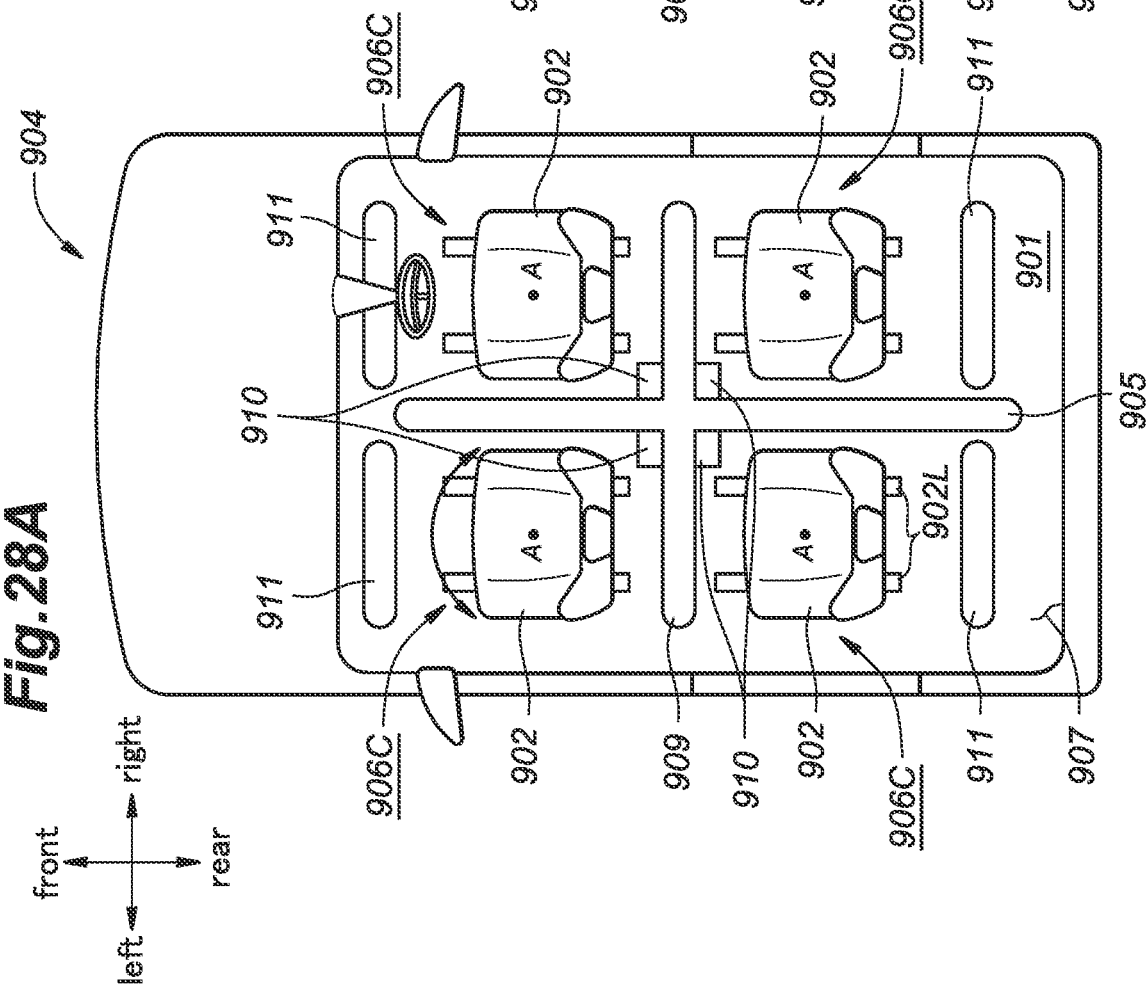

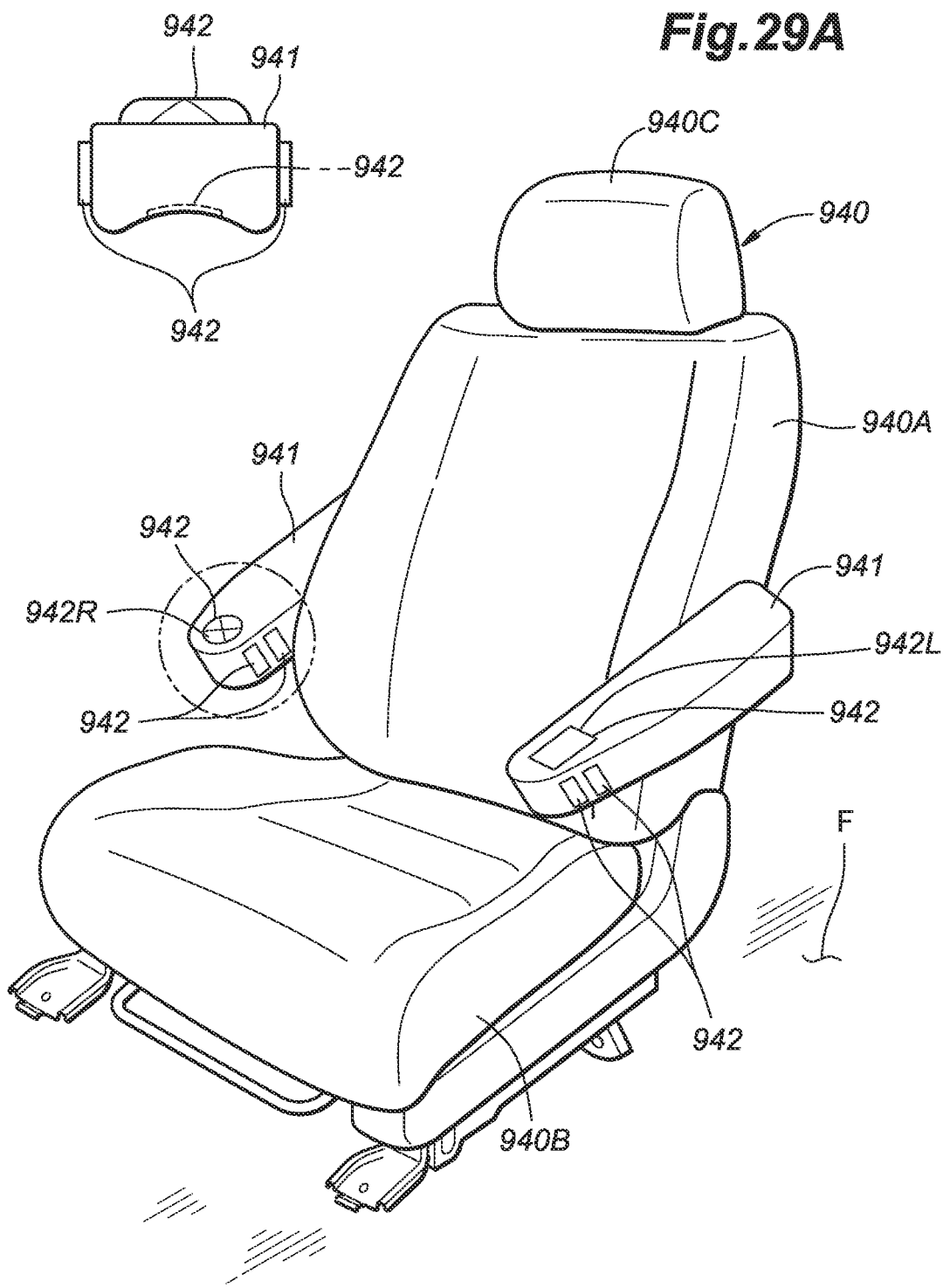

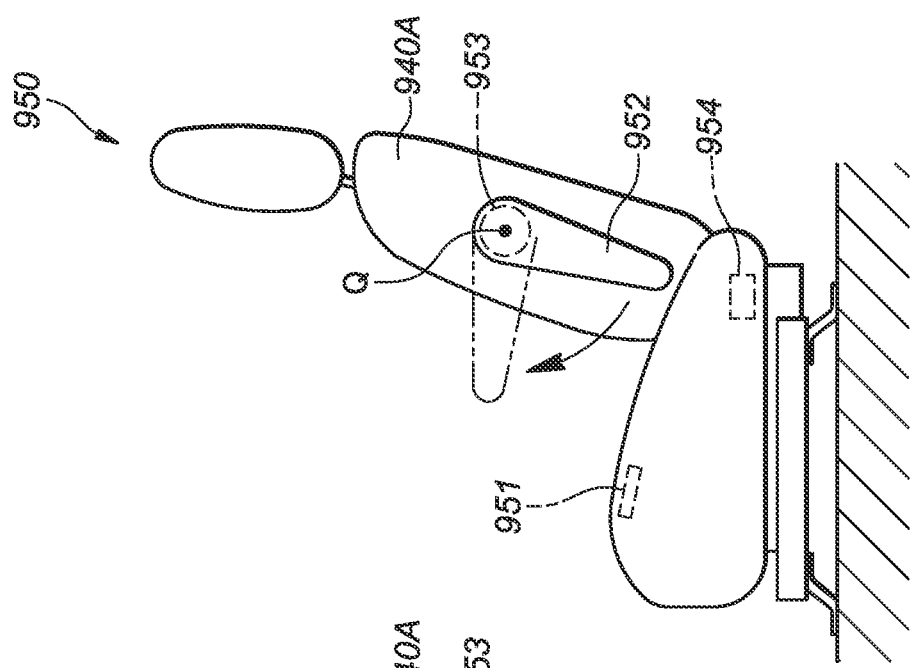
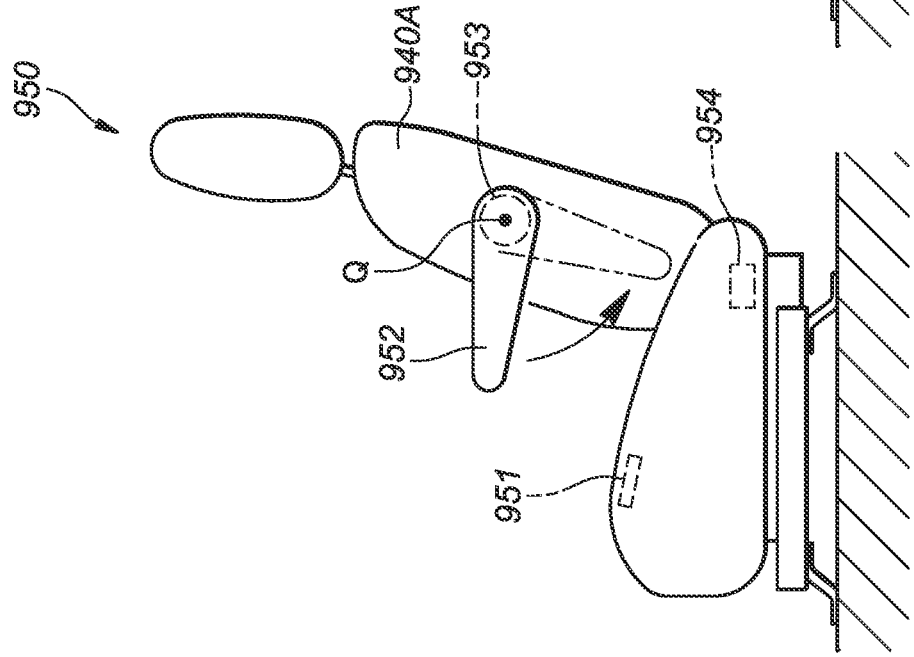

HEADREST FOR A PASSENGER SEAT OF A VEHICLE

CROSS REFERENCE TO RELATED APPLICATIONS

This application is the U.S. National Stage entry of International Application No. PCT/JP2021/031389, filed on Aug. 26, 2021, which, in turn, claims priority to U.S. Provisional Patent Application No. 63/072,518, filed on Aug. 31, 2020, and U.S. Provisional Patent Application No. 63/121,539, filed on Dec. 4, 2020, all of which are hereby incorporated herein by reference in their entireties for all purposes.

TECHNICAL FIELD

The present invention relates to a headrest.

BACKGROUND ART

Known headrests include a headrest equipped with a device (such as a speaker) therein, and formed by "skin integral foam molding"; that is, the headrest form is foam-molded integrally with a skin (See Patent Document 1, for example). In this configuration, a device is mounted on a device unit and the device unit is secured to part of a headrest frame. A skin material is prepared and sewed into a pouch shape. The device along with the frame is inserted into the pouch-shaped skin material. Then, a foaming material such as a urethane material is injected and foamed within the skin material to form a headrest.

PRIOR ART DOCUMENT(S)

Patent Document(s)

Patent Document 1: JP2019-108118A

SUMMARY OF THE INVENTION

Task to be Accomplished by the Invention

The manufacturing process for a headrest disclosed in Patent Document 1 involves the steps of inserting a device into a pouch-shaped skin material and then causing an injected foaming material to foam within the skin material, thereby forming a headrest. Thus, manufacturing a headrest becomes complicated and not easy.

The present invention has been made in view of the above problem of the prior art, and a primary object of the present invention is to provide a headrest in which devices can be placed and which is easy to manufacture.

Means to Accomplish the Task

In order to achieve the above object, an aspect of the present invention provides a headrest (1, 71, 101, 151, 201) comprising: a pillar (16) supported by a seat back on which the headrest is provided; a core (17) supported by the pillar and having one or more receiving recesses (40, 102, 202) which are recessed inward from an outer surface thereof; one or more devices (15) configured to be received in the respective receiving recesses; and a skin material (19) covering the core and the devices.

According to this configuration, a headrest can be manufactured simply by inserting devices in the receiving recesses and then covering the assembly with a skin material. Thus, a headrest in which devices can be placed becomes easy to manufacture.

The above headrest may be further configured such that the receiving recesses are provided in left and right side regions of a front surface of the core and extend rearward into the core, respectively; and wherein a front surface of each device is flush with the front surface of the core when the device is accommodated in a corresponding recess.

In this configuration, the front surface of the headrest can be made smoother, which improves the comfort of the headrest.

The above headrest may be further configured such that the receiving recesses are provided in left and right side regions of a front surface of the core and extend rearward into the core, respectively; and wherein each device extends rearward into the core to partially overlap the pillar when viewed from a side of the core.

In this configuration, even when a lateral load is applied to the headrest, a device can be supported by the pillar.

The above headrest may be further configured such that a locking part (45) is provided at an edge of an opening of each receiving recess, wherein the locking part can lock a device accommodated in the receiving recess in place; and wherein each device is provided with a locked part at an edge of the front surface thereof such that the locked part is engageable with the locking part at the edge of the opening of a receiving recess in which the device is accommodated.

This configuration enables a device to be properly locked to the core.

The above headrest may be further configured so that each device is provided with ribs (22) protruding in opposing directions therefrom such that the ribs are in contact with inner wall surfaces of a receiving recess when the device is accommodated therein.

In this configuration, a mounted device is guided to a proper position.

The above headrest may be further configured such that each device is provided with a device-side connector (21) at a rear end surface; and wherein a bottom wall of each receiving recess is provided with a body-side connector (32) configured to be connectable to the device-side connector when the device is accommodated in the receiving recess.

This configuration allows for signal transmission and power supply to a device received in a receiving recess.

The above headrest may be further configured such that each device is provided with guide ribs (22) protruding outward in a left-right direction from left and right sides of the device, respectively, and wherein left and right side walls of each receiving recess define respective guide grooves (47) extending a front-rear direction, wherein, when the device is accommodated in the receiving recess, each guide rib is in contact with a groove bottom surface of a corresponding guide groove at a top end of the guide rib, and further wherein each device is provided with a device-side connector (21) at a rear end surface, wherein a bottom wall of each receiving recess is provided with a body-side connector (32) configured to be connectable to the device-side connector when the device is accommodated in the receiving recess, and wherein either the device-side connector or the body-side connector is supported in a floatable manner so as to be displaceable in the left-right direction.

According to this configuration, when a device is inserted into a receiving recess, the device can be slidingly moved backward with the guide ribs being accommodated within the guide grooves, which enables the device to be guided to a proper position in a vertical direction. Furthermore, in this configuration, the device-side connector or the body-side connector is supported in a floatable manner so as to be displaceable in the left-right direction. This feature makes it easier to connect the device-side connector to the body-side connector even when the device is misaligned in the left or right direction from the proper lateral position.

The above headrest may be further configured such that each device is connected to a cable (72), the cable having a conductor (72A) adapted to be electrically-connected to the device, and an insulator (72B) covering the conductor; and wherein the cable is coupled to an outer lower edge of the pillar such that the conductor is exposed.

This configuration ensures that, with the use of an electrically-conductive elastic piece is provided so as to elastically contact the conductor at a lower end portion on an outer surface of the pillar, the cable is electrically connected to a device via the elastic piece even when the headrest is moved up and down with respect to the seat back.

The above headrest may be further configured such that the core defines a cavity (57) therein, and wherein an inner side wall of each receiving recess, the inner side wall being a side wall on the inner side in the left-right direction, defines a through hole (48) leading to the interior of the cavity.

According to this configuration, the headrest is provided with a cavity which improves produced sounds from the devices.

The above headrest may be further configured such that the respective receiving recesses (102) are provided on left and right outer sides of the core, respectively, and wherein each receiving recess has a corresponding lid (104) capable of covering an opening of the receiving recess, the lid being hingedly connected to the core at a location rearward of the corresponding receiving recess.

In this configuration, output (such as vibration) from a device can be properly directed by adjusting the position of a lid.

The above headrest may be further configured such that the respective receiving recesses (102) are provided on left and right outer sides of the core, respectively, and wherein the left and right sides of the core are provided with respective ear parts (154) protruding outward in the left and right directions, respectively, such that each ear part is rotatable around an axis extending in the left-right direction.

In this configuration, output from a device can be properly directed by adjusting the position of an ear part.

The above headrest may be further configured such that the pillar has a pair of leg portions (24) at the lower end thereof, the leg portions consisting of left and right leg portions and extending toward the seat back, and wherein the receiving recesses (202), which consist of left and right receiving recesses, are provided in left and right side regions of a lower surface of the core and extend upward into the core, respectively.

Generally, when a device is removed from a receiving recess, the device is easily movable along the direction of insertion and removal of the device. However, in this configuration, since a device is assembled into the core by moving the device upward, the device is prevented from moving toward a seated person during removal of the device from the receiving recess.

The above headrest may be further configured such that a pair of front through holes (203), which consist of left and right front through holes, are provided in left and right side regions of a front surface of the core and extend rearward into the core, thereby leading to the respective receiving recesses, and wherein each through hole is provided with a restriction wall (204) protruding inward from an inner surface of the through hole, the restriction wall being configured to restrict forward movement of a device received in a corresponding receiving recess.

In this configuration, output (such as vibration) from a device can be directed frontward through a through hole, and the device is prevented from moving toward a seated person during removal of the device from the receiving recess.

Effect of the Invention

In order to achieve the above object, an aspect of the present invention provides a headrest comprising: a pillar supported by a seat back on which the headrest is provided; a core supported by the pillar and having one or more receiving recesses which are recessed inward from an outer surface thereof; one or more devices configured to be received in the respective receiving recesses; and a skin material covering the core and the devices. According to this configuration, a headrest can be manufactured simply by inserting devices in receiving recesses and then covering the assembly with a skin material. Thus, a headrest in which devices can be placed becomes easy to manufacture.

The above headrest may be further configured such that the receiving recesses are provided in left and right side regions of a front surface of the core and extend rearward into the core, respectively; and wherein a front surface of each device is flush with the front surface of the core when the device is accommodated in a corresponding recess. In this configuration, the front surface of the headrest can be made smoother, which improves the comfort of the headrest.

The above headrest may be further configured such that the receiving recesses are provided in left and right side regions of a front surface of the core and extend rearward into the core, respectively; and wherein each device extends rearward into the core to partially overlap the pillar when viewed from a side of the core. In this configuration, even when a lateral load is applied to the headrest, a device can be supported by the pillar.

The above headrest may be further configured such that a locking part (45) is provided at an edge of an opening of each receiving recess, wherein the locking part can lock a device accommodated in the receiving recess in place; and wherein each device is provided with a locked part at an edge of the front surface thereof such that the locked part is engageable with the locking part at the edge of the opening of a receiving recess in which the device is accommodated. This configuration enables a device to be properly locked to the core.

The above headrest may be further configured so that each device is provided with ribs (22) protruding in opposing directions therefrom such that the ribs are in contact with inner wall surfaces of a receiving recess when the device is accommodated therein. In this configuration, a mounted device is guided to a proper position.

The above headrest may be further configured such that each device is provided with a device-side connector at a rear end surface; and wherein a bottom wall of each receiving recess is provided with a body-side connector configured to be connectable to the device-side connector when the device is accommodated in the receiving recess. This configuration allows for signal transmission and power supply to a device received in a receiving recess.

The above headrest may be further configured such that each device is provided with guide ribs protruding outward in a left-right direction from left and right sides of the device, respectively, and wherein left and right side walls of each receiving recess define respective guide grooves extending a front-rear direction, wherein, when the device is accommodated in the receiving recess, each guide rib is in contact with a groove bottom surface of a corresponding guide groove at a top end of the guide rib, and further wherein each device is provided with a device-side connector at a rear end surface, wherein a bottom wall of each receiving recess is provided with a body-side connector configured to be connectable to the device-side connector when the device is accommodated in the receiving recess, and wherein either the device-side connector or the body-side connector is supported in a floatable manner so as to be displaceable in the left-right direction. According to this configuration, when a device is inserted into a receiving recess, the device can be slidingly moved backward with the guide ribs being accommodated within the guide grooves, which enables the device to be guided to a proper position in a vertical direction. Furthermore, in this configuration, the device-side connector or the body-side connector is supported in a floatable manner so as to be displaceable in the left-right direction. This feature makes it easier to connect the device-side connector to the body-side connector even when the device is misaligned in the left or right direction from the proper lateral position.

The above headrest may be further configured such that each device is connected to a cable, the cable having a conductor adapted to be electrically-connected to the device, and an insulator covering the conductor; and wherein the cable is coupled to an outer lower edge of the pillar such that the conductor is exposed. This configuration ensures that, with the use of an electrically-conductive elastic piece is provided so as to elastically contact the conductor at a lower end portion on an outer surface of the pillar, the cable is electrically connected to a device via the elastic piece even when the headrest is moved up and down with respect to the seat back.

The above headrest may be further configured such that the core defines a cavity therein, and wherein an inner side wall of each receiving recess, the inner side wall being a side wall on the inner side in the left-right direction, defines a through hole leading to the interior of the cavity. According to this configuration, the headrest is provided with a cavity which improves produced sounds from the devices.

The above headrest may be further configured such that the respective receiving recesses are provided on left and right outer sides of the core, respectively, and wherein each receiving recess has a corresponding lid capable of covering an opening of the receiving recess, the lid being hingedly connected to the core at a location rearward of the corresponding receiving recess. In this configuration, output (such as vibration) from a device can be properly directed by adjusting the position of a lid.

The above headrest may be further configured such that the respective receiving recesses are provided on left and right outer sides of the core, respectively, and wherein the left and right sides of the core are provided with respective ear parts protruding outward in the left and right directions, respectively, such that each ear part is rotatable around an axis extending in the left-right direction. In this configuration, output from a device can be properly directed by adjusting the position of an ear part.

The above headrest may be further configured such that the pillar has a pair of leg portions at the lower end thereof, the leg portions consisting of left and right leg portions and extending toward the seat back, and wherein the receiving recesses, which consist of left and right receiving recesses, are provided in left and right side regions of a lower surface of the core and extend upward into the core, respectively. Generally, when a device is removed from a receiving recess, the device is easily movable along the direction of insertion and removal of the device. However, in this configuration, since a device is assembled into the core by moving the device upward, the device is prevented from moving toward a seated person during removal of the device from the receiving recess.

The above headrest may be further configured such that a pair of front through holes (203), which consist of left and right front through holes, are provided in left and right side regions of a front surface of the core and extend rearward into the core, thereby leading to the respective receiving recesses, and wherein each through hole is provided with a restriction wall (204) protruding inward from an inner surface of the through hole, the restriction wall being configured to restrict forward movement of a device received in a corresponding receiving recess. In this configuration, output (such as vibration) from a device can be directed frontward through a through hole, and the device is prevented from moving toward a seated person during removal of the device from the receiving recess.

BRIEF DESCRIPTION OF THE DRAWINGS

FIG. 4 is a cross-sectional view taken along IV-IV in FIG. 2;

FIG. 5A is a front view of a headrest according to a second embodiment of the present invention, and FIG. 5B is a vertical cross-sectional view of a portion surrounded by the two-dot chain line in FIG. 5A when a pillar is inserted;

FIGS. 6A to 6C show the headrest according to the second embodiment, and FIG. 6A is a rear view of a core front portion, FIG. 6B is a front view of a pillar, and FIG. 6C is a front view of a core rear portion;

FIG. 8A is a side view of the headrest, and FIGS. 8B to 8D show a curved surface of an ear part of the headrest that faces frontward, downward, and rearward, respectively;

FIG. 9 is an exploded perspective view of a headrest according to a fifth embodiment of the present invention;

FIG. 11A is a front view showing a headrest of an embodiment of the present invention having a different device securing structure from the above embodiments, and FIGS. 11B and 11C are a perspective view and a side view showing the device securing structure of the headrest of FIG. 11A;

FIG. 12 is a functional block diagram of an audio system;

FIG. 18 is a functional block diagram of a biometric sensor system;

FIG. 24A is an explanatory diagram for illustrating an example of a method of securing a vibrating device, and FIG. 24B is a cross-sectional view of a mounting part for a vibrator;

FIG. 26A is a diagram showing a first example of a vehicle, and FIG. 26B is an explanatory diagram for illustrating front and rear partition walls in a retracted state in the vehicle of the first example;

FIG. 27A is a diagram showing a second example of a vehicle, and FIG. 27B is an explanatory diagram for illustrating left and right partition walls in a retracted state in the vehicle of the second example;

FIG. 28A is a diagram showing a third example of a vehicle, and FIG. 28B is an explanatory diagram for illustrating left and right partition walls in a retracted state in the vehicle of the third example;

FIG. 29A is a perspective view of a vehicle seat having armrests each equipped with control switches, and FIG. 29B is a front view of an armrest;

FIGS. 32A and 32B are side views of a passenger seat provided with an armrest rotatably coupled to a seat back, FIGS. 32A and 32B showing the armrest in a use position and a retracted position, respectively.

DESCRIPTION OF THE PREFERRED EMBODIMENT(S)

<Headrest>

Embodiments of a headrest according to the present invention, which is attached to a passenger seat of a vehicle, will be described with reference to the appended drawings. In the following description, the front/rear, left/right, and up/down directions are defined relative to a vehicle in which a vehicle seat equipped with a headrest is installed.

First Embodiment

Figure 1:
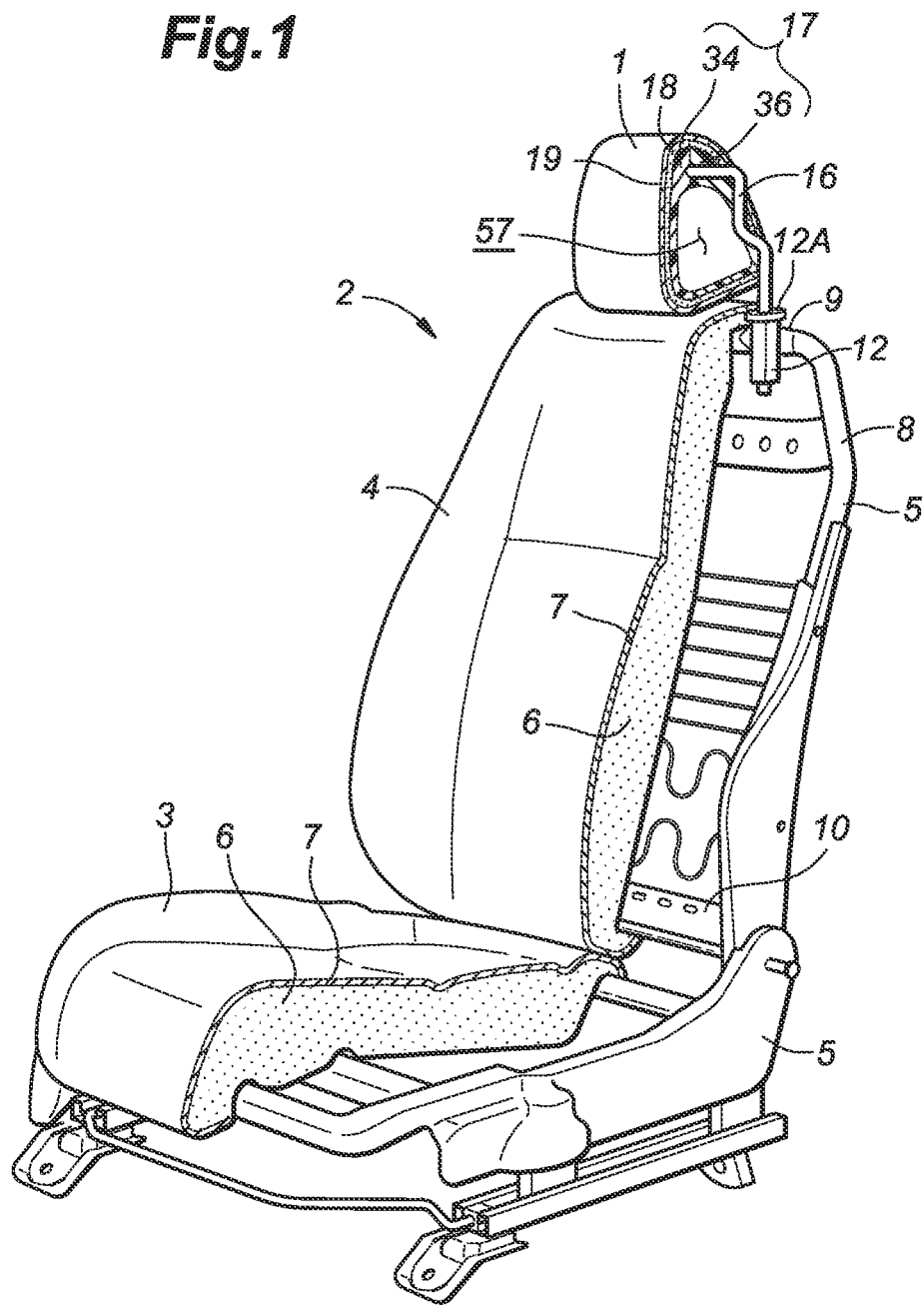
FIG. 1 is a cross-sectional perspective view of a seat equipped with a headrest according to a first embodiment of the present invention.

A headrest 1 according to a first embodiment of the present invention is provided as part of a passenger seat 2. As shown in FIG. 1, the passenger seat 2 includes a seat cushion 3 and a seat back 4 in addition to the headrest 1.

The seat cushion 3 has an upward-facing seat surface and is adapted to support a seated person. The seat back 4 extends upward from the rear end portion of the seat cushion 3. The seat back 4 has a frontward-facing support surface and supports the back of a seated person reclining on the support surface.

The seat cushion 3 and the seat back 4 each have a metal frame 5, a pad member 6 supported by the frame 5, and a skin material 7 covering the pad member 6.

The frame 5 of the seat back 4 includes: left and right side members 8 extending vertically (i.e., extending in an up-down direction); an upper member 9 extending horizontally (i.e., in a left-right direction) and coupled to the respective upper ends of the left and right side members 8; and a lower member 10 extending horizontally and is coupled to the respective lower ends of the left and right side members 8.

A pair of guide stays 12 are coupled to a horizontal center portion of the upper member 9. Each guide stay 12 is formed in the shape of a square cylinder with openings at both ends. The pair of guide stays 12 are located at two separate locations along the left-right direction. Each guide stay 12 has a circular cross section and defines a through hole 12A extending therethrough.

Figure 2:
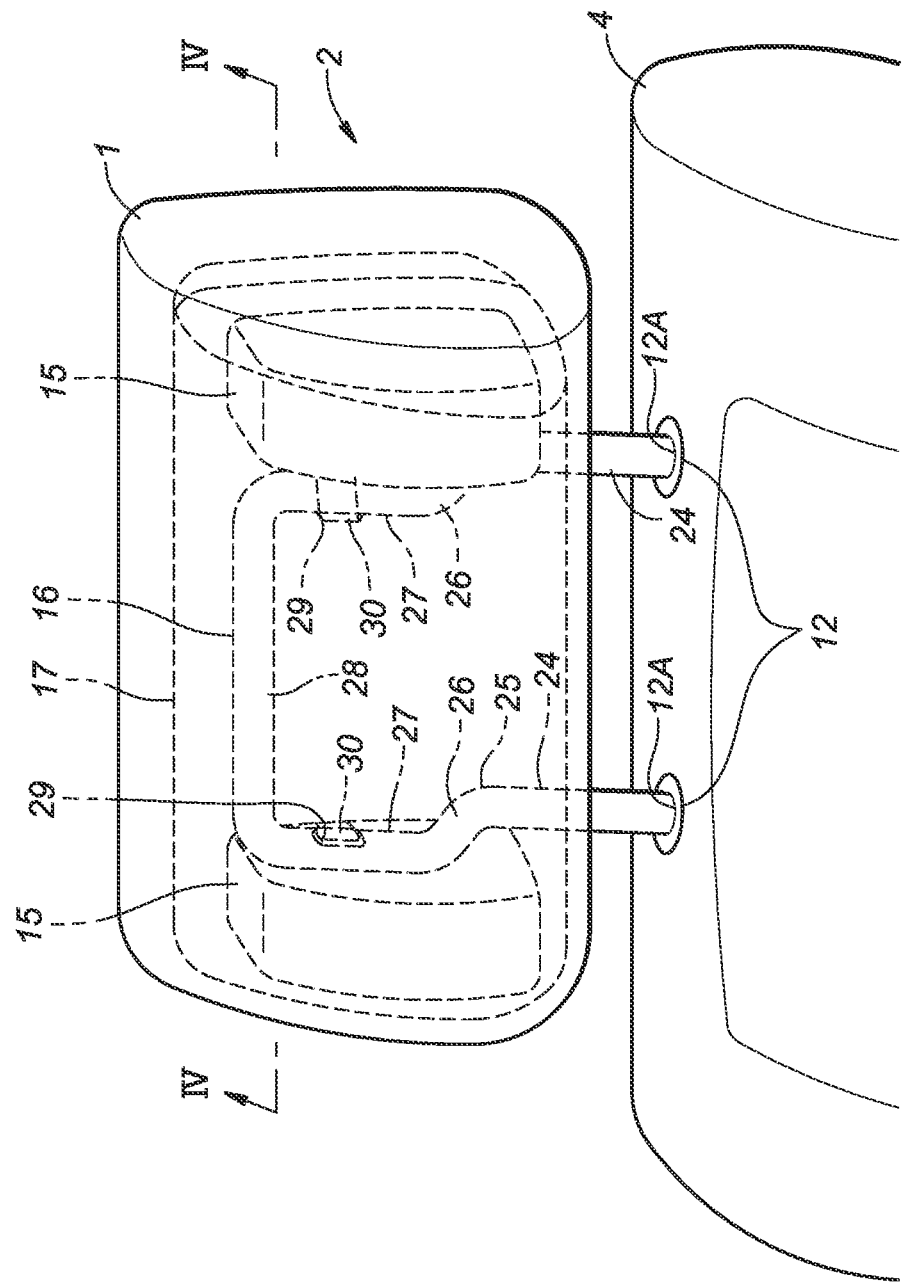
FIG. 2 is a perspective view of the headrest of the first embodiment and an upper portion of a seat back.
Figure 3:
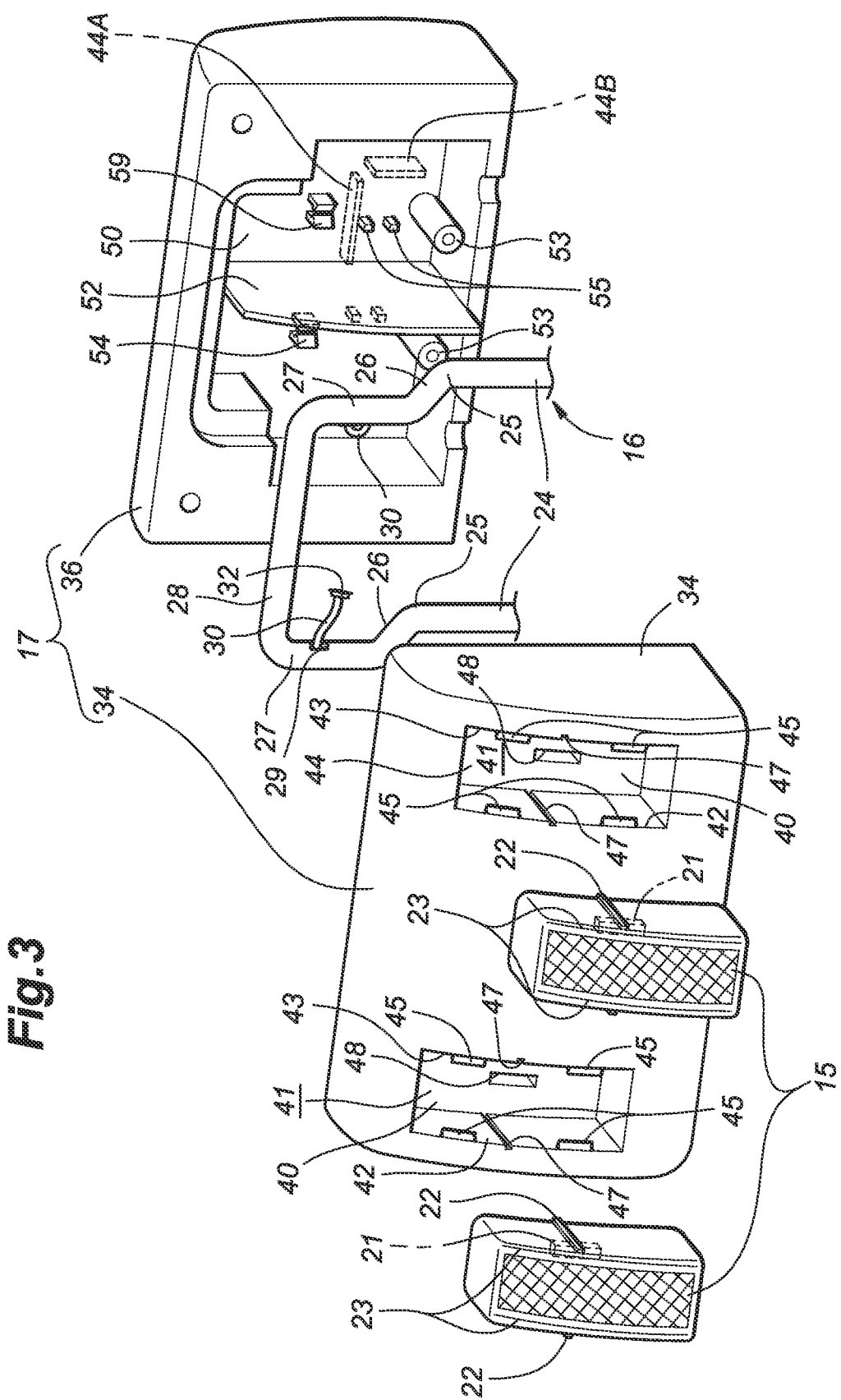
FIG. 3 is an exploded perspective view of the headrest of the first embodiment.

The headrest 1 is coupled to the top of the seat back 4. As shown in FIGS. 2 to 4, the headrest 1 includes a device(s) 15, a pillar 16, a core 17, a pad member 18, and a skin material 19 (see FIG. 4).

As shown in FIGS. 1 and 2, the device 15 is an electronic device driven by electric power and configured to produce (output) vibration and/or sound output to thereby transmit information to a seated person of the passenger seat 2; that is, the device 15 is used as "an information transmitting device." The device 15 may be configured to produce directional vibration and/or sound waves. The device 15 may include a speaker, an eccentric motor, or other components.

As shown in FIG. 3, a device-side connector(s) 21 is provided on the rear side of device 15. The device-side connector 21 is a connector for receiving power supplied to the device 15 or for inputting and outputting signals. In the present embodiment, the device-side connector 21 is supported in a floatable manner so as to be displaceable in the left-right direction, which is implemented by any known suitable method. In the present embodiment, the device 15 is substantially cuboid in shape, but is not limited to this shape.

Each of the left and right sides of the device 15 is provided with a guide rib 22 extending in the front-rear direction substantially at the vertical center (i.e., the center in the up-down direction) of the device. Provided on the front surface of the device 15 at the left and right edges of the front surface of the device 15 are respective locked recesses 23 (locked parts) that are recessed rearward.

As shown in FIG. 2, the pillar 16 includes: a pair of right and left leg portions 24 extending upward from the top of the seat back 4; a pair of left and right middle portions 26 extending frontward and upward at an angle from the upper ends of the corresponding leg portions 24 via respective curved portions 25; a pair of left and right vertical portions 27 extending upward from the front ends of the corresponding middle portions 26; and a horizontal portion 28 extending in the left-right direction and connecting one of the upper ends of the vertical portions 27 to the other. In the present embodiment, the left and right leg portions 24, the left and right middle portions 26, the left and right vertical portions 27, and the horizontal portion 28 are each formed by bending a metal round pipe.

As shown in FIG. 3, the pillar 16 has a pair of left and right insertion holes 29. Each insertion hole 29 is used to introduce a cable 30 for supplying power to the device 15. The cable is connected at one end to a power supply connector supported on the frame 5 of the seat back 4. The cable 30 passes through the inside of the pillar 16 and through the insertion hole 29. The other end of the cable 30 is provided with a body-side connector 32.

The core 17 is made of a hard plastic material and is supported by an upper portion of the pillar 16. The core 17 is composed primarily of a core front portion 34 (also called a front cover) which is a front side component of the core, and a core rear portion 36 (also called a rear cover), which is a rear side component of the core.

As shown in FIG. 4A, the core front portion 34 is made of a hard plastic material and is substantially cuboid in shape. The rear surface of the core front portion 34 is provided with a front side recess 38 that is recessed frontward. The front side recess 38 is located substantially at the horizontal center (i.e., the center in the left-right direction) of the rear surface of the core front portion 34. A partition wall 39 protrudes rearward from the front side recess 38 substantially at the horizontal center thereof, the partition wall having a vertical thickness (i.e., extending in the vertical direction). The upper and lower sides and the left and right sides of the front side recess 38 are defined by the respective wall parts with a front portion joining surface (not shown) that faces rearward. The front side recess 38 may be provided with a plurality of connecting parts (not shown) having a columnar shape and protruding rearward so that the connecting parts can connect to the core rear portion 36. In the present embodiment, the connecting parts are arranged symmetrically with respect to the partition wall 39; that is, the partition wall 39 is located between a pair of sets of the connecting parts located symmetrically in the left-right direction. The frontmost wall at the bottom of the front side recess 38 may be further provided with ribs protruding from the bottom surface and extending in the left-right direction (horizontal ribs) or in the up-down direction (vertical ribs).

The core front portion 34 is provided with a left and right pair of receiving recesses 40. The receiving recesses 40 are defined in the left and right wall parts, which define the left and right sides of the front side recess 38, respectively. The receiving recesses 40 extend rearward from left and right side regions of a front surface of the core front portion 34. Each of the receiving recesses 40 is defined by walls defining its inner and outer sides (hereinafter referred to as "inner wall 42" and "outer wall 43"), walls defining its upper and lower sides, and a wall defining its bottom side (hereinafter referred to as "bottom wall 44"). The receiving recess 40 defines a cuboid receiving space 41. The inner wall 42 and the outer wall 43 have respective wall surfaces facing towards each other. The receiving space 41 (in particular, the bottom) of each receiving recess 40 is located at least frontward of the leg portions 24 of the pillar 16 in horizontal cross-section.

As shown in FIG. 4B, the front end of the inner wall 42 and the front end of the outer wall 43 are provided with respective locking claws 45 (locking parts) which protrude towards each other. Two locking claws 45 may be provided on the inner wall 42 and outer wall 43, respectively, or more than two locking claws may be provided. Each locking claw 45 is a resilient piece that is resiliently engaged with the locked recesses 23 provided on the front left and right sides of the device 15. In this way, the locking claw 45 for engaging the device 15 can be formed by a simple configuration.

Defined in the opposite surfaces of the inner wall 42 and the outer wall 43 are respective grooves which are recessed in opposite directions to each other (hereinafter referred to as "guide grooves 47"). Thus, the guide grooves 47 are located on the left and right surfaces defining a receiving recess 40. The guide grooves 47 extend in the front-rear direction substantially at the vertical center of the surfaces of the outer wall 43 and the inner wall 42. In the present embodiment, each guide groove 47 extends from the front edge to the rear edge of a corresponding wall surface.

A through hole 48 is defined in the bottom wall 44. The through hole 48 is formed at a location where at least the device-side connector 21 of the device 15 received in the receiving recess 40 can be inserted through the through hole 48. The receiving recess 40 and the front side recess 38 are in communication with each other via the through hole 48.

The core rear portion 36 is made of a hard plastic material and is substantially cuboid in shape. The front surface of the core rear portion 36 is provided with a rear side recess 50 that is recessed rearward. The rear side recess 50 is located a substantially at the horizontal center (i.e., the center in the left-right direction) of the front surface of the core front portion 34. A partition wall 52 protrudes frontward from the rear side recess 50 substantially at the horizontal center thereof, the partition wall 52 having a vertical thickness (i.e., extending in the vertical direction). In the present embodiment, the partition wall 39 of the core front portion 34 is provided with a protrusion(s) extending out rearward, and the partition wall 52 of the core rear portion 36 is provided with a recess(s) that is recessed rearward. The recess of the partition wall 52 of the core rear portion 36 is shaped to conform to the protrusion of the partition wall 39 of the core front portion 34. The rear side recess 50 may be provided with a plurality of connecting parts 53 having a columnar shape and protruding frontward so that the connecting parts 53 can connect to the core front portion 34. In the present embodiment, the connecting parts 53 are arranged symmetrically with respect to the partition wall 52; that is, the partition wall 52 is located between a pair of sets of the connecting parts 53 located symmetrically in the left-right direction. The rearmost wall at the bottom of the rear side recess 50 may be further provided with horizontal ribs 44A and vertical ribs 44B that protrude from the bottom wall 44 and extend in the left-right direction and the up-down direction, respectively.

Provided on the front surface of the bottom wall 44 of the rear side recess 50 are a clip 54 for securing the cable 30 and posts 55 for engaging the body-side connector 32. The body-side connector 32 is supported on the posts 55 (i.e., on the core rear portion 36) so as to be displaceable in the left-right direction. The body-side connector 32 is connected to the device-side connector 21. The device 15 is supplied with power and receives control signals for controlling its outputs via the cable 30.

The upper and lower sides and the left and right sides of the rear side recess 50 are defined by the respective wall parts with a front portion joining surface that faces frontward. An upper edge region of the front portion joining surface defines a recess recessed rearward for receiving the upper parts of the left and right vertical portions 27 and the horizontal portion 28 of the pillar 16.

The core front portion 34 and the core rear portion 36 are arranged and joined so that their respective joining surfaces are in contact with each other. The upper left and right vertical portions 27 and the horizontal portion 28 of the pillar 16 are accommodated in the recess defined in the rear portion joining surface and are sandwiched between the core front portion 34 and the core rear portion 36, resulting in that the core 17 is supported by the pillar 16. When the core front portion 34 and the core rear portion 36 are joined, the front side recess 38 and the rear side recess 50 are aligned with each other along the front-rear direction, thereby forming a cavity 57 within the core 17. In the present embodiment, when the core front portion 34 and the core rear portion 36 are joined, the protrusion(s) on the partition wall 39 of the core front portion 34 and the recess(es) defined in the partition wall 52 of the core rear portion 36 fit together, and the partition wall 39 of the core front portion 34 and the partition wall 52 of the core rear portion 36 becomes continuous in the front-rear direction. As a result, the cavity 57 is separated into two spaces 57A and 57B.

As shown in FIG. 4A, the device 15 is inserted into a receiving recess 40 from the front to be accommodated in the receiving space 41 of the receiving recess 40. When the device produces directional output, the device 15 is preferably inserted into the receiving recess 40 such that the output is directed frontward. When the device 15 is fully inserted into the receiving recess 40, the front surface of the device 15 is flush with the front surface of the core 17, other that the receiving recesses 40.

When a device 15 is inserted into a receiving recess 40, the guide ribs 22 on the device are received in the guide grooves 47 on the inner wall 42 and the outer wall 43 of the receiving recess. Concurrently, the projecting end faces of the guide ribs 22 are in contact with the left and right sides of the corresponding guide grooves 47, and more specifically, in contact with the groove bottom surfaces of the guide grooves 47. Preferably, the guide ribs 22 are capable of sliding back and forth along the guide grooves 47. As shown in FIG. 4A, when a device 15 is fully inserted in a receiving recess 40, the device 15 overlaps at least a portion of the pillar 16 as viewed from a side.

The pad member 18 is a cushioning material formed of urethane and is provided to cover the core 17 and the device 15. In the present embodiment, a portion of the pad member 18 which covers the front surface of each device 15 may be provided with through holes 18A extending through the pad member in the front-rear direction. In the present embodiment, the pad member 18 is arranged to cover the entire portion of the core 17, other than the receiving recesses 40 and the front surfaces of the devices 15, as a one-piece member, but not limited to this configuration. The pad member 18 only needs to be configured to cover at least substantially the horizontal center of the front surface of the core 17.

The skin material 19 is a sheet-like member formed of a material such as cloth or artificial leather, and is arranged to cover the outer surface of the pad member 18. The pad member 18 may be bonded to the rear surface of the skin material 19 prior to the assembly of the headrest. The skin material 19 may be provided with fasteners such as zip fasteners at appropriate locations so that the skin material 19 can be removed along with the pad member 18 from the core 17.

Next, the effects (or technical benefits) of the so-configured headrest 1 will be described.

When assembling a headrest 1, an assembling worker first attaches devices 15 to a core front portion 34 by inserting the devices 15 into the receiving recesses 40. Then, the assembling worker joins the core front portion 34 to a core rear portion 36 such that a pillar 16 is sandwiched between the two portions. As a result, a core 17 is formed and supported by the pillar 16. The assembling worker then covers the core 17 with a pad member 18 together with a skin material 19, whereby the headrest 1 is assembled. In this way, an assembling worker can easily manufacture a headrest 1 with devices 15 placed inside, by inserting the devices 15 into the receiving recesses 40, securing the devices with locking parts, and the covering the headrest 1 with a skin material 19.

When the devices 15 are fully accommodated in the receiving recesses 40 and assembled in the core 17, the front surface of each device 15 is flush with the front surface of the core 17, other than the receiving recesses 40. As a result, after the headrest is covered with the skin material 19, the front surface of the headrest can be made to have less bumps, which enhances the comfort of the headrest 1.

When the devices 15 are fully accommodated in the receiving recesses 40 and assembled in the core 17, each device 15 overlaps at least a portion of the pillar 16 as viewed from as side. As a result, when a lateral load is applied to the headrest, a device 15 can be supported by the pillar 16, which prevents the device 15 from moving to the side along the load direction. For example, when a seated person is located s on a line with the load direction, the feature can prevent the device 15 from moving toward the seated person, which enhances the safety of a passenger seat 2 to which the headrest 1 is attached.

When a device 15 is fully accommodated in a receiving recess 40, the projecting end faces of the guide ribs 22 are in contact with the left and right sides of the corresponding guide grooves 47, and more specifically, in contact with the groove bottom surfaces of the guide grooves 47. As a result, when a device 15 is mounted, the device is guided to a proper position.

When inserting a device 15 into a receiving recess 40, an assembling worker preferably inserts the guide ribs 22 into the guide grooves 47 and moves the device 15 rearward, which enables the device 15 to be located at a proper position in the vertical direction.

In some cases, due to repeated insertion and removal of a device 15, or manufacturing errors, the protruding surface of a guide rib 22 does not come to contact with the groove bottom surface of a corresponding guide groove 47, which prevents the device 15 from being guided to a proper horizontal position. In this view, in the present embodiment, both the device-side connector 21 and the body-side connector 32 are supported in a floatable manner so as to be displaceable in the left-right direction. As a result, even when the position of device 15 is slightly displaced from the proper horizontal position, the device-side connector 21 can be connected to the body-side connector 32. In the present embodiment, both the device-side connector 21 and the body-side connector 32 are supported so as to be displaceable in the left-right direction. In other embodiments, only one of the connectors 21 and 32 may be supported to be horizontally displaceable.

In the present embodiment, a cavity 57 is defined within the core 17, and a through hole 48 is defined in the bottom wall 44 defines a through hole 48, leading to the cavity 57. This feature allows the device-side connector 21 to be inserted therethrough and coupled to the body-side connector 32.

When a device 15 (speaker) is an audio device and configured to produce directional sound, sound waves in the opposite phase also propagate in the opposite direction. Since a through hole 48 communicably connects the inner space of a corresponding receiving recess 40 to the cavity 57, the cavity 57 can be used as an acoustic chamber to confine the sound waves produced towards the opposite direction, which improves the quality of directional sound produced from the device 15 (speaker); that is, the quality of sound produced from the device frontward.

The device 15 can be detached from the core 17 by removing the skin material 19, which allows each seated person to use other devices 15 (speakers) that can produce sound with a desired audio quality.

Second Embodiment

A headrest 71 according to a second embodiment of the present inventions is different from the first embodiment in that a cable 72 is configured differently, and the other features are similar to those of the above embodiment. Thus, the description of such features will be not repeated here and the cable 72 will be described below.

As shown in FIG. 5A, the cable 72 is connected to the device 15. The cable 72 is comprised primarily of a flat cable that is bendable and deformable. In the present embodiment, as shown in FIG. 5B, the cable 72 is comprised primarily of a so-called FPC cable made of conductors 72A (conductive layer) arranged in parallel and sandwiched between film-like insulators 72B (insulating layer). The cable 72 may be produced using printing technology (technology related to printed electronics components).

The cable 72 covers an outer surface of a leg portion 24 at least from the bottom to the top of the leg portion 24. The insulating layer of a cable 72 is bonded to the outer surface of the pillar 16. The insulating layer is arranged between the conductor 72A and the pillar 16, thereby preventing a short circuit therebetween. One end of the conductor 72A of the cable 72 is placed at the lower end of the outer surface of the pillar 16 and exposed to form a cable terminal 74. A leg portion 24 may be provided with a plastic tube 75 that covers the cable terminal 74. The tube 75 is preferably in the form of a bellows and extendable in the axial direction thereof.

As shown in FIG. 5B, guide stays 73 are connected to the headrest 71 of the present embodiment, and each guide stay 73 has a cylindrical guide stay body 81 and an elastic piece 82 provided in the guide stay body 81. The guide stay body 81 is formed of an insulating hard plastic material and has a circular through hole (hereinafter referred to as "stay through hole 83") extending therethrough in the vertical direction. A leg portion 24 is inserted into the stay through hole 83 together with the cable 72 covering the leg portion 24. In this way, the headrest 71 is coupled to the guide stays 73 in a vertically movable manner.

The lower part of a guide stay 73 is provided with one or more elastic pieces 82 that contact the cable terminal 74. An elastic piece 82 is provided below the stay through hole 83, protrudes radially toward an outer surface of the pillar 16, and elastically contacts the cable terminal 74. An elastic piece 82 may be made of metal or may be provided with a metal terminal that connects to the cable terminal 74. As shown in FIG. 5A, a cable 85 is connected to the elastic pieces 82, and is also connected to a connector provided inside the seat back 4. When the elastic pieces 82 contact the cable terminal 74, the cable 85 is electrically connected to the cable 72 and supplies signals and power to the device 15.

Next, the operation and effects of the so-configured headrest 71 will be described. Even when the headrest 71 is moved up or down, the elastic pieces 82 remain contact with the cable terminal 74, which ensures that, when the headrest 71 is vertically moved, signals and power can be supplied to the device 15.

Third Embodiment

A headrest 101 according to a third embodiment of the present inventions is different from the first embodiment in that the core rear portion 36 is provided with receiving recesses 102 and respective lids 104, and the other features are similar to those of the above embodiment. Thus, the description of such features will be not repeated here.

As shown in FIGS. 6A to 6C, the core 17 of the headrest 101 of the third embodiment is formed of the core front portion 34 and the core rear portion 36 that are coupled together, as in the first embodiment.

As shown in FIG. 6C, the receiving recesses 102 are provided on the left and right sides of the core rear portion 36, respectively. The receiving recesses 102 are recessed inward on the left and right sides, respectively. The left and right side walls are each provided with a securing portion 102A (such as a screw hole) for securing the device 15. Each device 15 is secured to the core rear portion 36 with the device 15 inserted into a corresponding receiving recess 102.

In the present embodiment, respective through holes are defined in the bottom walls of the receiving recesses 102, which form through holes (receiving recesses 105) horizontally extending on the left and right sides of the core rear portion 36 to lead to the rear side recess 50. Each receiving recess 102 accommodates part of a device 15. More specifically, each receiving recess 102 defines a receiving space 41 therein to receive part of a corresponding device 15.

The front side recess 38 and the rear side recess 50 are provided with the respective partition walls 39 and 52 extending vertically, as in the first embodiment. The front side recess 38 and the rear side recess 50 may be provided with respective sets of connecting parts 106 and 107 for connecting the core front portion 34 and the core rear portion 36, respectively, as in the first embodiment. In addition, either of the front side recess 38 and the rear side recess 50 may be provided with horizontal ribs and vertical ribs extending in the left-right direction and the up-down direction, respectively.

In the same manner as the first embodiment, the core front portion 34 and the core rear portion 36 are joined together with the pillar 16 sandwiched therebetween, resulting in that the core 17 is supported by the pillar 16. The pad member 18 and the skin material 19 are provided so as to cover the front and rear surfaces of the core 17.

Figure 7:
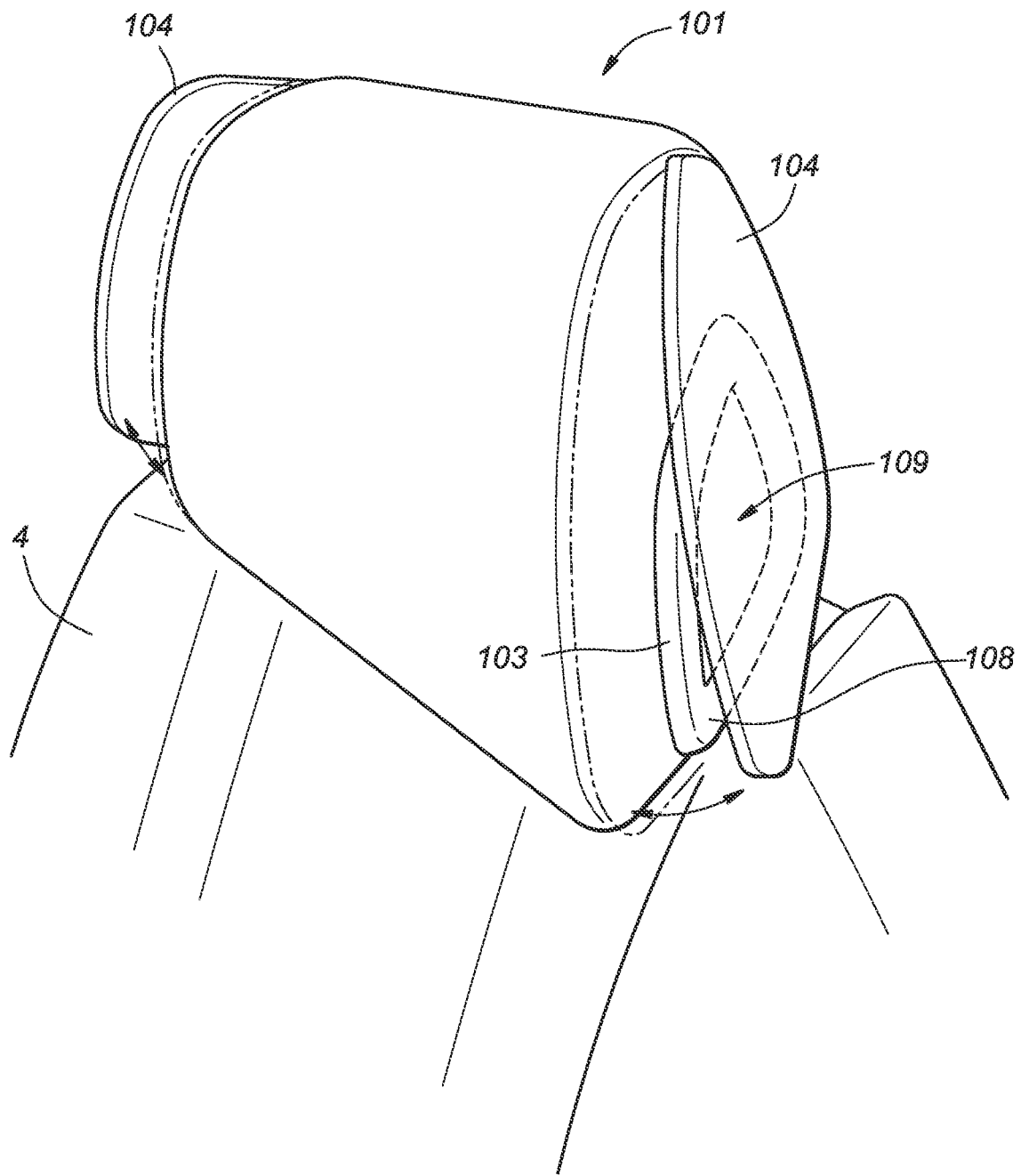
FIG. 7 is a perspective view of a headrest according to a third embodiment of the present invention.

As shown in FIG. 7, a garnish 103 is a cylindrical member made of a hard plastic material and extending in the left-right direction. On the inner side of the seat, the garnish is fitted into and secured to the opening edge of the inner receiving recess 102. On the outer side of the seat, the outer end of the garnish 103 is provided with a brim 108 radially extending out in a plane perpendicular to the longitudinal direction of the garnish. The outer end of the garnish 103 may be provided with a net sheet extending over the opening to substantially seal the inner hole.

Lids 104 are formed of a plastic plate material. The lids 104 are provided on the left and right rear sides of the core 17, respectively. Each lid 104 is hingedly connected to a corresponding side of the core 17 and is rotatably supported by the core 17 so as to be rotatable around a vertical axis. Each lid 104 is provided at a location rearward of a corresponding receiving recess 102 so as to cover the opening of the receiving recess 102. Specifically, as shown in FIG. 7, a lid 104 can be rotated between a closed position (double-dotted line) where the lid covers a corresponding side of the core 17 from the outside and an open position (solid line) where the side of the core 17 is exposed. On the inner side of a lid 104, a reflector or any other component for reflecting sound and vibration may be fixedly provided so as to extend over the surface.

Next, the effects (or technical benefits) of the so-configured headrest 101 will be described. When a lid 104 is open, a corresponding receiving recess 102 is sealed by the lid 104, which provides a protection to the device accommodated in the receiving recess 102. When a device 15 produces sound or vibration while a corresponding lid 104 is open, the sound or vibration from the device 15 is reflected by the lid 104, which facilitates the transmission of sound and vibration toward a person seated in front of the headrest. Moreover, this configuration of the headrest 101 allows a seated person to adjust the direction of sound and vibration transmission by adjusting the opening of the lid 104.

Fourth Embodiment

A headrest 151 according to a fourth embodiment of the present inventions is different from the third embodiment in that the headrest 151 does not include lids 104 and includes a garnish 152 having a different structure, and the other features are similar to those of the third embodiment. Thus, the description of such features will be not repeated here.

Figure 8A:
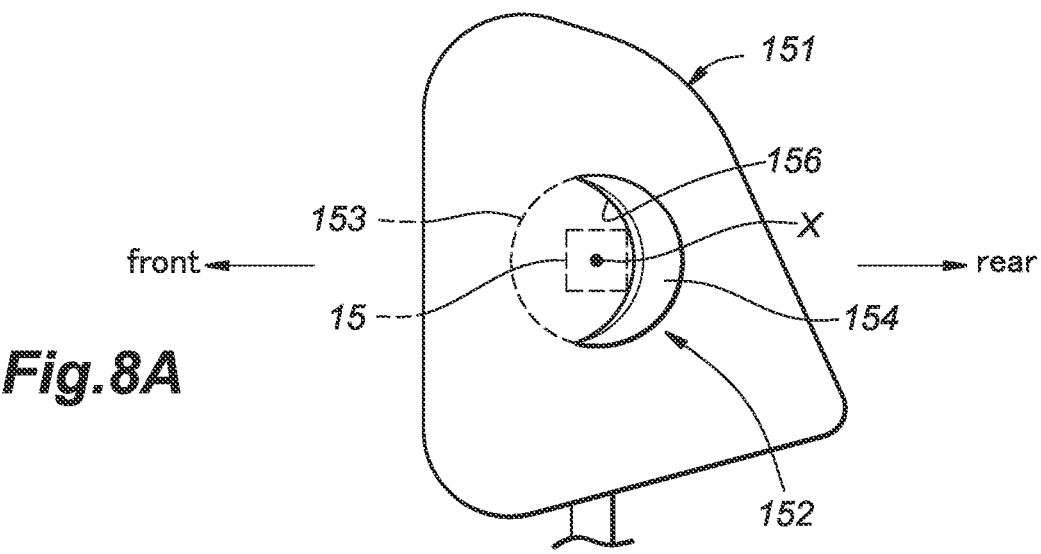
FIGS. 8A to 8D show a headrest according to a fourth embodiment of the present invention.

As shown in FIG. 8A, the garnish 152 includes a substantially cylindrical garnish body 153 extending in the left-right direction and ear parts 154 provided on the garnish body 153.

The garnish body 153 is fitted into the receiving recesses 102 at the left and right inner ends. The garnish body 153 is rotatably coupled to the core rear portion 36 with an axis X extending in the left-right direction. The garnish body 153 is rotatably coupled to the core rear portion 36 with the axis X in the left-right direction.

The ear parts 154 are coupled to the left and right outer ends of the garnish body 153, respectively. The ear parts 154 horizontally protrude outward from the left and right outer ends of the garnish body 153 so as to extend out from the left and right outer surfaces of the core 17, respectively. An ear part 154 is a plate member having a substantially arcuate shape in a front-rear cross-section. An ear part 154 has a curved surface 156 on the side of the axis of the garnish body 153. Each ear part 154 protrudes outward from either of the left and right sides of the core 17 and is rotatably supported to be rotatable about the axis extending in the left and right direction. Each ear part 154 functions as a reflector that reflects sound and vibration from a corresponding device 15 and changes the direction of sound and vibration transmission.

Figure 8B:
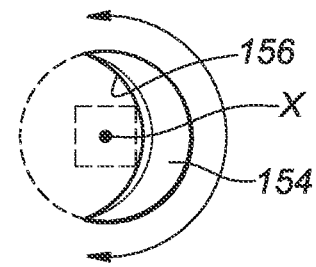
Figure 8C:
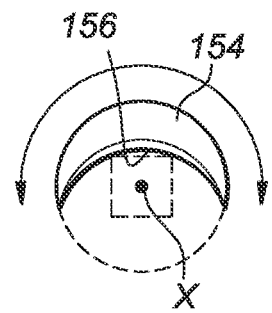
Figure 8D:
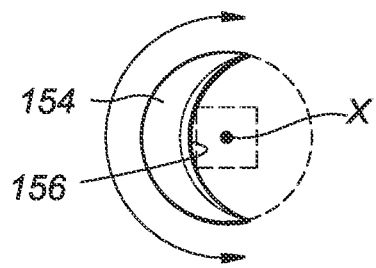

Next, the effects (or technical benefits) of the so-configured headrest 151 will be described. The garnish body 153 is supported by the core 17 so as to be rotatable about round the axis X extending in the left-right direction. Thus, a seated person can rotate an ear part 154 so that the curved surface 156 faces frontward (see FIG. 8B), thereby facilitating the frontward transmission of vibration and sound from a device 15. Similarly, a seated person can rotate an ear part 154 so that the curved surface 156 faces downward (see FIG. 8C), thereby facilitating the downward transmission of vibration and sound from a device 15. A seated person can also rotate an ear part 154 so that the curved surface 156 faces rearward (see FIG. 8D), thereby facilitating the rearward transmission of vibration and sound from a device 15. In this way, the direction of transmission of vibration and sound from a device 15 can be changed by rotating an ear part 154 to change the orientation of its curved surface 156.

Fifth Embodiment

A headrest 201 according to a fifth embodiment of the present inventions is different from the first embodiment in that receiving recesses 202 are arranged at different locations, and the other features are similar to those of the first embodiment. Thus, the description of such features will be not repeated here.

The core 17 is provided with a pair of receiving recesses 202, as in the first embodiment. As shown in FIG. 9A, the receiving recesses 202 are provided at the left and right ends of the bottom surface of the core 17, respectively. Each receiving recess 202 is recessed upward from the bottom surface of the core 17. The receiving recesses 202 extend from the bottom surface of the core 17 to the top of the core 17. Each receiving recess 202 is located on the outer side of a corresponding one of the left and right leg portions 24 of the pillar 16.

In the present embodiment, as shown in FIG. 9B, the receiving recesses 202 are provided in the core front portion 34, but not limited to this configuration. In other cases, the receiving recesses 202 may be formed by combining the core front portion 34 and the core rear portion 36.

The devices 15 are shaped to conform to the respective receiving recesses 202. Each device 15 is fitted into a corresponding receiving recess 202 so that the vibration and sound output (audio output) is directed frontward. Two through holes 203 are defined in the core 17 to extend rearward from the front surface, leading to the corresponding receiving recesses 202. Each through hole 203 is provided with restriction walls 204 protruding inward from the left and right side walls, respectively.

Each device 15 is provided with protruding plates 205 (also called wings) protruding from the lower end of the device in the left and right directions, respectively. Each protruding plate 205 defines one or more holes for screwing (tapped holes). A device 15 is, after fitted into a receiving recess 202, secured to the core 17 by inserting screws into the tapped holes from below and then screwing the protruding plates to the lower surface of the core 17. When a device 15 is inserted into the core, the restriction walls 204 are located adjacent to and in front of the front left and right sides of the device 15 to restrict frontward movement of the device 15. The device can produce vibration and sounds, which travel frontward through the through holes 203 to be transmitted to a seated person in front of the headrest without being blocked by the core 17.

Next, the effects (or technical benefits) of the so-configured headrest 201 will be described. The headrest, which can be assembled by inserting devices 15 into recesses or holes defined in the core 17, advantageously facilitates the assembly of the device 15 into the core 17. In this configuration, a device 15 is allowed to move in the opposite direction to the insertion direction to thereby go off the core 17.

In the headrest 201, a receiving recess 202 is recessed upward from the underside of the core 17, and a device 15 is moved upward to be assembled into the core 17. Thus, even when moving in the opposite direction of the insertion direction, the device 15 does not move toward a seated person. In addition, the restriction walls 204 prevent an inserted device 15 from moving frontward, thereby further ensuring the prevention of the movement of the device 15 toward a seated person.

In the above described embodiment, each receiving recess 202 is recessed upward from the bottom surface of the core 17. In other embodiments, each receiving recess 202 may extend downward from the top surface of the core 17. However, when the receiving recesses 202 are recessed upward from the bottom surface of the core 17, the devices 15 can be positioned lower in the headrest 201, which allows the center of gravity of the headrest 201 to be lowered, thereby improving the stability of the headrest 201 against a horizontally-applied load.

The headrests 1, 71, 101, 151, 201 (hereinafter collectively referred to as headrest H) according to the present invention have been described. However, the present invention is not limited to those specific embodiments, and various modifications may be made to the embodiments within the scope of the invention as described below.

In the first embodiment, a device 15 is secured by the locking claws 45 that engage the front surface of the device 15. However, the securing feature is not limited to this. In some cases, a device 15 may be secured to the core front portion 34 by providing tapped holes in the left and right side walls of the core front portion 34 and screwing the device 15 from the outside at the left and right sides of the core front portion 34. In this case, the outer wall 43 defining the receiving recess 202 may not be provided. In other cases, a device 15 may be secured to the core 17 by providing protruding plates 205 similar to those of the fifth embodiment on the front end of the device 15 and screwing the plates to the front surface of the core 17.

Figure 10A:
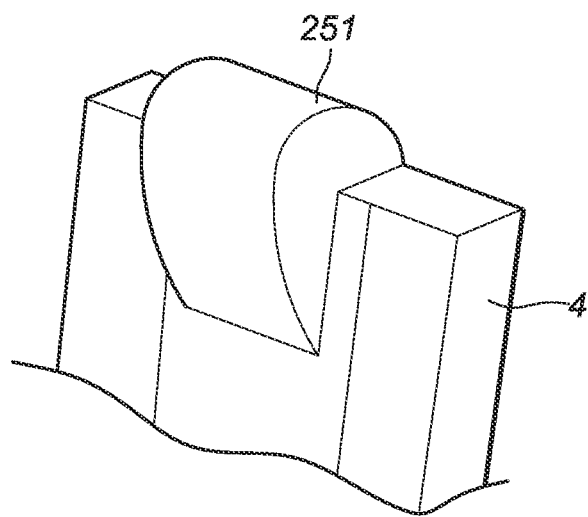
FIG. 10A is a perspective view showing a headrest of an embodiment of the present invention having a different shape from the above embodiments.
Figure 10B:
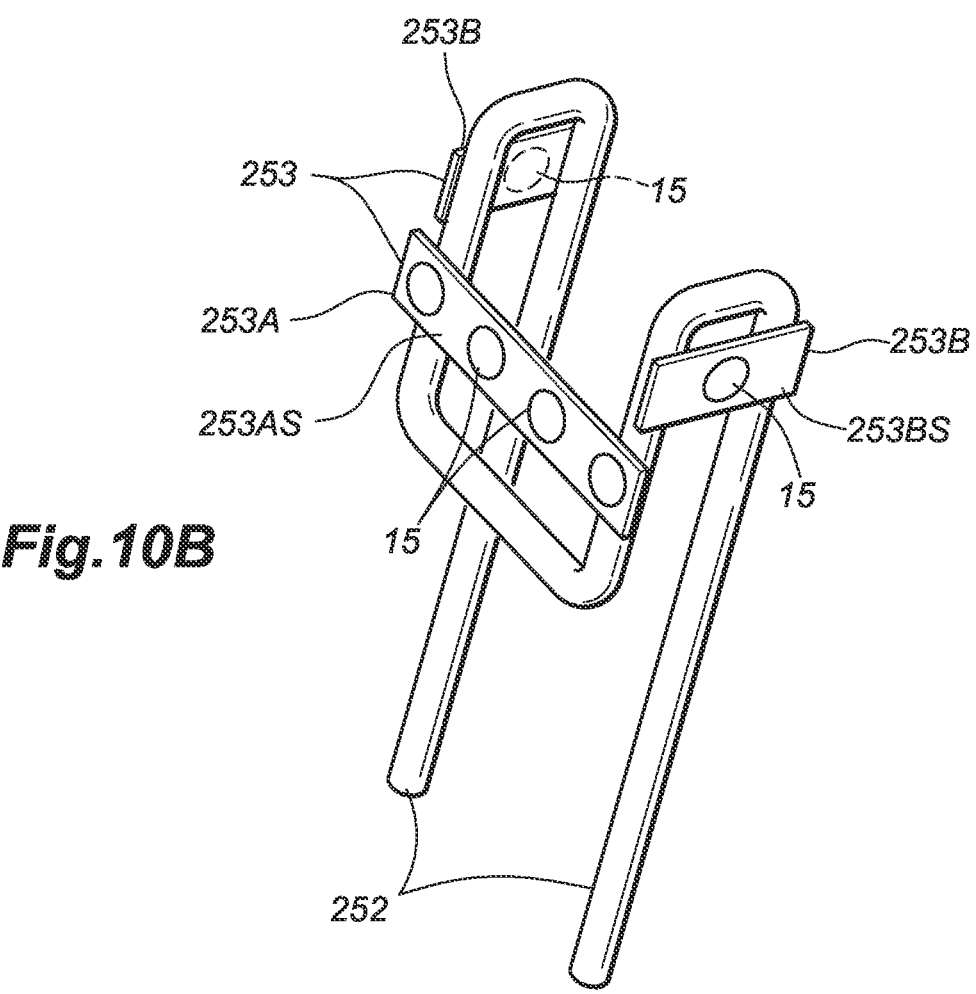
FIG. 10B is a perspective view showing a device securing structure for the headrest having the different shape.

In the above-described embodiments, the pad member 18 is provided above the seat back 4. However, the configuration of the pad member is not limited to this. As shown in FIG. 10A, a headrest 251 may be of a teardrop shaped headrest in which the pad member 18 is configured to protrude frontward above the seat back 4. The headrest 251 is not limited to one in which the device 15 is lacked to the core 17, but the device 15 may be fixed directly to the pillar 16. As shown in FIG. 10B, the headrest 251 may be secured to brackets 253 so that the devices 15 can be coupled to a pillar 252. A bracket 253A may be secured to the pillar 252 such that a surface 253AS of the bracket 253A faces frontward of the seat and the devices 15 may be coupled to the surface 253AS. Brackets 253B may be secured to the pillar 252 such that surfaces 253BS of the brackets 253B face sideways to the left or right of the seat, respectively, and a device 15 may be coupled to a surface 253BS.

As shown in FIGS. 11A and 11B, the devices 15 may be fixed to the pad member 18 supported by a pillar 264 of a headrest 263. In this case, clips 266 may be secured to the pad member 18 and a device 15 may be provided with a wire 268 that can fit into the clips 266. The body-side connector 32 of a device may be fixed at a location on the pad member so as to mate with a corresponding device-side connector 21.

As shown in FIG. 11C, the body-side connector 32 may be fixed to a pillar 270, and the device-side connector 21 of a device may be connected to a corresponding body-side connector 32, thereby securing the device 15 to the pillar 270. The pillar 270 may be provided with notches. In this case, a device 15 may be provided with locking claws that fit into the notches so that the locking claws of the device can engage the respective notches, thereby securing the device 15 to the pillar 270.

In the second embodiment, the cables 72 for supplying power to and communicating with the device 15 are provided on the outer surface of the pillar 16, the cable configuration is not limited to this. As shown in FIG. 11A, the headrest 263 may be provided with the pillar 274 for housing the cables 30 (harnesses), extending downward to the seat back 4.

A headrest H may be provided with a duct for guiding sound produced by a device 15 frontward. Such a duct may be formed of a flexible material. A device 15 may be configured to transmit sound and vibration via the pad member 18 and the skin material 19, or may be configured to produce sound by vibrating the core 17.

A device 15 may be located on a neck rest provided on the pillar 16. A device 15 may be a vibrating body capable of transmitting sound to a seated person by vibration.

When a device 15 is one configured to generate vibration (a vibrating device such as an eccentric motor), a vibration isolator (insulator) is preferably provided on the inner circumference of the through hole 12A of a guide stay 12 to thereby prevent the transmission of vibration to the frame 5 of the seat back 4 through the guide stay 12. A vibration isolator may be provided between the core 17 in which the devices 15 are housed and the pillar.

A dynamic damper may be provided in the cavity 57 within the core 17, which can change (modify) the sound from a device 15 (by creating a bass sound).

When the pad member 6 of the seat cushion 3 or the seat back 4 is provided with airflow holes for flowing air to the seating surface, and a duct leading to the airflow holes, a device 15 may direct sound into the duct. This configuration allows vibration to be transmitted to the seat surface of the seat cushion 3 and the support surface of the seat back 4, thereby relieving stiffness and muscle fatigue that occur in the body of a seated person (by providing massaging effect).

A headrest H may be equipped with a slot(s) for placing an electronic board. Such a slot may, for example, allow for the installation of an amplifier for amplifying the output from a device 15 or a filter for filtering input signals to a device 15. Furthermore, the slot may be configured to allow an amplifier unit with a housing including an amplifier therein or a filter unit with a housing including a filter therein to be inserted and removed. The slot may also be configured to allow an amplifier unit including an amplifier integrally with a filter therein to be inserted and removed.

A protective member may be provided in front of a device 15 to protect the device 15. A counterweight may be provided in the frame 5 of the seat back 4 to counteract the load from the headrest H. The counterweight may be provided on the upper member 9 between the guide stays 12.

When the devices 15 are provided in a headrest H, a pillar of the headrest H is preferably configured to have e.g., an increased diameter and/or an increased wall thickness to thereby be less likely to deform compared to other headrests having no device 15 therein. The shape of a pillar is not limited to the inverted U shape as in the above embodiments. For example, as shown in FIG. 11C, the pillar 270 may be comprised primarily of two straight tubes that are inserted into the core 17. When the pillar 270 is comprised primarily of two straight tubes, the pillar 270 may be provided with a reinforcement member 272 that seals the end in the core 17. The reinforcement member 272 may be comprised primarily of a plastic material. In other cases, the pillar may have an elliptical shape extending in the vertical direction. In other embodiments, the pillar may be provided with three or more leg portions 24.

<Audio System>

As described above, when a device 15 installed in a headrest H is a speaker ("headrest speaker"), the device 15 may include a part of an audio system for controlling the music and sound produced in a vehicle interior. Such an audio system 401 will be described below.

Referring to FIG. 12, the audio system 401 includes: headrest speakers 402 installed in the respective headrests H; interior speakers 403 installed in the door interior structures of a vehicle other than the seats; and a control device 404 for controlling the headrest speakers 402 and the interior speakers 403. The system may be configured to select audio and music and produce it for a driver from the headrest speaker 402 in the driver's seat, and produce audio and voice to be shared with non-driver passengers from the headrest speakers 402 in the respective headrests and the interior speakers 403. The control device 404 may control the sound produced by speakers installed in the seat backs (hereinafter referred to as seat back speakers 405).

More specifically, when the audio system 401 includes a car navigation device 406 configured to acquire information on the vehicle's position (location) and traffic regulation information, and other information, the control device 404 may acquire such information from the car navigation device 406, select information to be notified to the driver, and provides the selected information from the headrest speakers 402 (or the interior speakers 403). Examples of information to be notified to a driver include information on accidents occurred near the vehicle, information on traffic regulations, and information as to whether nearby vehicles includes an automated vehicle. This configuration allows the headrest speaker 402 in the driver's seat to produce audio and voice notifying important information for a driver, thereby ensuring that the driver is accurately notified of warnings and information necessary for driving operations. In order to notify passengers in a vehicle with information to be shared with all the passengers (such as information on directions from the car navigation device 406, stores and weather conditions on the planned route, earthquake early warning, and traffic jam information), the control device 404 controls the system to produce audio or voice information from the headrest speakers 402 and the interior speakers 403 for the respective seats. This configuration ensures that all the passengers are notified of information that is desirable to be shared.

Each of the headrest speakers 402 and the interior speaker 403 is preferably configured such that the operation mode of the speaker is changeable between a directional mode in which (strongly) directional sounds are produced and a non-directional mode (a weak-directional mode) in which non-directional (or weak directional) sounds are produced, and that the direction of directional sounds is changeable. In this case, when sound or voice needs to be conveyed to a particular passenger, the control device 404 adjusts the direction of directional sounds from the headrest speakers 402 (or an interior speaker(s) 403) towards the particular passenger, and when sound or voice needs to be transmitted to all the passengers, the control device 404 causes the speakers to operate in the non-directional mode (or the weak directional mode) so that non-directional (or weak directional) sounds are produced.

The control device 404 may cause different types of music that meet music preferences of the respective passengers to be produced by the corresponding headrest speakers 402 of their seats. For example, the control device 404 may cause the headrest speaker 402 of the driver's seat to provide audio stream of the radio broadcast received by the system, while causing the headrest speaker 402 of the front passenger seat to provide streaming music.

The control device 404 may acquire music data stored in a storage device and provide streaming music from speakers, where the acquired music is selected depending on the position (location) of the vehicle acquired by the car navigation device 406. When the control device 404 can control, in addition to speakers installed in the respective seats in a vehicle (e.g., headrest speakers 402), speakers installed in passengers' smartphones or personal computers, the control device 404 may select the speaker(s) to be used and produce sound and voice from the selected speaker.

The control device 404 may acquire planned travel route data from the car navigation device 406, estimate the behavior of the vehicle based thereon, and provide an audio notification notifying the estimated behavior of the vehicle from the headrest speaker 402 at a seat where a passenger who is prone to motion sickness is seated. This configuration enables such a passenger who is prone to motion sickness to recognize in advance how or in which direction an inertial force will be applied to the passenger's body, thereby preventing motion sickness.

The control device 404 may be equipped with a preference learning function which enables music or songs that meet a passenger's preference to be provided. Specifically, the control device 404 may be configured to acquire each passenger's responses (e.g., acceptance or rejection) to the music or songs provided to the passenger, create a trained learning model based on the acquired responses, use the created learning model to select a song that is likely to meet the passenger's preference, and produce the selected song from the corresponding speaker (headrest speaker 402 or other speakers).

The audio system 401 is equipped with a microphone 407 capable of acquiring audio in a vehicle interior, and the control device 404 may be configured to detect the strength of noise based on the signals acquired from the microphone 407, and when determining that the noise level is strong (or noise is detected), the control device 404 may increase the volume of sound output from the headrest speakers 402. In other embodiments, when detecting that a window is open, that the air conditioner is operating, that the vehicle is accelerating (i.e., when the engine or motor noise becomes loud), or when detecting noise from the outside (when another vehicle is approaching the vehicle), the control device 404 may increase the volume of sound output from the speakers compared to otherwise.

When the level of noise acquired by the microphone 407 is greater than a predetermined level or when the volume of sound output of the speakers is greater than a predetermined value, the control device 404 may restrict (or mute) the sound output from the speakers.

When determining that some passengers are chatting based on the sound acquired by the microphone 407, the control device 404 may restrict the volume of the sound output from the speakers (i.e., the headrest speakers 402 in each seat, the interior speakers 403, the seat back speakers 405, or speakers of passengers' terminal such as smart phones and PCs). In this case, the control device 404 may decrease the volume of sound to be lower than when detecting that no chatting is taking place, or set the volume to zero (i.e., mute the sound).

When the voice of a passenger seated on the front seat (or a rear seat) is acquired by the microphone 407, the control device 404 may provide sound outputs from the headrest speakers 402 of the rear seats (or the front seat). In this case, when each seat is provided with a light emitting element, the control device 404 may emit light from the light emitting element of the seat on which the passenger whose voice is detected is seated. In response to an input operation (e.g., operating a button) by a seated person in a vehicle, the control device 404 may execute or stop, as appropriate, a processing operation for outputting voice of another passenger in the vehicle from the headrest speaker 402 for the seated person having performed the input operation.

The audio system 401 may be equipped with an exterior speaker 408 for providing sound output to the outside of the vehicle. The control device 404 may convey sound or voice acquired by the microphone 407 to the outside by providing sound output from the exterior speaker 408. The audio system 401 may be equipped with another microphone 407 configured to acquire sound or voice outside the vehicle, which enables a person inside the vehicle to have a communication or conversation with a person outside the vehicle.

The control device 404 may be configured such that, while a vehicle is traveling in an automatic driving mode, the control device 404 selects the headrest speakers 402 of the seats for seated persons as speakers for providing sound output and causes each of the selected headrest speakers 402 to provide streaming music that meets music preferences of a corresponding seated person, and while the vehicle is traveling in a manual driving mode, the control device 404 selects the interior speakers 403 and all the headrest speakers 402 as speakers for providing sound output and causes the speakers to provide audio information on directions from the car navigation device.

The audio system 401 may include an exterior camera 410 for capturing images of the outside of the vehicle. When determining, based on the images acquired by the exterior camera 410, that the vehicle is in a potentially dangerous state, the control device 404 may change the speakers to be used to provide sound outputs from the headrest speakers 402 of the seats for seated persons to the interior speakers 403, in order to notify everyone in the vehicle of audio information, not notifying only a driver of the information. When determining, based on the images acquired by the exterior camera 410, that a hazardous event is occurring in a predetermined direction, the control device 404 may select a speaker(s) located at a position in the vehicle that corresponds to a direction towards where the event is occurring as a speaker to be used to provide sound outputs.

In such cases, the control device 404 may change the sound image localization so that the passengers can intuitively recognize approaching vehicles or occurrence of any other events. The change in the sound image localization can be achieved by controlling the sound outputs from the speakers installed in the seats in the vehicle interior (such as headrest speakers 402, and seat back speakers 405) and the interior speakers 403.

The control device 404 may be configured to acquire the status (red, yellow, or green) of a traffic signal in front of the vehicle based on images from the exterior camera 410, and, based on the acquired status, notify the driver and passengers that the vehicle can start traveling by using output (sound or vibration) from some speakers. Specifically, when the system detects, based on images from the exterior camera 410, that the status of the signal in front of the vehicle has changed from red to green, the control device 404 may notify the driver that the vehicle can start traveling by using sound output from some headrest speakers 402 (the headrest speakers at the driver's seat and the speakers in the seat back 4) and the interior speakers 403. When the system detects, based on images from the exterior camera 410, that the status of the signal in front of the vehicle has changed from green to yellow or from yellow to red, the control device 404 may provide the driver guidance that the driver should slow down or stop the vehicle by using sound output from some headrest speakers 402 and the interior speakers 403.

The audio system 401 may also include a vibrating device 412 and a lighting device 414 installed in each seat. The vibrating device 412 and the lighting device 414 may be controlled by the control device 404. The control device 404 may provide a driver with guidance that the driver should start, slow down or stop the vehicle by driving the vibrating device 412 or the lighting device 414.

The audio system 401 may include a vehicle speed sensor 415 and a brake sensor 416 (e.g., a sensor configured to detect the amount of brake application). The control device 404 may determine, based on the vehicle speed acquired by the speed sensor 415 and the brake application status acquired by the brake sensor 416, the time of providing guidance to passengers and the level of notification to passengers. For example, when the vehicle speed is higher than a predetermined value and the brakes are not applied, the control device 404 may determine the time of providing guidance to passengers earlier than otherwise. When the vehicle speed is greater than a predetermined value and the brakes are not applied, the control device 404 may set the level of notification to passengers to be higher than otherwise by increasing the volume of sound, increasing the level of vibration, or flashing lights, for example.

The control device 404 may switch between the headrest speakers 402 and the interior speakers 403 according to the statuses inside the vehicle or the use of the vehicle. For example, when the vehicle is used for car sharing, the control device 404 may provide sound output and music stream from the headrest speakers. When the control device 404 determines, e.g., based on the results of detection by the interior camera, that the vehicle is being used by a family member, the control device 404 may provide sound output and music stream from the interior speakers 403.

The audio system 401 may include a biometric sensor 418 capable of acquiring biometric information such as the body shape and seat height of a seated person. The biometric sensor 418 may comprise, for example, a body pressure sensor installed on the seating surface of a seat or an interior camera configured to capture images of a seated person. The control device 404 may control (select) a speaker (such as a headrest speaker 402) based on biometric information on a seated person acquired by the biometric sensor 418. The control device 404 may be configured to change the direction of sound output from speakers based on e.g., the body shape and seat height of a seated person acquired by the biometric sensor 418. (For example, when a seated person is a small person or a child, the control device 404 may change the direction of sound output from the headrest speakers 402 to a downward direction, or when a seat back 4 is equipped with a speaker, the control device 404 may provide sound output from the speaker in the seat back 4.) The control device 404 may acquire, from a seating sensor installed in each seat, information on the presence of a seated person on the seat, and when determining that there is no seated person on a seat, the control device 404 may stop providing sound output from the speaker(s) for the seat (such as a headrest speaker 402).

The audio system 401 may include a seat posture sensor 420 for detecting the posture of a seat. The seat posture sensor 420 may be, for example, a reclining angle sensor for detecting the reclining angle of a seat. When a seat is rotatably supported to be horizontally rotatable about a vertical axis with respect to the floor, the seat posture sensor 420 may be a rotation angle sensor for detecting the rotation angle of a seat.

The control device 404 may set the volume of sound output from a headrest speaker 402 based on the reclining angle acquired by the seat posture sensor 420. Specifically, the control device 404 may decrease the volume of sound output from the headrest speakers 402 to decrease with increasing reclining angle. As a result, the more the seat is reclined and thus the smaller the distance between the head of a seated person and the headrest H, the smaller the volume of sound output from the headrest speakers 402, which improves the comfort of the seat.

The control device 404 may, based on the rotation angle of a seat acquired by the seat posture sensor 420, limit the sound volume and change the direction of sound output from the headrest speaker 402 and the seat back speaker 405 of the seat. Specifically, when determining, based on the rotation angle of a seat, that the sound output direction from the headrest speakers 402 or that of the seat back speakers 405 of the seat is directed toward a different passenger from the seated person and thus the sound output affects the different passenger, the control device 404 may limit the volume of sound output from headrest speaker 402 and the seat back speaker 405 to thereby reduce the volume of sound (or mute the sound) in the vehicle interior, reducing the undesirable effect on other passengers. The control device 404 may also change the direction of sound output from the headrest speakers 402 and the seat back speakers 405 for the same purpose.

The audio system 401 may include a distance measuring sensor 421 for detecting a distance between the headrest H equipped with a speaker and an object (e.g., the head of a seated person) located in front of the headrest H. The control device 404 may determine and set the volume and characteristics of sound output from the headrest speakers 402 based on the distance acquired by the distance measuring sensor 421. The distance measuring sensor 421 may be, for example, a radio-wave-based sensor or an infrared-radiation-based sensor. The control device 404 may determine the presence of a seated person based on the distance acquired by the distance measuring sensor 421. When two speakers are provided in the headrest H as described above, the distance measuring sensor 421 may be located between the two headrest speakers 402 or at a position that does not overlap the headrest speakers 402.

When the distance acquired by the distance measuring sensor 421 at a seat is greater than a first threshold value (this happens e.g., when the passenger is eating), the control device 404 may set the volume of the sound output from headrest speaker 402 or the interior speaker 403 to be higher than when the volume is less than the first threshold value. When the distance acquired by the distance measuring sensor 421 at a seat is greater than a second threshold value that is greater than the first threshold value, the control device 404 may stop providing sound output from the headrest speaker 402 or the interior speaker 403. The control device 404 may change the volume of sound output from the headrest speakers 402 or the interior speaker 403 based on the input to the smartphone held by a passenger. In this case, the smartphone may be with a dedicated application installed that is used to change the volume of output from the headrest speakers 402 and the interior speakers 403. When the application is executed, the smartphone may pair with the control device 404 and, for example, in response to an input to the smartphone, a corresponding sound output or music stream may be output from the speakers.

The audio system 401 may include a bone conduction speaker 422 installed in a headrest H, in addition to the speakers described above. When determining that the head of a seated person is in contact with the headrest H based on the distance acquired by the distance measuring sensor 421, the control device 404 may provide sound output from the bone conduction speaker 422 in place of the speakers described above. The control device 404 may move the headrest H to bring the headrest H into contact with the head, neck, and shoulders of a seated person before providing sound output from the bone conduction speaker 422. In some cases, the control device 404 may be configured such that, when sound is to be conveyed only to a seated person, the system provides sound output from the bone conduction speaker 422, and otherwise from the speakers described above. In cases where the neck pad, headrest H, and/or seat back 4 are provided with air cells and the vibrating device 412 is located on a seated person's side of the air cells, the control device 404 may drive the vibrating device 412 as the bone conduction speaker 422. In this case, the vibrating device 412 may be configured to provide massage effect to the seated person by pressing part of the seated person's body as appropriate.

The audio system 401 may include a scent releasing device 423 configured to release scent into the vehicle interior. The scent releasing device 423 may be provided in a headrest 1. The control device 404 may change the type of scent released from the scent releasing device 423 according to the sound produced by the speakers. For example, the scent can be changed depending on the situation of a movie shown on a monitor or any other display device in the vehicle.

The audio system 401 may identify a seated person based on information acquired by the biometric sensor 418 (such as an interior camera) and determine the type of aroma to be released from the scent releasing device 423 for the identified seated person. Preferably, the outlet of the scent releasing device 423 is retractable when not in use, and that it be rotatable or sliding retractable. The scent releasing device 423 may be capable of creating (designing) an original scent by blending different scents from multiple aromatic cartridges.

When determining, based on signals from the biometric sensor 418, that a seated person is wearing a mask, the control device 404 may control the scent releasing device 423 so as to release the strong level of scent compared to when determining that the seated person is not wearing a mask. The audio system 401 includes an air conditioning device 424, and the control device 404 can acquire information from the air conditioning device 424 as to whether the air conditioning device 424 is operating. When the air conditioning device 424 is operating, the control device 404 may limit or stop the release of scents from the scent releasing device 423. When detecting that a window is open by using an interior camera or any other device, the control device 404 may limit or stop the release of scents from the scent releasing device 423.

The headrest H may be provided with a duct(s) to direct the scent released from the scent releasing device 423. For example, the duct may be formed to extend across the interior of the sealed core 17. Alternatively, the duct may be formed outside of the core 17. When the duct is provided within the core 17, the duct may be located away from the speakers. The core 17, which contains speakers, may form part of the duct. The scent releasing device 423 may be configured to use the vibration of a speaker as a pump to release scents. A passageway for directing sound frontward from a speaker may serve as a duct for directing scents from the scent releasing device 423.

The headrest speaker 402 may be wirelessly powered by a power feeding device 426 provided at the top of the seat back 4. The headrest speaker 402 may be provided with a battery. The battery may be configured to be charged when a seated person is not present. The battery may be removable from the headrest 1. The power feeding device 426 provided at the upper end of the seat back 4 may be used to power a device such as a terminal device (such as a smartphone) held by a seated person The power feeding device 426 may be provided with a mechanical structure (such as ribs) to hold a terminal device, and may also have an anti-misplacement function. The system may be configured such that, in addition to the battery, the devices 15 in the headrest 1 (such as speakers, scent releasing device 423, vibrating device 412, and communication device) are also removable and replaceable from the outside.

The audio system 401 may include a display 428 and a projector 430. The display 428 may be located on the back of the headrest 1 or may be a head-up display.
A duct (not shown) extending in the front-rear direction may be connected to the speaker in the headrest 1, and the duct may have a valve element (not shown) that can be used to switch the direction of sound output from the speaker. When a screen image is displayed on the display 428, the control device 404 may control the valve element so as to transmit sound rearward, depending on the screen image.

The control device 404 may enable various devices and switches to operate in coordination with each other, the devices including the speakers, the lighting device 414, the car navigation device 406, the display 428, the projector 430, the scent releasing device 423, and the air conditioning device 424. The audio system 401 may function as a cinema system configured to deliver a realistic multi-sensory cinematic experience (4DX-type system).

When detecting an abnormality in one of the speakers, the control device 404 may stop providing sound output from the detected speaker and start producing sound from another speaker. Specifically, upon detection of an abnormality in the headrest speaker 402 of a certain seat, the control device 404 may provide sound output from an interior speaker 403 (such as door speaker) provided on the side of the seat. Upon detection of abnormalities in the headrest speaker 402 of a certain seat and the interior speaker 403 provided on the side of the seat, the control device 404 may start providing sound output from another speaker located around the seat.

When an abnormality is detected in the driver's headrest speaker 402, the control device 404 may provide driver assistance information from a different speaker (such as an interior speaker 403 or a speaker installed in a seat other than the driver's seat). In this case, when another speaker provides sound output, the control device 404 may change the output direction to a different direction so as to transmit more sound to the driver. The control device 404 may activate the vibrating device 412 or the lighting device 414 to provide a notification to the driver.

When detecting an abnormality in any one of the speakers installed in the driver's seat, the speakers installed in seats other than the driver's seat, and the interior speakers 403, the control device 404 may display the location of a troubled speaker (i.e., a speaker where the abnormality has been detected) on the display 428 or a touch panel of the navigation device, while restricting (stopping) providing sound output from the troubled speaker.

When an abnormality is detected in at least one of the speakers installed in a seat, the control device 404 may restrict (stop) the operation of the troubled speaker where the abnormality is detected, while starting providing sound output from an interior speaker 403 (such as a door speaker, speakers installed in a tray or any other part of the vehicle) located near the troubled speaker or from a speaker installed in another seat. In this case, the control device 404 may increase the volume of sound output from an interior speaker 403 or another speaker installed in a different seat, compared to the volume of sound that is usually provided from the same speaker, or may change the direction of sounds from the same speaker. Concurrently with this operation, the control device 404 may drive the vibrating device 412, or flash the lighting device 414.

In cases where the control device 404 provides sound output regarding driver assistance information from a speaker into the vehicle interior, when the microphone 407 does not acquire a corresponding passenger's voice in response (i.e., the passenger does not respond), the control device may provide a notification to the passenger again by generating louder sound from the speaker, driving the vibrating device 412, flashing the lighting device 414, and/or performing other operations.

<Door Touch Sensor>.

Known vehicle interior parts include a door interior structure 500 with a vehicle interior trim 501 forming the interior side of a vehicle (e.g., see WO2020/204174A). A touch switch 502 is provided on the interior side of the vehicle interior trim 501 to receive an input operation by a seated person in the vehicle. As a measure against vehicle vibration, there is a growing need for the development of technology used to more firmly secure a flat cable 503 connected to the touch switch 502. In the following, the vehicle interior trim 501 with improved fixation of the flat cable 503 will be described, where the flat cable is connected to the touch switch 502.

Figure 13:
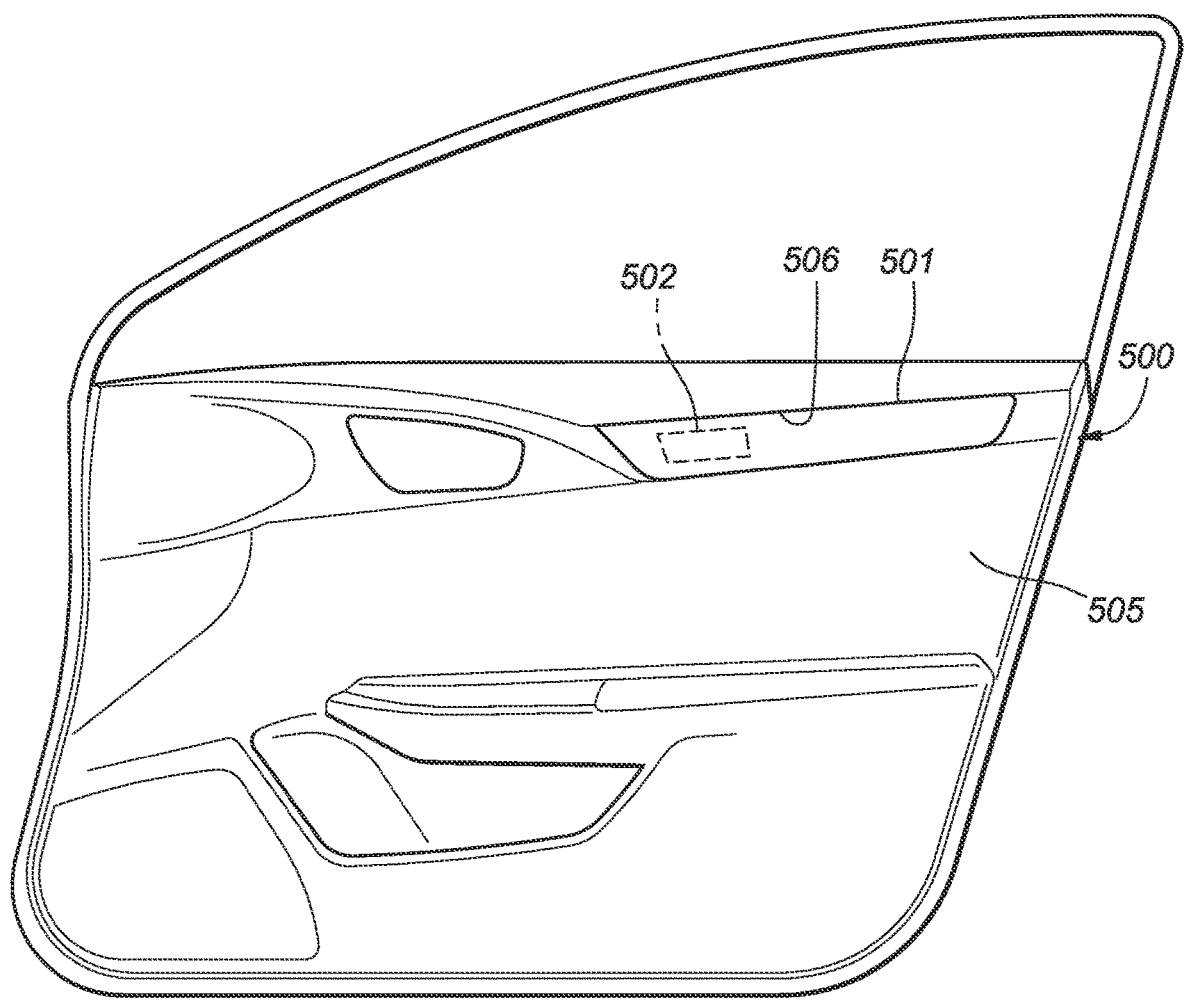
FIG. 13 is a side view of a door interior structure.
Figure 14A:
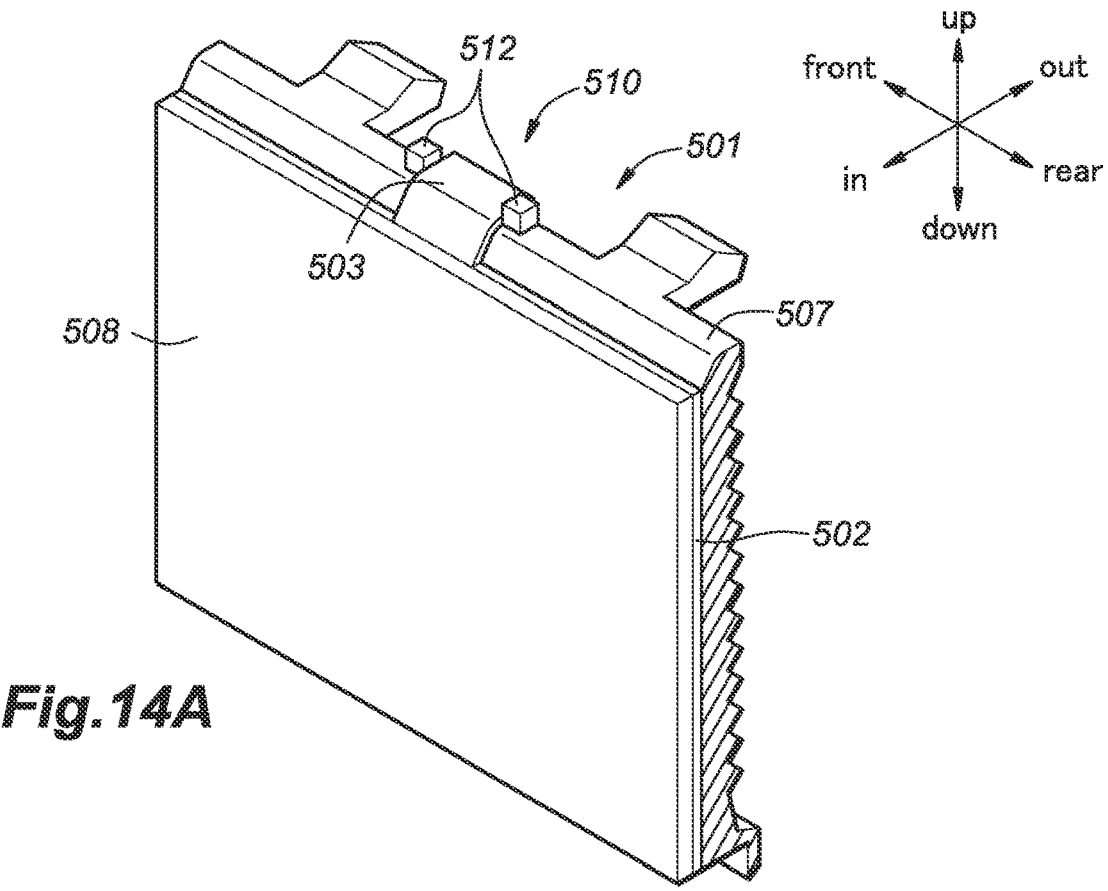
FIGS. 14A and 14B are respective perspective views of first and second examples of a flat cable fixing arrangement.

As shown in FIG. 13, the vehicle interior trim 501 is provided on the door interior structure 500 of a vehicle door and forms the interior side of the door interior structure 500. In other words, the door interior structure 500 includes a door interior structure body 505 and the vehicle interior trim 501. The door interior structure body 505 has an aperture 506 extending therethrough in a vehicle width direction, so that the vehicle interior trim 501 is fitted into the aperture 506 from the outer side of the vehicle. As shown in FIG. 14A, the vehicle interior trim 501 includes a touch switch 502 for controlling in-vehicle devices installed in the vehicle and a decorative panel 507 with an ornamental design. The decorative panel 507 has a surface facing the interior of the vehicle.

The touch switch 502 may be comprised primarily of a so-called membrane switch. The touch switch 502 has a plurality of electrodes for receiving a passenger's input operation. The electrodes of the touch switch 502 are arranged along the surface of the decorative panel 507 facing the interior of the vehicle. A decorative film 508 is attached to the outer surface of the touch switch 502.

A touch operation on the touch switch 502 is detected as a change in capacitance between the electrodes or a change in resistance. A flat cable 503 (also called "a connection") is connected to the electrodes. In some cases, fixation of such a flat cable 503 is desirably enhanced, which can be a countermeasure against vibration in a vehicle (in particular, while the vehicle is traveling on a rough road).

A solution to meet such a need may include a fixing arrangement 510 for fixing a flat cable 503 to the decorative panel 507 (a base member). As used herein, the term "fixing arrangement collectively refers to any of parts or features of one or more elements (e.g., decorative panel and flat cable itself) for fixing the flat cable. In the following, some aspects of the fixing arrangement 510 (fixing device) will be described with reference to the respective embodiments.

Figure 14B:
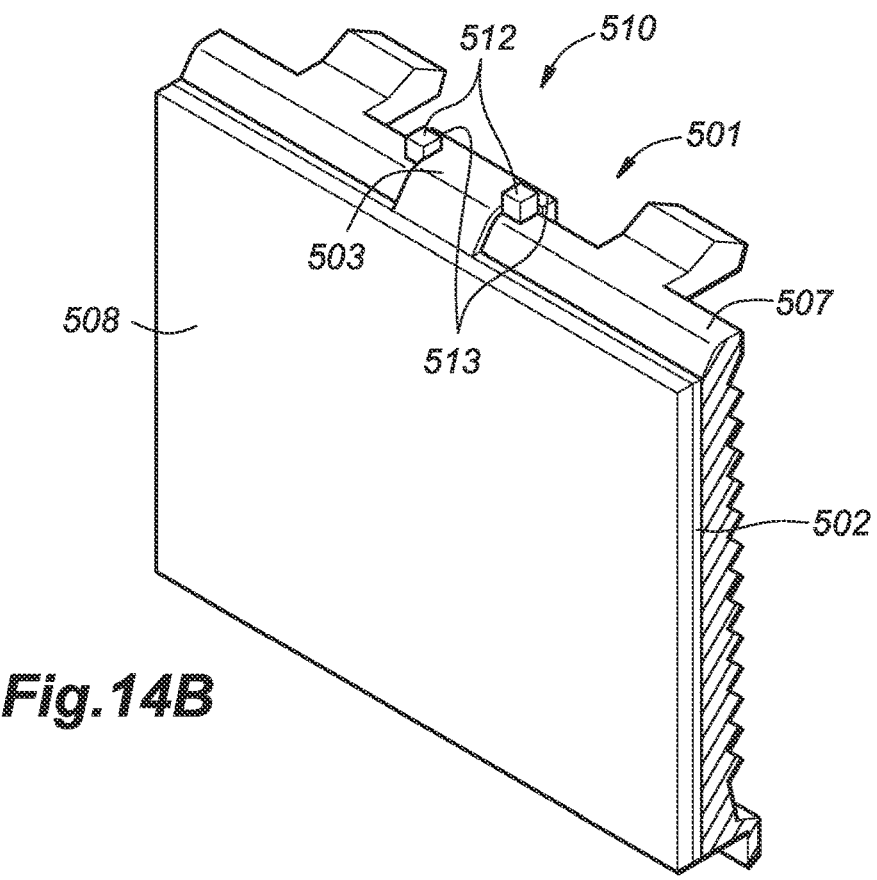

As shown in FIG. 14A, the fixing arrangement 510 for fixing the flat cable 503 may include two protruding portions 512 provided at and protruding upward from the top edge of the decorative panel 507. The protruding portions 512 have side surfaces (respective sides) located opposite to each other such that, when the flat cable is mounted, the side surface of each protruding portion 512 faces and contacts the mounted flat cable 503. This feature provides positioning of the flat cable 503 and prevents the flat cable 503 from coming loose and swinging. As shown in FIG. 14B, the flat cable 503 may include stepped side edges 513 where the width of the flat cable changes such that, when the flat cable 503 is mounted, the stepped side edges 513 abut the respective protruding portions 512 to thereby prevent movement of the flat cable. As such, the stepped side edges 513 are included in the fixing arrangement 510. This feature further improves fixation of the flat cable 503.

Figure 15A:
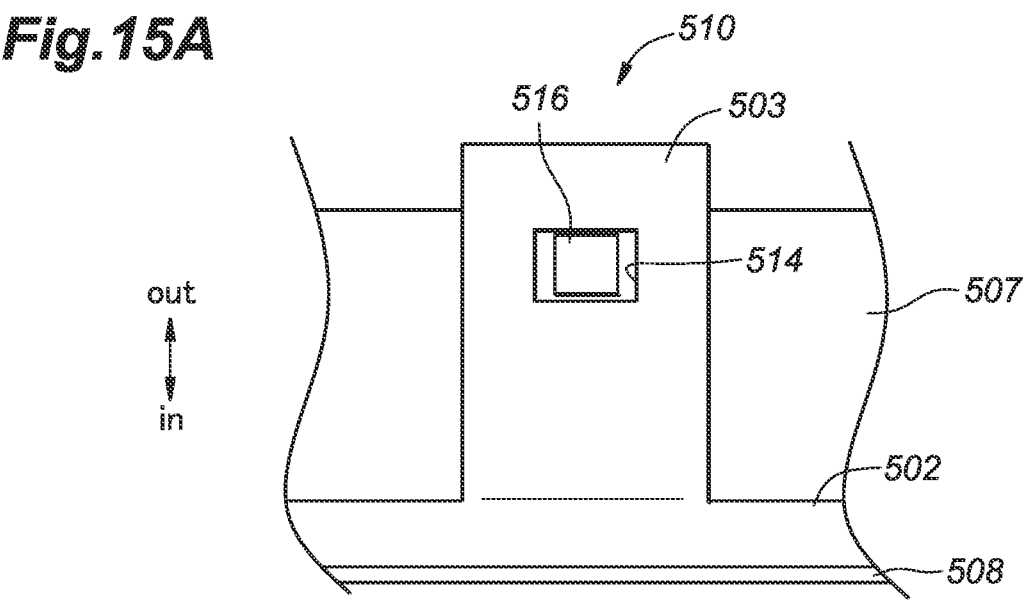
FIG. 15A is a top view of a third example of the flat cable fixing arrangement.

As shown in FIG. 15A, an opening 514 may be defined in a flat cable 503 and a protruding portion 516 may be provided on the decorative panel such that, when the flat cable 503 is mounted, the protruding portion 516 can be inserted into the opening 514 to thereby preventing the movement of the flat cable 503. As such, a combination of the protruding portion and the opening 514 defined in the flat cable 503 is included in the fixing arrangement 510. This feature further improves fixation of the flat cable 503.

Figure 15B:
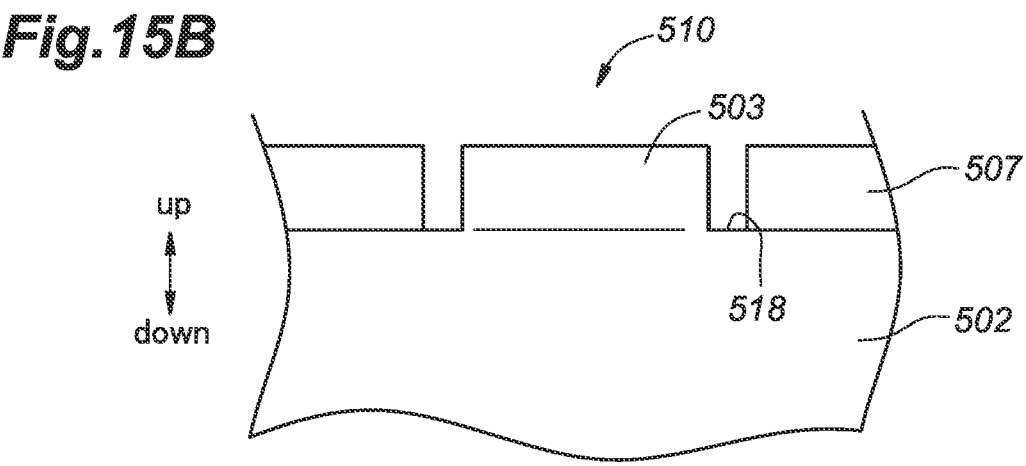
FIG. 15B is a front view of a fourth example of the flat cable fixing arrangement.

As shown in FIG. 15B, the fixing arrangement 510 may recesses 518 defined in the surface of the decorative panel 507, each recess 518 being configured to accommodate a flat cable 503. The width (in the front-rear direction) of each recess 518 is preferably approximately equal to that of a flat cable 503 so that the flat cable 503 can be fitted in the recess 518. This feature improves fixation of the flat cable 503.

Figure 15C:
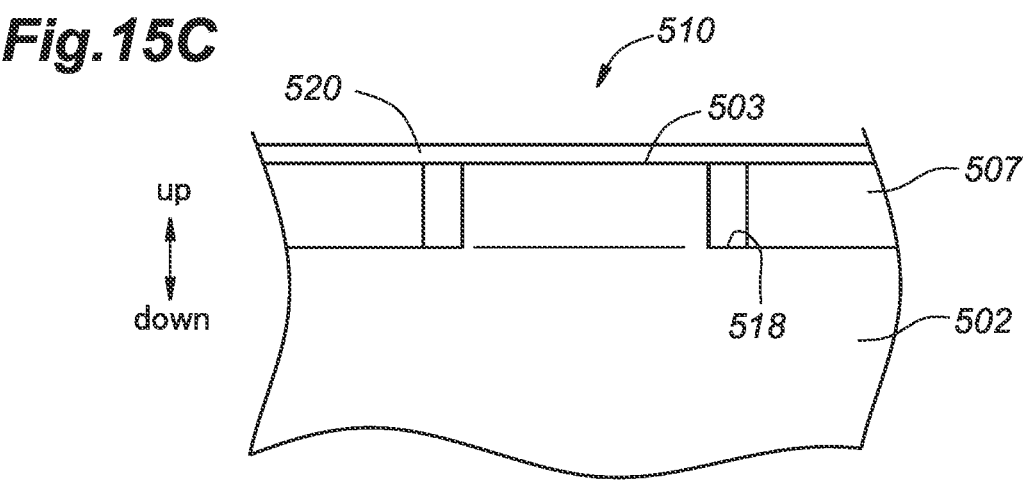
FIG. 15C is a front view of a fifth example of the flat cable fixing arrangement.

As shown in FIG. 15C, the fixing arrangement 510 may include a protective sheet member 520, the sheet member being provided on the decorative panel 507 so as to cover the recesses 518 for accommodating flat cables 503. The protective sheet member 520 can protect the mounted flat cables 503.

Figure 16A:
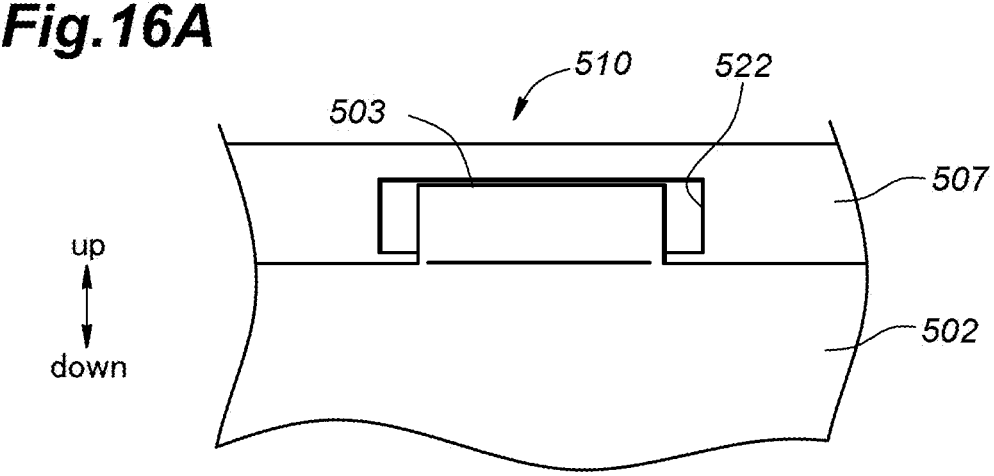
FIG. 16A is a front view of a fifth example of the flat cable fixing arrangement.
Figure 16B:
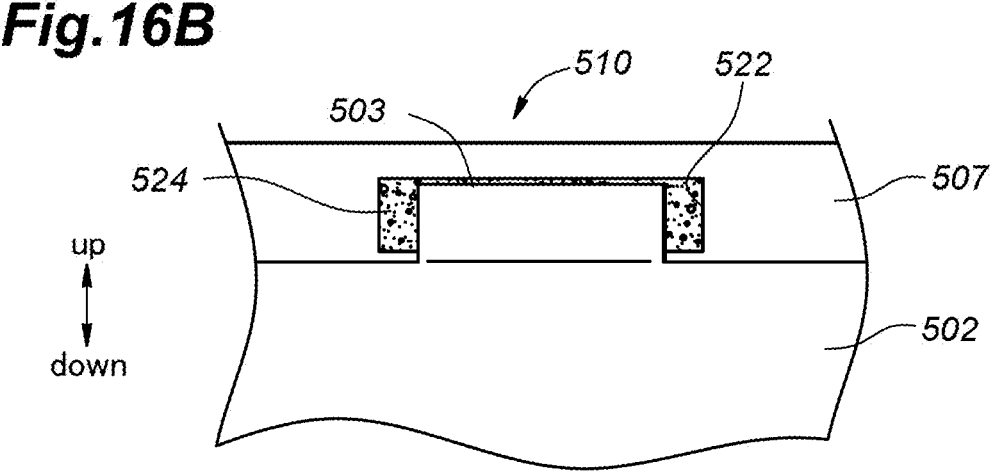
FIG. 16B is a front view of a sixth example of the flat cable fixing arrangement.

As shown in FIG. 16A, the fixing arrangement 510 may include a through hole 522 defined in the decorative panel 507 through which a flat cable 503 can be inserted. Providing a flat cable 503 so as to pass through the through hole 522 improves the fixation of the flat cable 503. In other cases, as shown in FIG. 16B, the fixing arrangement 510 may include, in addition to the through hole 522 defined in the decorative panel 507, a putty material 524 for securing the flat cable 503 to the through hole 522. For example, the putty material 524 may be provided to seal the flat cable 503 and the wall surface of the through hole, and may be formed of, for example, a nonwoven fabric. This feature can prevent the flat cable 503 from being affected by vehicle vibration and 3 from falling out, and furthermore, improve fixation of the flat cable 503. In this case, the electrically insulating nonwoven fabric material is provided between the wall surface of the through hole 522 and the flat cable 503, thereby preventing wiring in the flat cable 503 from contacting the vehicle interior trim 501 or the door panel leading, and thus preventing short-circuiting the wiring of the flat cable 503 to the ground.

In other embodiments, the vehicle interior trim 501 may be formed by arranging a frat cable 503 on the putty material 524, and insert molding the decorative panel 507, the flat cable 503, and the putty material 524 together to form one-piece part. This configuration improves fixation of the flat cable 503 because the flat cable 503 is formed integrally with the decorative panel 507.

When the door is opened, rainwater or other liquids can splash on the door interior structure 500 and adhere to the electrodes of the touch switches 502. Thus, it is desirable to provide a measure to prevent rainwater from adhering to the vehicle interior trim 501.

Figure 17:
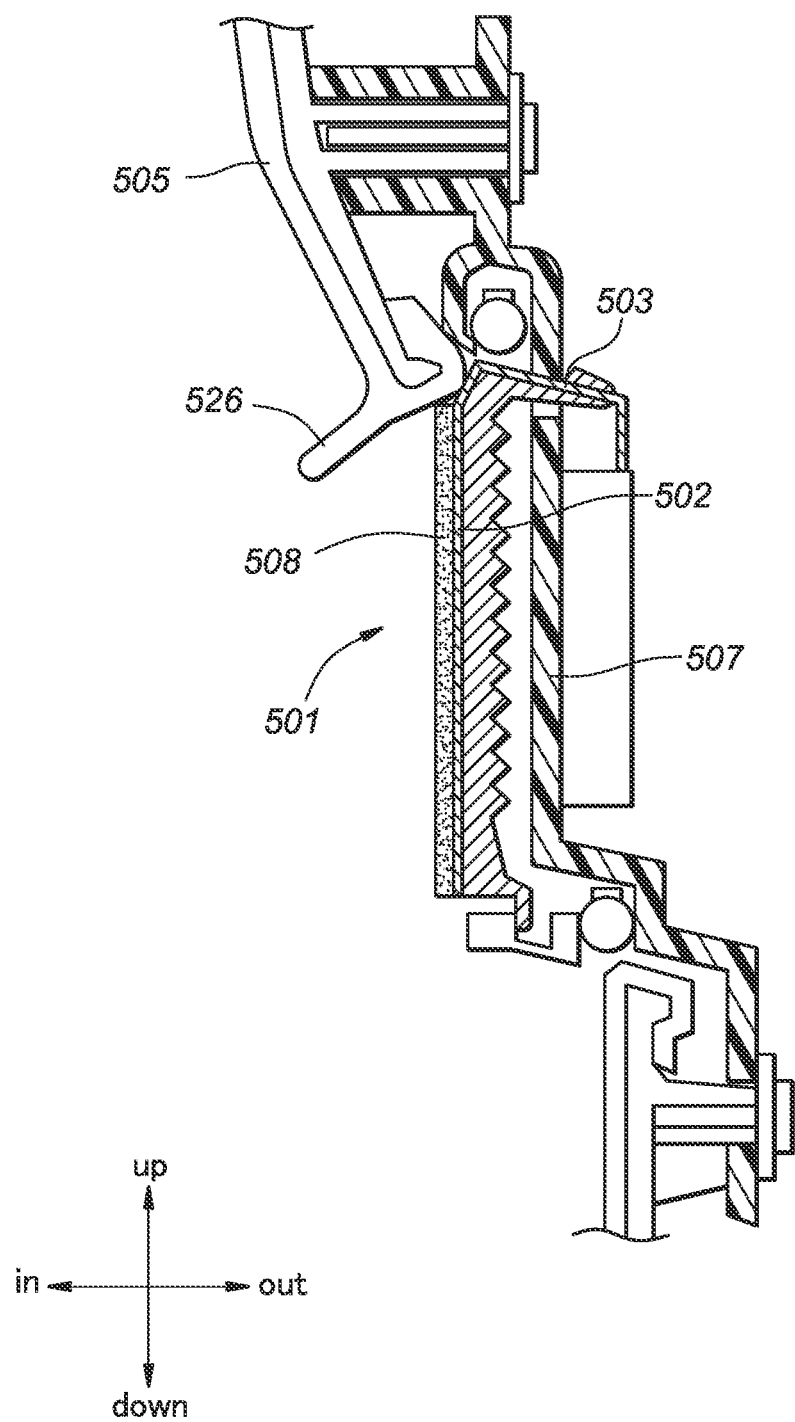
FIG. 17 is a cross-sectional view of a variant of the door interior structure.

As shown in FIG. 17, one possible solution is to provide a visor portion 526 at a location above and adjacent to the vehicle interior trim 501 of the door interior structure body 505 such that the visor portion 526 extends obliquely downward toward the interior side of the door. The visor portion 526 is in the form of a visor covering the touch switch 502 from diagonally above. The visor portion 526 prevents water adhering to the inner surface of the door interior structure 500 above the touch switch 502 from dripping downward to reach the electrodes of the touch switch 502.

The visor portion 526 may be disposed above the flat cable 503 extending above the vehicle interior trim 501. The visor portion 526 may be disposed below the vehicle interior trim 501 to prevent water from entering the flat cable 503.

In some cases, the touch switches 502 may be coated with a hydrophilic coating material. A water drainage channel may be provided on the interior of the door interior structure 500 so as to avoid the touch switch 502.

Although, in the above-described embodiments, the touch switch 502 is a membrane switch, the configuration of a touch switch is not limited to this. For example, the touch switch 502 may be a button displayed on a touch panel. The touch panel may be connected to the control device via a flat cable 503 so that the control device can receive an input operation to the touch panel and control screens displayed on the touch panel.

When receiving an input operation to the touch switch 502, the control device may control the touch panel to show a screen with highlight on a location where the input operation has been made. When being connected to a microphone capable of acquiring a passenger's voice, the control device may change the degree of screen highlight depending on the passenger's voice. Specifically, when a passenger speaks "seat reclining," the control device may control the touch panel to display a screen indicating only switches associated with seat reclining. In other cases, when the interior of the door interior structure 500 is provided with a sensor for detecting the posture of a seat (such as reclining angle), the control device may be connected to the sensor, and may control the touch panel to display a button at different positions in the screen that are determined based on the result of the detection by the sensor.

In some cases, a plurality of touch switches 502 may be provided, and each of the touch switches 502 may have a light emitting element. Preferably, each light emitting element of a corresponding touch switch is controlled to emit light or blink, thereby allowing a passenger or driver to recognize which of the touch switches 502 received an input operation. The position of a touch switch 502 capable of receiving an input operation may be changed depending on the posture of the seat located on the interior of the door interior structure 500. For example, when touch switches 502 are provided on the door side of a seat in a line along the front-rear direction and the seat is relined to a certain angle (e.g., the reclining angle is greater than a predetermined threshold value), a switch located in a relatively rear portion of the door is preferably activated to emit light (i.e., the switch is ready to receive an input operation).

<Biometric Sensor System>

Known systems installed in a vehicle include a breathing support system for adjusting the breathing state of a seated person to a desirable respiratory condition (e.g., see WO2021/020523A). Meanwhile, sensing devices that have been developed include sensors configured to acquire information other than breathing-related information such as heartbeat and pulse from the seated person. Under the circumstances, there is a need for a biometric sensor system 601 that can acquire various types of biometric information from a seated person and provide new services based on the acquired biometric information. In the following, a biometric sensor system 601 configured to provide various services based on biometric information acquired by sensors will be described.

The biometric sensor system 601 is installed in a vehicle such as an automobile. As shown in FIG. 18, the biometric sensor system 601 comprises: a biometric sensor 602 installed in a seat in a vehicle interior; a control device 603 (ECU) capable of acquiring information from the biometric sensor 602; a battery 604 for supplying power to the control device 603; a communication device 605 configured to mediate communications between one control device 603 and an external device; and a notification device 606 for providing notifications or alarms to persons inside and outside the vehicle.

The biometric sensor 602 is installed in each seat so that each biometric sensor can acquire biometric information of a seated person seated on corresponding seat. Examples of biometric information acquired by the biometric sensor 602 may include information that can be used to detect a seated person's respiration (e.g., respiratory rate), heartbeat (e.g., heart rate), pulse (e.g., pulse rate), odor from the body, and pressure (body pressure) applied to the seat surface. The biometric sensor 602 may include multiple devices (e.g., semiconductor devices) or may be a single device. For example, such a biometric device may comprise a resistive pressure-sensitive sensor having electrodes which are arranged on a pad of a seat cushion such that one electrode is overlaid on the other, wherein a resistance value between the electrodes changes according to respiration, heartbeat, or other conditions of a seated person on the seat cushion.

The control device 603 includes a microcomputer with a central processing unit 610 (CPU), a RAM 611, a ROM 612, and a memory device 613 such as SSD or HDD.

The control device 603 may receive information acquired by the biometric sensor 602 and store the information in the memory device 613. The information stored in the memory device 613 may include, for example, biometric information such as information on a person's heartbeat, respiration, pulse wave, body odor, and body pressure. The control device 603 can detect an abnormality occurred in a driver's body (e.g., cardiac arrest) based on the received information stored in the memory device 613 and the result of detection of the biometric sensor 602.

The control device 603 may be connected to a vehicle behavior sensor 607, such as a vehicle speed sensor or acceleration sensor. As a result, the control device 603 can determine, based on the result of detection of the vehicle behavior sensor 607, whether or not an accident has occurred in a vehicle equipped with the biometric sensor system 601.

The control device 603 may also be connected to an autonomous driving assist system for autonomous driving of the vehicle.

The communication device 605 mediates communications between the control device 603 and a mobile terminal 608 (such as a smartphone) carried by a seated person or between the control device 603 and an emergency center 609. The communication device 605 mediates short-range wireless communications (such as Wi-Fi) between the control device 603 and a terminal(s) 608, and also may mediate packet communications or voice communications between the control device 603 and a server(s) in the emergency center 609.

The notification device 606 provides notifications or alarms to persons inside and outside the vehicle, and may be a speaker for transmitting sound to inside and outside the vehicle or a light emitting device for emitting light to t inside and outside the vehicle.

The terminal 608 may communicate (pairing) with the control device 603 via the communication device 605, and also may be configured to receive information acquired by the biometric sensor 602 (such as heart rate, or respiratory rate) and display it on the screen.

When determining that an accident has occurred based on the result of detection of the vehicle behavior sensor 607 or that an abnormality has occurred in the driver based on information from the biometric sensor 602, the control device 603 may activate and allow the notification device 606 to inform persons the outside of the vehicle, of the occurrence of the accident by sound or light. This configuration allows an accident and a driver's abnormality to be notified to outside the vehicle even when the communication device 605 cannot communicate with the emergency center 609. Preferably, the control device 603 changes the volume and pitch of sound or the intensity or color of light in order to report the urgency of a driver's rescue to the outside.

When determining that an abnormality of a driver occurs, the control device 603 may connect to the emergency center 609, and the provide audio and voice from the emergency center 609 to the interior of the vehicle by a speaker. In some cases, the control device 603 may control the terminal 608 to thereby cause the terminal 608 to connect to the emergency center 609. This configuration enables communications between the emergency center 609 and the driver through the terminal 608, which allows for providing proper rescue of the driver.

The control device 603 may be configured such that the control device 603 can control the seat. In this case, when determining that an accident has occurred based on the result of detection of the vehicle behavior sensor 607 or when detecting occurrence of an abnormality in the drover's body based on information from the biometric sensor 602, the control device 60 controls the seat. In other cases, the control device 603 may be configured such that the control device 603 can control a seat heater provided in the seat. In this case, when determining that an accident has occurred based on the result of detection of the vehicle behavior sensor 607 or when detecting occurrence of an abnormality in the drover's body based on information from the biometric sensor 602, the control device 60 controls the heat heater to warm a seated person.

The terminal 608 may be configured such that the terminal can acquire biometric information stored in the memory device 613 in the control device 603. This configuration allows the terminal 608 to acquire historical biometric information and, for example, use the information to diagnose the physical condition of a passenger in a hospital.

When the control device 603 detects, based on the body pressure acquired by the biometric sensor 602, a collapse of the driver's posture due to fainting, for example, the control device 603 may notify the autonomous driving assist system to autonomously drive the vehicle to a stop at the edge of the road.

When determining that an accident has occurred based on the results of detection of the vehicle behavior sensor 607, the control device 603 may determine the pressure distribution on the seating surface based on information acquired by the biometric sensor 602 and transmit the pressure distribution to an external server. This feature allows, for example, a rescuer performing a rescue to know, for example, the posture of a passenger trapped in the vehicle due to the accident, based on the pressure distribution. In such case, the rescuer preferably links (or uses together) information acquired by the biometric sensor 602 with information recorded by the drive recorder installed in the vehicle.

<Vibrating Device>

Known technical ideas include a seat 701 provided with a vibrating device 702 for generating vibration which is used to notify a seated person of prescribed information (e.g., see JP2020-152377A); and another seat 701 provided with a ventilation groove 703 therein, the ventilation path being used to blow air to and exhaust air from the seating surface (e.g., see JP2020-110702A).

In terms of effective transmission of vibration to a seated person, the vibrating device 702 is preferably provided on the side of the seating surface of the pad member 704. However, the ventilation groove 703 extending partially on the seating surface can limit places where the vibrating device 702 can be located. Under the circumstances, there is a need for a seat in which a ventilation groove 703 and a vibrating device 702 can be properly arranged so that vibration can be more effectively transmitted to a seated person.

Figure 19A:
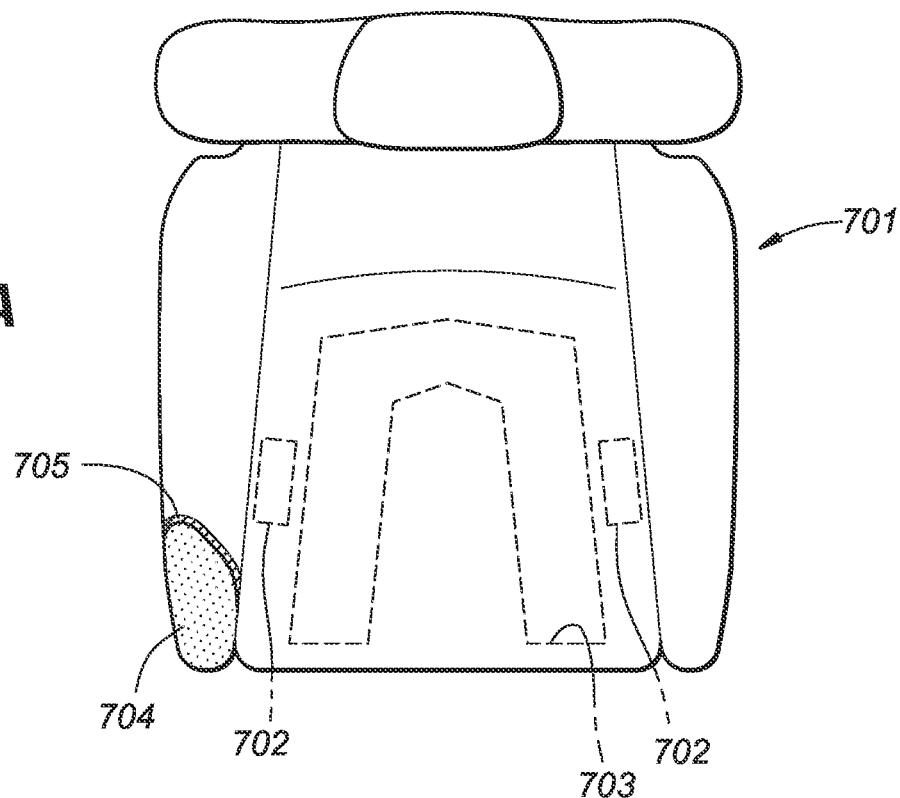
FIGS. 19A and 19B are first and second examples of the arrangement of vibrating devices.

A seat configured to meet this need will be described. As shown in FIG. 19A, a seat 701 includes a pad member 704, a skin material 705 covering an outer surface of the pad member 704, a ventilation groove 703 and a vibrating device 702. The ventilation groove 703 has a portion extending on the surface (seated person side surface) of the pad member 704; and the vibrating device 702 is provided on the seated person side surface of the pad member 704, wherein the vibrating device 702 is preferably located at a position where the ventilation groove 703 is not formed. This configuration allows the ventilation groove 703 to be provided on the surface of pad member 704. In addition, since only the skin material 705 is provided between the vibrating device 702 and a seated person, this configuration allows vibration to be effectively transmitted to the seated person.

Figure 19B:
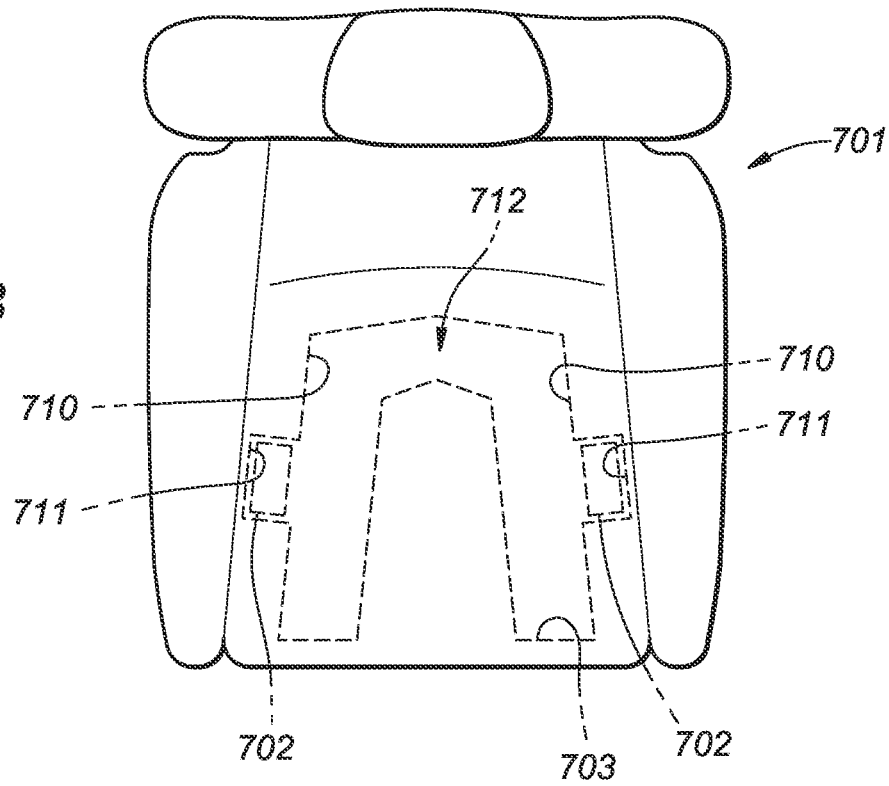

In another embodiment, as shown in FIG. 19B, a seat 701 includes a pad member 704, a skin material 705 covering an outer surface of the pad member 704, a ventilation groove 703, and a vibration device 707 in the ventilation groove 703. Preferably, the seated person side surface of the vibrating device 702 is flush with the surface of the pad member 704, where the ventilation groove 703 is not provided. In this configuration, a combination of the pad member 704 and vibrating device 702 form a smooth surface on the seat, which improves the comfort of the seat for a seated person. In addition, since only the skin material 705 is provided between the vibrating device 702 and a seated person, this configuration allows vibration to be effectively transmitted to the seated person.

The ventilation groove 703 has a straight section 710 extending in a straight line and a lateral recess 711 communicating with the straight section 710 and extending laterally from the straight section 710. The vibrating device 702 has a shape (box shape) that conforms to the lateral recess 711, and thus, when being placed in the seat, the vibrating device 702 may be housed in the lateral recess 711 to thereby seal the lateral recess 711. This configuration allows the vibrating device 702 and the ventilation groove 703 to form a straight ventilation channel 712; that is, the ventilation channel with a relatively smooth wall surface. The ventilation groove configured to have a straight ventilation channel 712 in the seat enables more enhanced ventilation compared to a zigzag-shaped ventilation channel.

Figure 20:
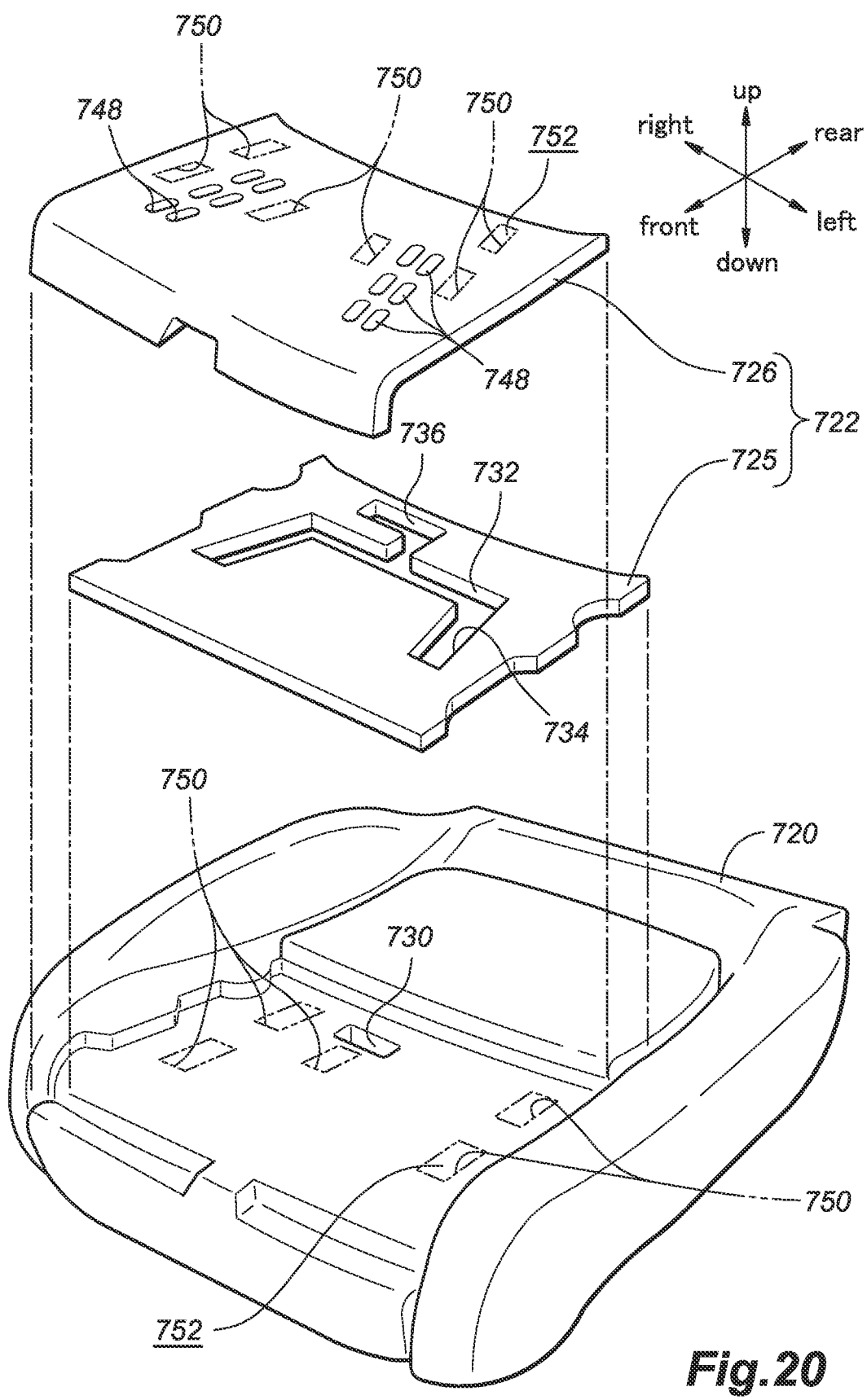
FIG. 20 is an exploded perspective view of a pad member for illustrating positions where the vibrating devices can be placed.

As shown in FIG. 20, the pad member 704 may comprise a pad body 720 and a cover pad 722 overlaid on the surface of the pad body 720. The cover pad 722 includes a sheet-shaped middle pad 725 and a sheet-shaped surface pad 726. A stack formed by the middle pad 725 and the surface pad 726 overlaid on the surface pad 726 is placed on the surface of the pad body 720.

The pad body 720 is provided with a body ventilation hole 730 vertically extending through the pad body 20. The middle pad 725 is provided with an intermediate ventilation groove 732 vertically extending through the middle pad 725. The intermediate ventilation groove 732 has a U-shaped groove section 734 extending in a U shape when viewed from above (surface side), and a branched groove section 736 branched from the U-shaped groove section 734. The surface pad 726 has cover ventilation holes 748 extending therethrough at locations which correspond to those within the U-shaped groove section 734 in the middle pad. When the cover pad 722 is overlaid on the pad body 720, the body ventilation hole 730 is at a location corresponding to that in the branched groove section 736 of the middle pad, and the cover ventilation holes 748 are at locations corresponding to those within the -shaped groove section 734 in the middle pad. As a result, ventilation paths are formed in the pad member 704 that extend through the body ventilation hole 730, the intermediate ventilation groove 732, and the cover ventilation hole 748 in this order.

Figure 21:
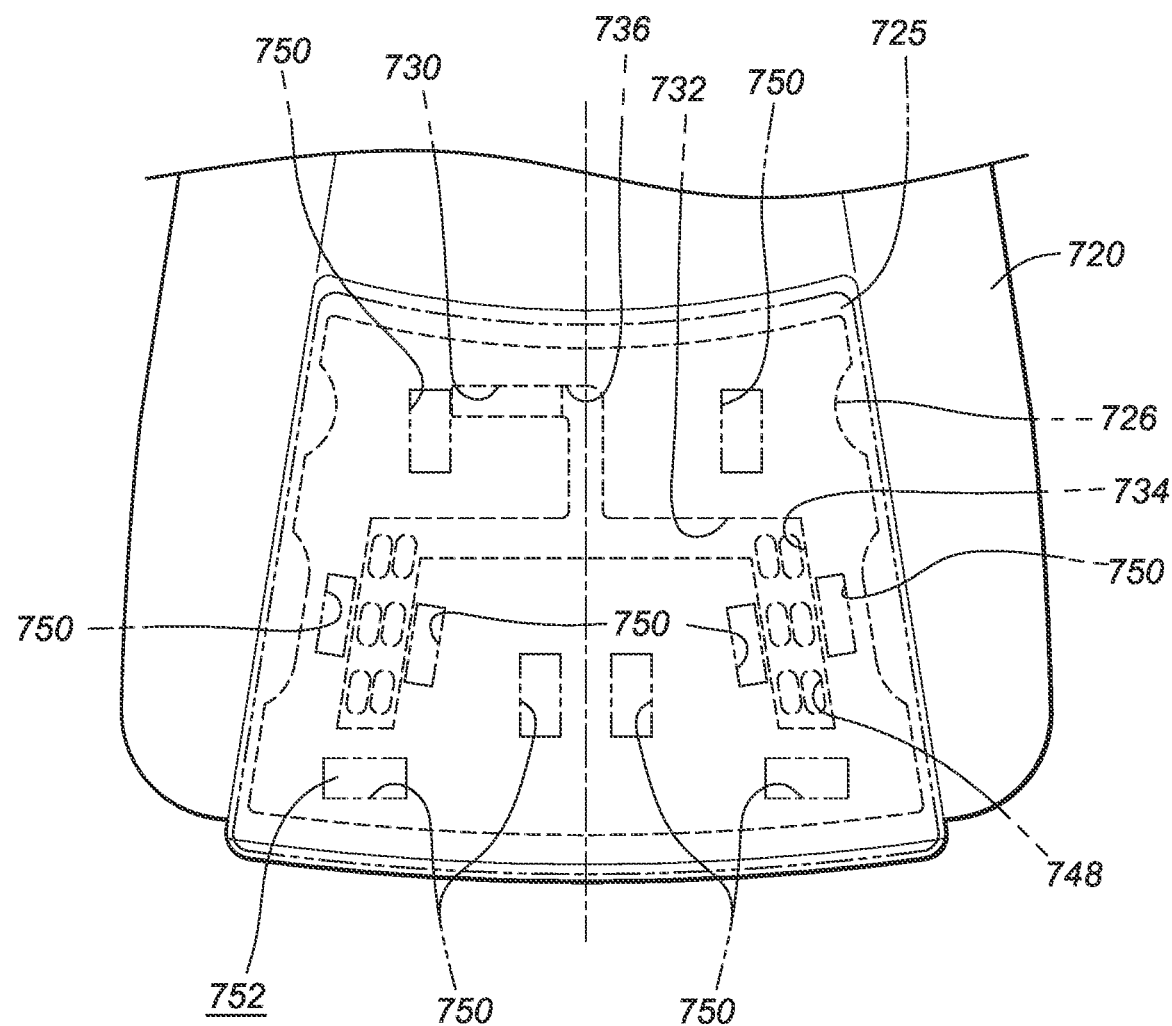
FIG. 21 is a top view of a seat cushion for illustrating the positions where the vibrating device can be placed.

As shown in FIG. 21, the surface of the middle pad 725 may define lateral recesses 750 that are recessed downward so that each recess 750 can accommodate a vibrating device 702. The recesses 750 may be provided at locations that do not correspond to the intermediate ventilation groove 732. In other embodiments, the recesses 750 may be provided so that the recesses 750 can communicate with the intermediate ventilation groove 732 when the middle pad 725 is overlaid. In such a case, each vibrating device 702 may be shaped to conform to a recess 750, and when the vibrating device 702 is accommodated in the recess 750, the recess 750 is preferably sealed. As a result, one surface of a vibrating device 702 defines a part of a ventilation path, and forms a straight line with the part of the ventilation path which part vertically corresponds to the middle pad 725 and laterally corresponds to a location near the vibrating device 702.

As shown in FIG. 20, recesses 750 for accommodating the vibrating devices 702 may be provided in the surface pad 726 or the pad body 720. When the recesses 750 are provided on the surface pad 726, each recess 750 is preferably provided at a location where the cover ventilation holes 748 are not formed. When the recesses 750 are provided on the pad body 720, the recesses 750 are preferably provided on the cover pad side surface of the pad body 720. The recesses 750 may be provided at locations where the body ventilation hole 730 is not formed. In other embodiments, a recess 750 may be provided at a location so that the recess 750 can communicate with the body ventilation hole 730.

In the embodiments described above, each recess 750 for accommodating the vibrating device 702 is formed in one of the pad body 720, the middle pad 725, and the surface pad 726, each defining a housing chamber 752 that can accommodate the whole vibrating device 702. However, the configuration of the housing chamber 752 is not limited to these embodiments.

Figure 22A:
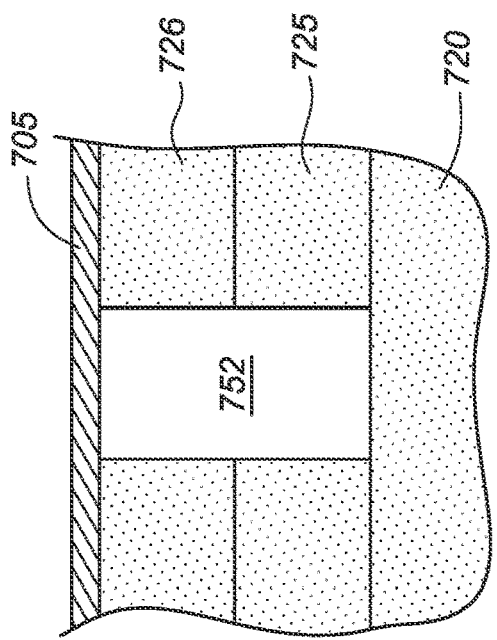
FIGS. 22A, 22B, 22C, and 22D are cross-sectional views of a pad member showing first, second, third, and sixth examples of a vibrating device chamber, respectively.
Figure 22B:
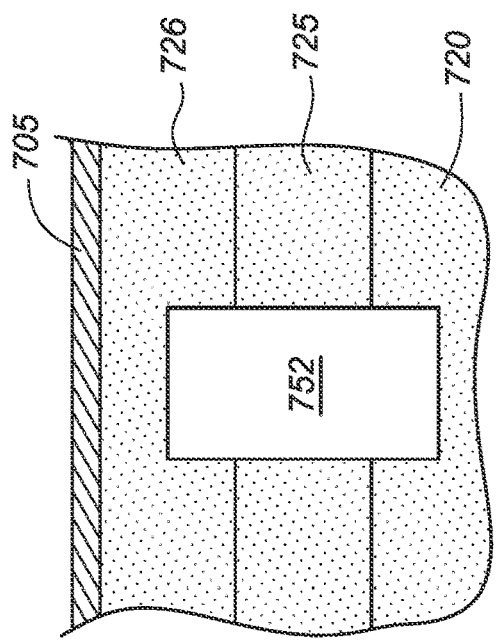
Figure 22C:
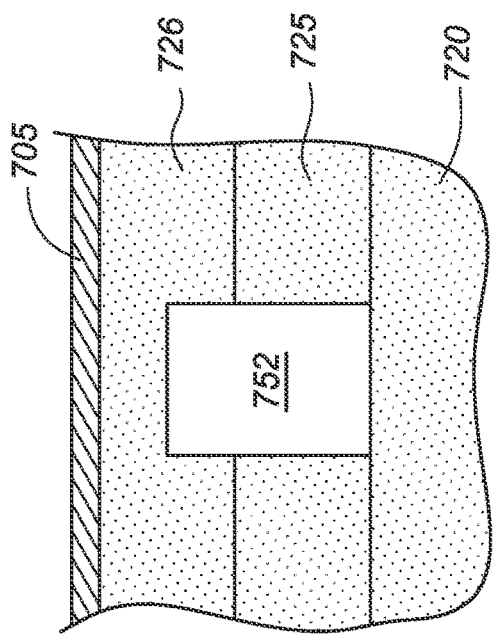
Figure 22D:
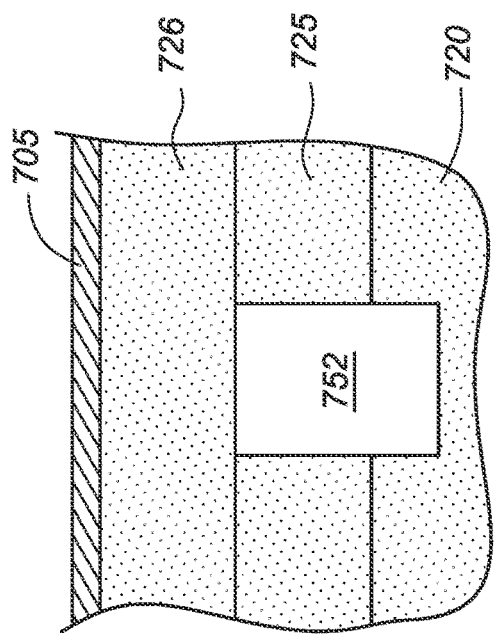

For example, as shown in FIG. 22A, the housing chamber 752 for accommodating a vibrating device 702 may be formed so as to extend across the surface pad 726 and the middle pad 725. As shown in FIG. 22B, the housing chamber 752 may be formed so as to extend through the middle pad 725 and across the middle pad 725 and the pad body 20. As shown in FIG. 22C, the housing chamber 752 for accommodating a vibrating device 702 may be formed so as to extend across and through the surface pad 726 and the middle pad 725. As shown in FIG. 22D, B, the housing chamber 752 may be formed so as to extend across the surface pad 726, the middle pad 725, and the pad body 720.

Figure 23A:
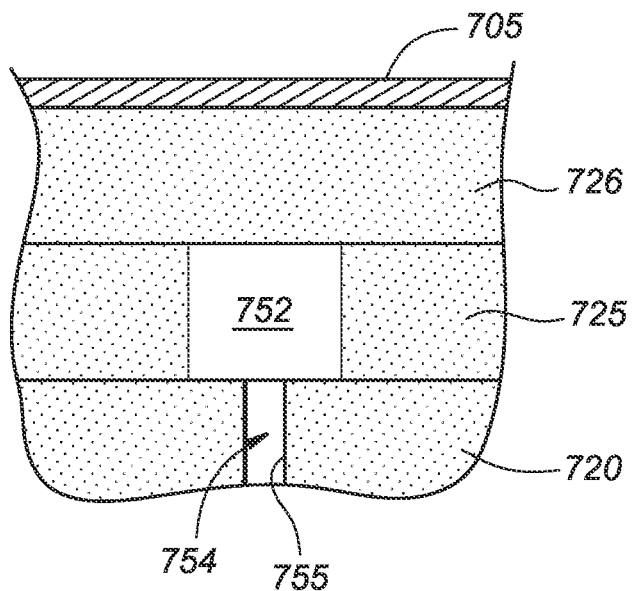
FIGS. 23A and 23B are cross-sectional views of the pad member showing fourth and fifth examples of the vibrating device chamber, respectively.
Figure 23B:
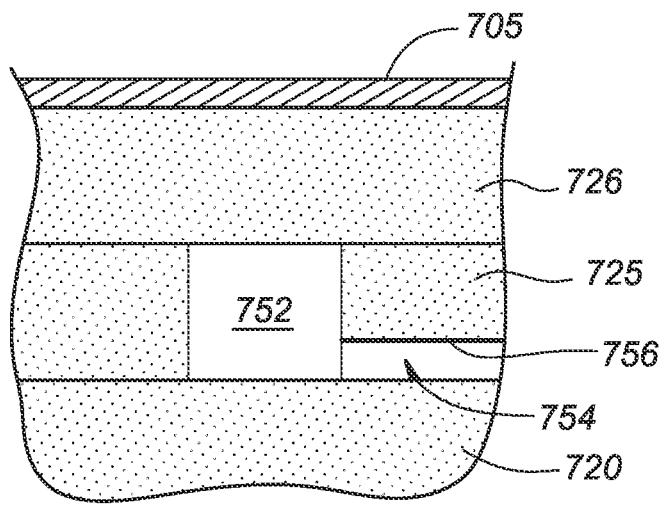

As shown in FIG. 23A, the housing chamber 752 for accommodating a vibrating device 702 may be provided with a harness housing part 754 for accommodating a harness line for supplying power to the vibrating device 702. When a recess 750 is provided in the middle pad 725, in order to form the harness housing part 754, a through hole 755 for harness is defined in and through the pad body 720 so as to communicate with the housing chamber 752. As shown in FIG. 23B, a harness groove 756 for harness may be formed on the pad-body-side surface of the middle pad 725 so that the harness groove 756 and the pad body 720 define a harness housing part 754. In other embodiments, a harness groove 756 may be formed on the cover-pad-side surface of the middle pad 725 so that the harness groove 756 and the surface pad 726 define a harness housing part 754.

In the above embodiments, when the vibrating device 702 is installed in the pad member 704, the vibrating device 702 is accommodated in the recess 750 formed in the pad member; that is, the vibrating device 702 is embedded or inserted into the pad member 704. However, the installation of the vibrating device 702 in the pad member 704 is not limited to this. For example, a mounting part may be provided on a member for securing the skin material 705, such as a hanging wire or clip base so that a vibrating device 702 can be secured to the mounting part. In this case, the mounting part for the vibrating device 702 is secured to a member for fixing the skin material 705 (such as a wire embedded in a pad, or a base for fixing the skin material with a clip; also called "skin fixing part"), which enables the vibrating device 702 to be firmly fixed to the pad member 704. In this configuration, vibration generated by the vibrating device 702 is transmitted to the member fixing the skin material 705, thereby facilitating the transmission of vibration to a passenger.

FIG. 24A shows an example in which a vibrating device 702 is secured to a wire 770, which is the member for fixing the skin material 705. The wire 770 for securing the skin material 705 is accommodated in a groove 774 formed in a surface of the pad member 772.

As shown in FIG. 24B, the groove is defined to form an H-shape on the surface of pad member 704 of the seat cushion. The groove has a pair of left and right longitudinal sections 776 extending in the front-rear direction and a transverse section 778 extending in the left-right direction and connecting the longitudinal sections. Similarly, in the seat back, a groove has a pair of vertical sections (not shown) extending in the vertical direction and a horizontal section (not shown) extending in the left-right direction to connect the vertical sections.

Each of the wires 770 accommodated in the longitudinal section 776 has attachments 782 as a mounting part 780. As shown in FIG. 25B, the attachment 782 has a latch 790 to be latched onto the wire 770 and a vibrating device fixture 792. The vibrating device fixture 792 is box-shaped and opens toward the seating surface. Provided at the opening of the vibrating device fixture 792 are claw portions 794 configured to engage the vibrating device 702 to fix it. The claw portions 794 engage the seating side surface of the vibrating device 702 to secure the vibrating device 702 to the attachment 782. In this way, the vibrating device 702 can be attached to the pad member 704 using a wire 770.

The vibrating device 702 fixed to the pad member 704 transmits vibration to a seated person to convey information. The vehicle is also provided with a device for generating sound to transmit information (such as a speaker). In this way, a vehicle needs to include respective devices for generating vibration and sound. In some cases, a vehicle may be provided with an actuator such as a voice coil motor configured to generate a composite wave containing sound and vibration to thereby output vibration and sound at the same time. The actuator preferably generates a composite wave containing a combination of both a low frequency component that can be sensed by a human's tactile sense; that is, sensed as vibration and a high frequency component that is transmitted to humans as sound. In some cases, the actuator may alternately generate vibration of a low frequency component and vibration of a high frequency component. In this case, the actuator provides intermittent vibration output and intermittent sound output.

Thus, this configuration, in which one actuator is used to generate both vibration and sound, can simultaneously transmit information to a seated person through tactile (vibration) and auditory (sound) senses. Since one device (actuator) generate both vibration and sound, this configuration can reduce costs and improve layout and increase layout flexibility compared to those using two devices for generating vibration and sound, respectively. In addition, since vibration and sound are generated simultaneously from a single device (actuator), this configuration makes it easier for a seated person to notice vibration and sound.

<Information Transmission System>

Some vehicles are equipped with an information transmission system that transmits various types of information by using a device for generating sound or emitting light. However, even when such device is used, information is not always accurately transmitted to a seated person depending on the posture or condition of the seated person.

Figure 25A:
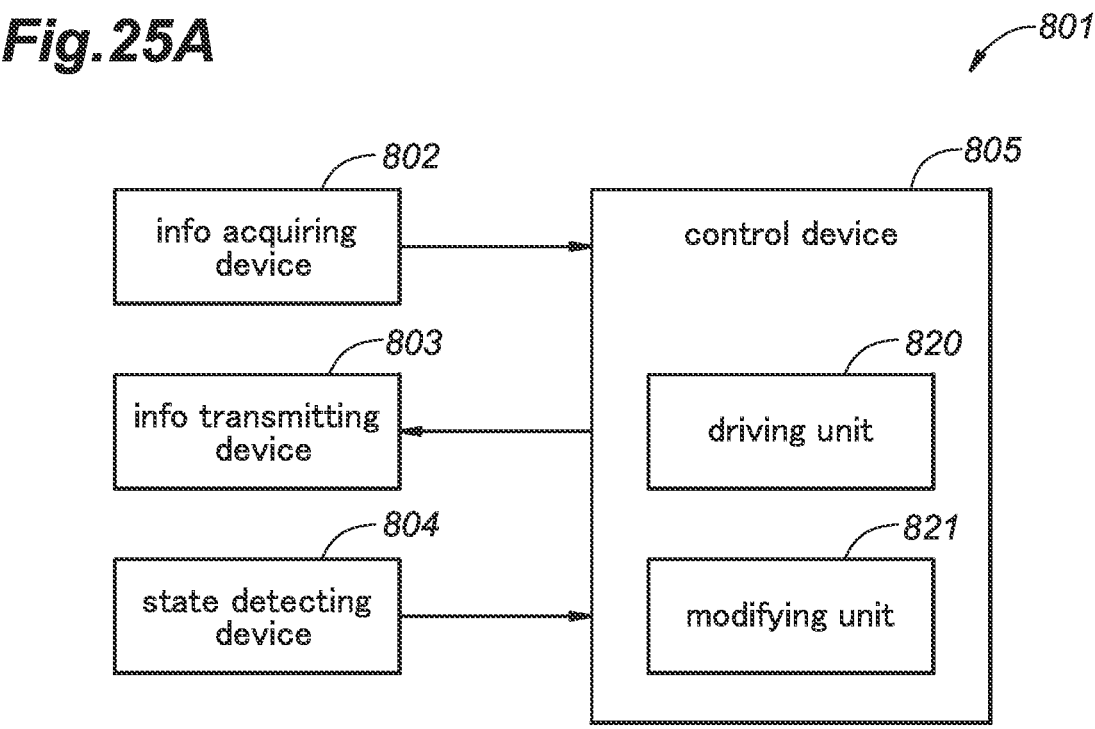
FIG. 25A is a block diagram of an information transmission system and FIG. 25B is a configuration diagram of a control device.
Figure 25B:
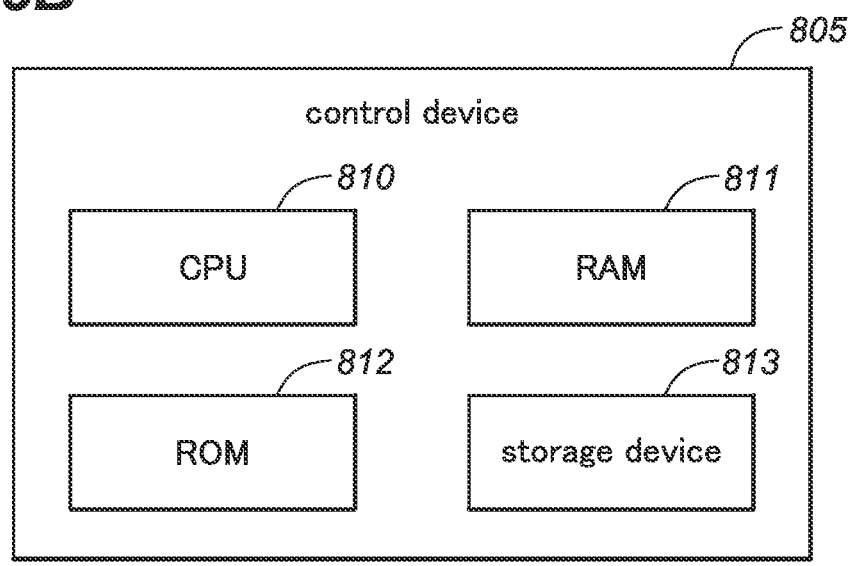

As shown in FIG. 25A, the information transmission system 801 may include: an information acquiring device 802 configured to acquire information on the surrounding environment of a vehicle; an information transmitting device 803 (hereafter also called "information transmitting device 803") configured to receive information on the surrounding environment from the information acquiring device 802 and transmit the received information to a seated person; a state detecting device 804 configured to detects states of the vehicle including the state of the interior; and a control device 805 configured to control the operation state of the information transmitting device 803 based on the result of detection by the state detecting device 804.

As shown in FIG. 25B, the control device 805 is comprised primarily of a microcomputer including a central processing unit 810 (CPU), a RAM 811, a ROM 812, and a storage device 813 such as SSD or HDD. The control device 805 includes: a driving unit 820 (driving means) configured to drive the information transmitting device 803 based on information acquired by the information acquiring device 802; and a modifying unit 821 (modifying means) configured to modify the driving of the driving unit 820 when the state detecting device 804 detects a change in the detection result. The driving unit 820 and modifying unit 821 may be implemented by the control device 805 executing respective prescribed software programs.

The information acquiring device 802 acquires information on road curvatures, diverging points, and irregularities, information on driving routes to a destination, and distance information including distances from surrounding vehicles and obstacles, The information acquiring device 802 may be implemented as a car navigation system. The information acquiring device 802 may be implemented by various sensors installed in the vehicle, such as road surface sensors, radar, lidar, and sonar. The car navigation device may comprise a combination of various sensors.

The state detecting device 804 detects the state of each passenger in the vehicle interior and the driving state of a vehicle. The state detecting device 804 is preferably capable of detecting the presence of a seated person(s) in each seat, the type of each seated person (such as child, elderly, or out of shape), each seated person's arousal level, heartbeat, pulse wave, body temperature, body pressure, and other biometric information, as well as a seated person's working state (such as during work, or reading). In some cases, the state detecting device 804 may be implemented by some sensors for each seat, an interior camera, a device such as an operating switch device, or any combination thereof.

The state detecting device 804 may be configured to acquire the level of automatic operation of a vehicle as the state of the vehicle. Specifically, the state detecting device 804 may detect whether a vehicle is in a manual driving mode, in which the driver operates the vehicle, or in an automatic driving mode, in which the vehicle drives autonomously.

In some cases, a seat in a vehicle is rotatably supported by the floor with a vertical axis in the vehicle interior. In such cases, the state detecting device 804 may include a rotation angle sensor to detect the rotation angle of each seat. The state detecting device 804 may include a reclining angle sensor configured to detect the reclining angle of each seat, and a position sensor configured to detect the position or amount of movement of a seat in the front-rear direction. The state detecting device 804 is capable of estimating the state of a passenger (e.g., being in a relax mode) and the level of automatic operation of the vehicle based on the respective results of detection by the rotation angle sensor, the reclining angle sensor, and the position sensor.

The information transmitting device 803 may be comprised primarily of a vibrating unit for transmitting information by vibration, a speaker for transmitting information by sound (air vibration), or a combination thereof. The vibrating unit is preferably provided in each seat, and in one example, the vibrating unit is a device (such as eccentric motor) configured to vibrate the seating surface of a seat cushion or a seat back to thereby transmit information to a seated person When the state detecting device 804 detects that the vehicle is in the manual driving mode, the control device 805 (driving unit 820) controls the information transmitting device 803 to selectively transmit information on the surrounding environment only to a specific passenger (in this case, the state of the driving unit 820 is described as a specific transmission mode). In such a case, the control device 805 (driving unit 820) may drive only the speaker or vibrating unit installed in the seat where the specific passenger is seated, or may drive only the speaker installed in the door on the side of the seat where the specific passenger is seated. The control device 805 may drive only the speaker installed in the side door on one side of the seat where the specific passenger is seated. In other cases, the control device 805 may selectively or cooperatively drive a speaker and a vibration unit installed in a seat, and a speaker installed in the door near the seat. In this case, the control device 805 may increase the volume of sound output from the speaker and the level of vibration output from the vibrating unit for a specific seated person, compared to those from speakers and vibrating units for the other seated persons. Specifically, when the control device 805 (driving unit 820) is in the manual driving mode, the control device 805 may activate at least one of a vibrating unit and a speaker installed in the driver's seat so as to provide environment information only to the driver. As used herein, speakers and a vibrating unit represented by the expression "a speaker or a vibrating unit and a speaker for a specific seated person (passenger)" include one or more speakers and a vibrating unit installed in a seat where a specific passenger is sated, and also include a speaker(s) installed in a door located near and on one side of the specific passenger's seat.

When the state detecting device 804 detects that the vehicle is in the automatic driving mode, the control device 805 (driving unit 820) controls the information transmitting device 803 to widely transmit information on the surrounding environment to the passengers in the vehicle interior. (The state of the driving unit 820 at this point is referred to as "overall transmission mode" herein.) For example, when the vehicle is in the automatic driving mode, the control device 805 may drive either the vibrating unit or the speaker in each seat on which a seated person is seated, in order to widely transmit the surrounding information to all the seated persons in the vehicle interior.

When the driving mode of the vehicle detected by the state detecting device 804 is switched from the manual driving mode to the automatic driving mode, the modifying unit 821 may change the operating state of the driving unit 820 from the specific transmission mode to the overall transmission mode. When the driving mode detected by the state detecting device 804 is switched from the manual driving mode to the automatic driving mode, the modifying unit 821 may change the operating state of the driving unit 820 from the specific transmission mode to overall transmission mode.

The surrounding environment information may include information particularly useful to the driver (such as information on road curvatures, diverging points, and irregularities, information on driving routes to a destination, and distance information including distances from surrounding vehicles and obstacles). In some cases, when the control device 805 drives the information transmitting device 803 to transmit information preferentially to the driver, the control device 805 may drive only the speakers and the vibrating unit installed in the driver's seat and the door on a side of the driver's seat, and may increase the volume of sound output from the speakers and the level of vibration output from the vibrating unit for the driver's seat, compared to those from speakers and vibrating units for the other seats.

The modifying unit 821 may change the state of the driving unit 820 based on the type of surrounding environment information acquired by the information acquiring device 802. In one example, when the information acquired as the surrounding environment information is particularly useful to the driver, the modifying unit 821 may change the state of driving unit 820 from the overall transmission mode to the specific transmission mode, in which information is transmitted only to the driver.

In some embodiments, the control device 805 may select a specific passenger to whom information needs to be transmitted, based on the state of the passenger acquired by the state detecting device 804, and control the information transmitting device 803 so as to selectively transmit the information to the specific passenger. More specifically, when the type of the passenger acquired by the state detecting device 804 includes a specific type for which a seated person requires monitoring (such as child, elderly person, or person out of shape), the control device 805 may detect a monitoring passenger; that is, a passenger who needs to monitor the specific type passenger, and control the information transmitting device 803 so as to transmit the surrounding environment information to the monitoring passenger. In such a case, the control device 805 may drive only the speaker or vibrating unit installed in the monitor's seat (that is, a seat on which the monitoring passenger is seated) and the speaker installed in the door on the side of the monitor's seat, or may increase the volume of sound output from the speakers and the level of vibration output from the vibrating unit for the monitor's seat, compared to those from speakers and vibrating units for the other seats.

In other embodiments, when the state detecting device 804 detects the working state of a passenger which satisfies any of predetermined conditions (such as the passenger is learning, reading, or being in other states in which the passenger can easily miss the audio information.), the control device 805 may control the information transmitting device 803 so that the surrounding environment information is more effectively transmitted to the passenger, for example, by increasing the volume of sound output from the speakers for the seat of the passenger or the level of vibration output from the vibrating unit in the sea.

In other embodiments, when detecting an abnormality occurred in a passenger based on biometric information on passengers' arousal level, heartbeat, pulse wave, body temperature, body pressure, and other condition acquired by the state detecting device 804, the control device 805 may determine a particular seat on which the passenger with the detected abnormality is seated, and restrict (prohibit) the outputs from the speakers and the vibrating unit in the particular seat or in the door near the particular seat, or may stop modifying the level of the outputs (limit the operation of the modifying unit 821).

<Vehicle>

There are systems for providing ridesharing services by matching drivers with prospective passengers (hereafter called "ridesharing systems"). In such a ridesharing system, as users who do not know each other can share one vehicle interior as passengers, there is a need for a solution to the task of effectively ensuring privacy of each passenger.

As shown in FIG. 26A, one solution is to provide a vehicle 904 comprising rows 903 of seats 902 arranged side by side along the left-right direction in a vehicle interior 901, each row including seats located along the front-rear direction. The vehicle interior 901 may be provided with front and rear partition walls 905 extending in the front-rear direction between two sets 903 of a front seat and a rear seat located in a row along the front-rear direction. As the partition walls divide the vehicle interior 901 into two private rooms 906A on the left and right sides, this configuration can ensure privacy in a more efficient manner than when such front and rear partition walls 905 are not provided. In this configuration, the seats 902 may be supported on the floor 907 via rails 902L, respectively, to be movable along the front-rear direction. Each of the seats 902 may be rotatable about an axis A extending in the vertical direction. This feature allows passengers to change in the direction of the respective seats. For example, two seats 902 located in a row along the front-rear direction can be rotated so that respective seated persons can face to each other, or two seats located in a row along the left-right direction can be rotated so that respective seated persons can face to each other.

The front and rear partition walls 905 may be movable along the front-rear direction, and more preferably, can be moved until both the front and rear partition wall 905 are no longer present between two front seats or two rear seats. As shown in FIG. 26B, the front and rear partition walls 905 may be retractable along the front-rear direction, preferably, can be retracted until both the front and rear partition walls 905 are no longer present between two front seats or between two rear seats located in a row along the front-rear direction.

The front and rear partition walls 905 may be moved or contracted depending on the automatic driving level of the vehicle 904 (automatic driving mode or manual driving mode). For example, when the vehicle 904 is in the automatic driving mode, the front and rear partition walls 905 may extend until the front and rear partition walls 905 are located between two front seats or between two rear seats located in a row along the left-right direction. When the vehicle 904 is in the manual driving mode, the front and rear partition walls 905 may be contracted until both the front and rear partition wall 905 are no longer present between two front seats or between two rear seats located in a row along the left-right direction. In addition, when the vehicle 904 is in the manual driving mode, the front and rear partition walls 905 may be contracted until both the front and rear partition wall 905 are no longer present between the driver's seat and the side passenger's seat (left and right front seats 902).

In other embodiments, as shown in FIG. 27A, a vehicle 904 comprises front and rear rows 908 of seats 902 arranged side by side along the front-rear direction in the vehicle interior 901, each row including two seats located along the left-right direction. The vehicle interior 901 may be provided with left and right partition walls 909 extending in the left-right direction between the front and rear rows 908 of seats. As the partition walls divide the vehicle interior 901 into two private rooms 906B on the front and rear sides, this configuration can ensure privacy in a more efficient manner than when such left and right partition walls 909 are not provided. In this configuration, the seats 902 may be supported on the floor 907 via rails 902L, respectively, to be movable along the front-rear direction. Each of the seats 902 may be rotatable about an axis A extending in the vertical direction. This feature allows passengers to change in the direction of the respective seats. For example, two seats 902 located in a row along the front-rear direction can be rotated so that respective seated persons can face to each other, or two seats located in a row along the left-right direction can be rotated so that respective seated persons can face to each other.

The left and right partition walls 909 may be movable along the left-right direction, and more preferably, can be moved until both the left and right partition wall 909 are no longer present between a front seat and a rear seat located in a row along the front-rear direction. As shown in FIG. 27B, the left and right partition walls 909 may be retractable along the left-right direction, preferably, can be retracted until both the left and right partition walls 909 are no longer present between a front seat and a rear seat located in a row along the front-rear direction. This feature allows passengers to change in the direction of the respective seats. For example, two seats 902 located in a row along the front-rear direction can be rotated so that respective seated persons can face to each other, or two seats located in a row along the left-right direction can be rotated so that respective seated persons can face to each other.

In this embodiment, each of the left and right partition walls 909 may have a table 910 protruding in the front-rear direction from a corresponding one of the front and rear surfaces thereof.

In other embodiments, as shown in FIG. 28A, a vehicle 904 comprises four seats 902 arranged in an array such that two pairs of a front seat and a rear seat are located along the front-rear direction. The vehicle interior 901 may be provided with front and rear partition walls 905 extending in the front-rear direction between two sets of a front seat and a rear seat located in a row along the front-rear direction, and left and right partition walls 909 extending in the left-right direction between the front and rear rows of seats 902. The front and rear partition walls 905 and the left and right partition walls 909 divide the vehicle interior 901 into four private rooms 906C located in an array. One seat 902 is provided in each private room 906C. Each seat may be supported by rails 902L of the floor 907 and movable along the front-rear direction. In addition, each of the seats 902 may be rotatable about an axis A extending in the vertical direction. This feature allows passengers to change in the direction of the respective seats. For example, two seats 902 located in a row along the front-rear direction can be rotated so that respective seated persons can face to each other, or two seats located in a row along the left-right direction can be rotated so that respective seated persons can face to each other.

Preferably, the front and rear partition walls 905 can be moved or retracted along the front-rear direction until both the front and rear partition walls 905 are no longer present between two front seats or two rear seats. Preferably, as shown in FIG. 28B, the left and right partition walls 909 can be moved or retracted along the left-right direction until both the left and right partition walls 909 are no longer present between a front seat and a rear seat located in a row along the front-rear direction. In this configuration, any combination of two or more private rooms 906c can be connected, enabling the vehicle interior 901 to be partitioned more freely.

As shown in FIG. 28A, a table 910 may be provided at a location where the front and rear partition walls 905 and the left and right partition walls 909 are connected, respectively, such that the table 910 horizontally extends out in the front, rear, left, and right directions; that is, projecting towards all the private rooms. The table 910 so configured has greater stability than any table 910 which is coupled only to the front and rear partition walls 905 or to the e left and right partition walls 909. Each private room 906C may be provided with a storage container 911 for containing objects. In one example, the storage container 911 has box-shape and opens upward. The storage container 911 may be placed on the floor 907. The storage container 911 may be provided on any of the front and rear partition walls 905 and the left and right partition walls 909.

The front and rear partition walls 905 and the left and right partition walls 909 may be moved or retracted based on the automatic driving level (i.e., automatic driving mode or manual driving mode) of the vehicle 904. The front and rear partition walls 905 and the left and right partition walls 909 may also be moved or retracted based on the state of a passenger (e.g., a passenger is to sleep, or feeling sick.) or the state of a passengers behavior (e.g., a passenger is to work, read, or learn something), which enables other passengers to be notified of the state of the passenger.

In this way, In this configuration, the vehicle interior 901 is partitioned into two or more private rooms 906A, 906B, and 906C by using the front and rear partition walls 905 and the left and right partition walls 909, which can effectively ensure privacy of each passenger in the vehicle interior 901 and may prevent the transmission of infectious diseases among passengers.

<Armrest>

A passenger seat installed in a vehicle may be provided with armrests on which a seated person can place the passenger's arms. In some cases, such armrests are equipped with control switches such as a switch used for adjusting the reclining angle of the seat and a switch used for driving a seat heater.

As shown in FIGS. 29A and 29B, a passenger seat 940 may be equipped with armrests 942. In one embodiment, each of the left and right armrests 941 may be provided with a control switch 942. The control switches 942 may be provided on either or both sides of the respective armrests 941. Preferably, an operations switch is provided on the inner side (the seating surface side) of an armrest 94. As a result, when a passenger places the passenger's arm on the armrest 941 and places the passenger's palm on the upper surface of the armrest 941, the passenger's thumb can reach the control switch 942 on the inner side, which enables the passenger to easily perform an input operation to the control switch 942 while taking a seat in a natural posture with an arm placed on the armrest 941.

The control switch 942 may be provided on the outer side of an armrest 941. In this case, when a passenger places an arm on the armrest 941 and places the palm on the upper surface of the armrest 941, the passenger can operate the switch 942 with the passenger's index, middle or ring finger.

As shown in FIG. 29A, a control switch 942 may be provided on the top surface of an armrest 941. When the respective armrests 941 are provided on the left and right sides of a passenger, the left and right armrests 941 may be provided with respective control switches 942, such that the respective control switches 942 have different operated (subject) components or functions and are different types switches from each other. As shown in FIG. 29B, a control switch 942 may be provided on the underside of an armrest 941.

A control switch 942 provided on an armrest 941 may be a physical switch, a touch panel (such as capacitive touch panel or pressure-sensitive touch panel), or any other type of switch.

Figure 30A:
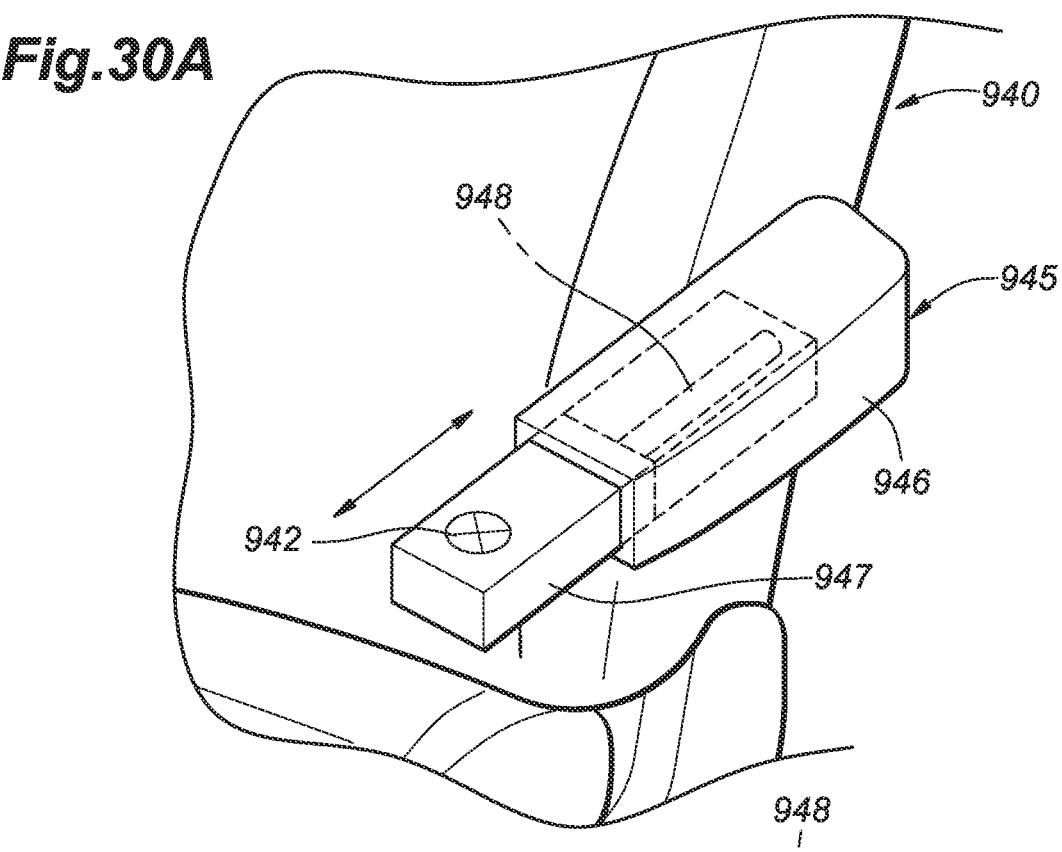
FIGS. 30A and 30B are perspective views of an armrest when a controller part is in a use position and a retracted position, respectively.
Figure 30B:
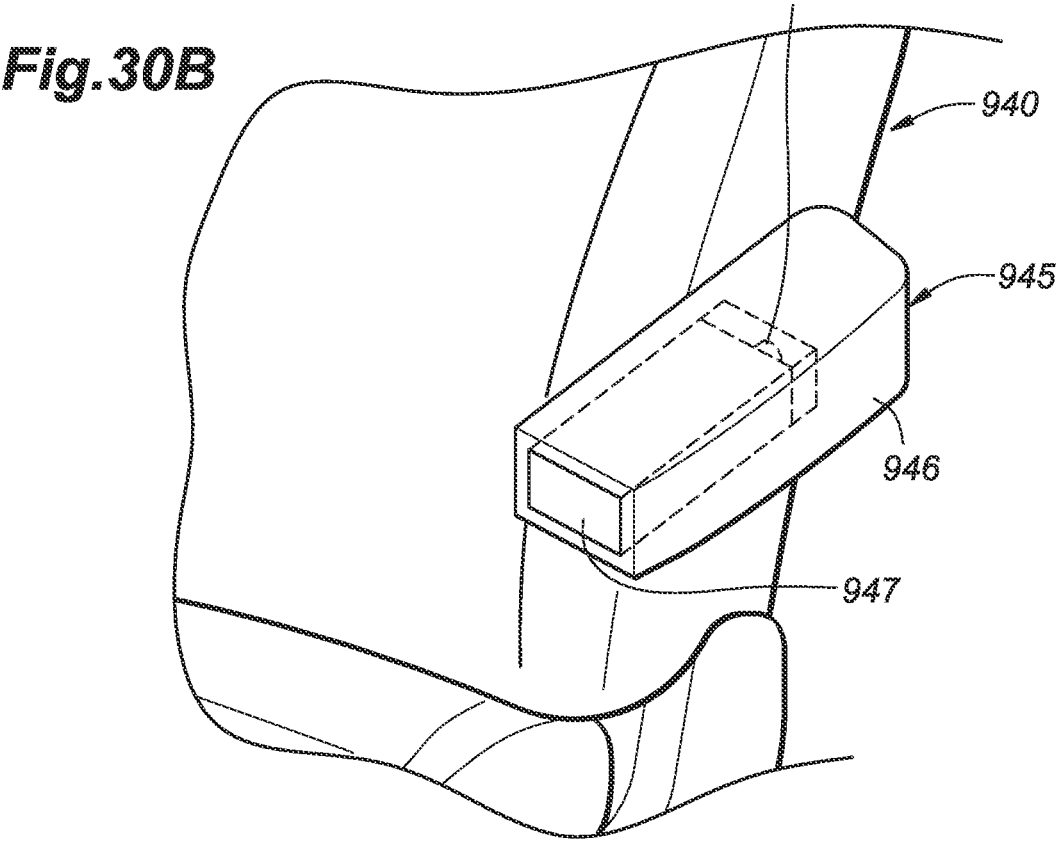

As shown in FIGS. 30A and 30B, an armrest 945 includes an armrest body 946 that extends in the front-rear direction forward and configured to support an arm of a seated person (i.e., an arm can be placed on the armrest body), and a controller part 947 having a control switch 942, and the controller part 947 may be displaceable between a use position (see FIG. 30A), in which a seated person can easily perform an input operation, and a retracted position (see FIG. 30B). This feature allows the controller part 947 to be retracted into the armrest body when no input operation is required The armrest body 946 may be coupled to any of the seat back 940A, the seat cushion 940B, and the headrest 940C (collectively referred to as the seat body). In some cases, the armrest body 946 may be coupled to and supported by the floor F (see FIG. 29A), a door interior structure (not shown).

The vehicle may be provided with a control device (not shown) used to switch the driving mode of the vehicle between the automatic driving mode, in which the vehicle travels autonomously, and the manual driving mode, in which the vehicle travels based on the driver's operation. In this case, the armrest 945 may be equipped with an actuator 948 configured to displace the controller part 947 based on a received signal from the control device (see, FIGS. 30A and 30B, for example). When the vehicle is in the manual driving mode, the control device drives the actuator 948 so as to be in the use position. When the vehicle is in the automatic driving mode, the control device may drive actuator 948 to set the controller part 947 in the retracted position.

The controller part 947 may be slidable rearward and frontward or leftward and rightward with respect to the armrest body 946. In this case, the controller part 947 may be slidably displaceable between the retracted position (see FIG. 30A, in which the controller part 947 is at least covered from above by the armrest body 946, and the use position (see FIG. 30B), in which the top surface of the controller part 947 is at least partially exposed.

The actuator 948 may comprise a device that can be extended and retracted in the front-rear direction (e.g., a linear actuator). The actuator 948 may be interposed between the controller part 947 and the armrest body 946 and telescopically movable to thereby displace the controller part 947 between the retracted position and the use position.

Figure 31C:
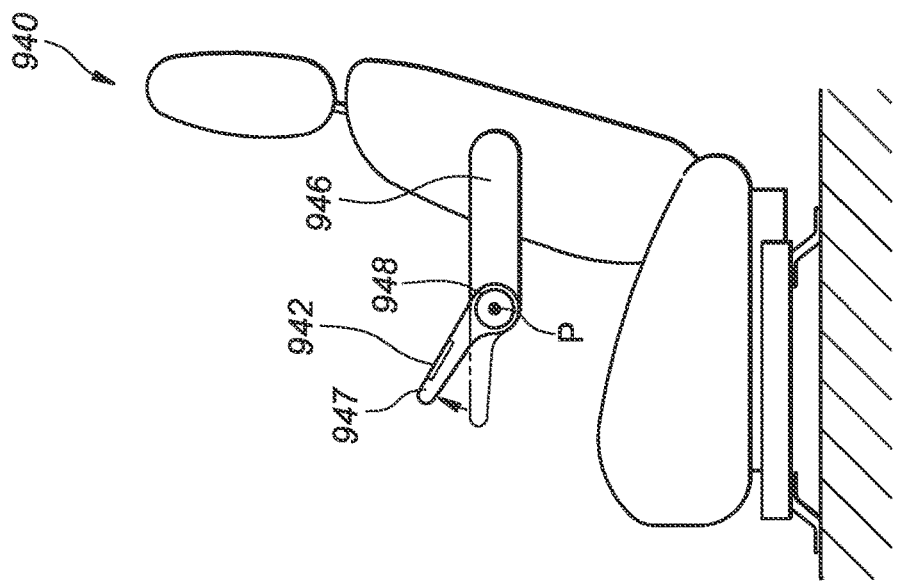
FIG. 31A to 31C are side views of a passenger seat provided with an armrest, the armrest comprising an armrest body and a controller part rotatably coupled to the armrest body, FIGS. 31A to 31C showing the controller part in a use position, a retracted position, and an inclined position (where the controller part is inclined upward relative to the armrest body), respectively.
Figure 31B:
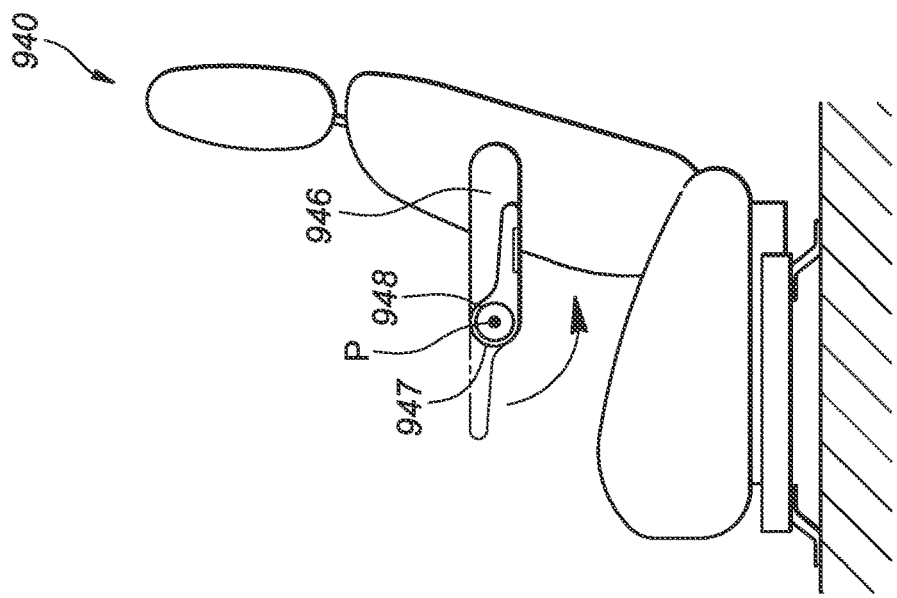
Figure 31A:
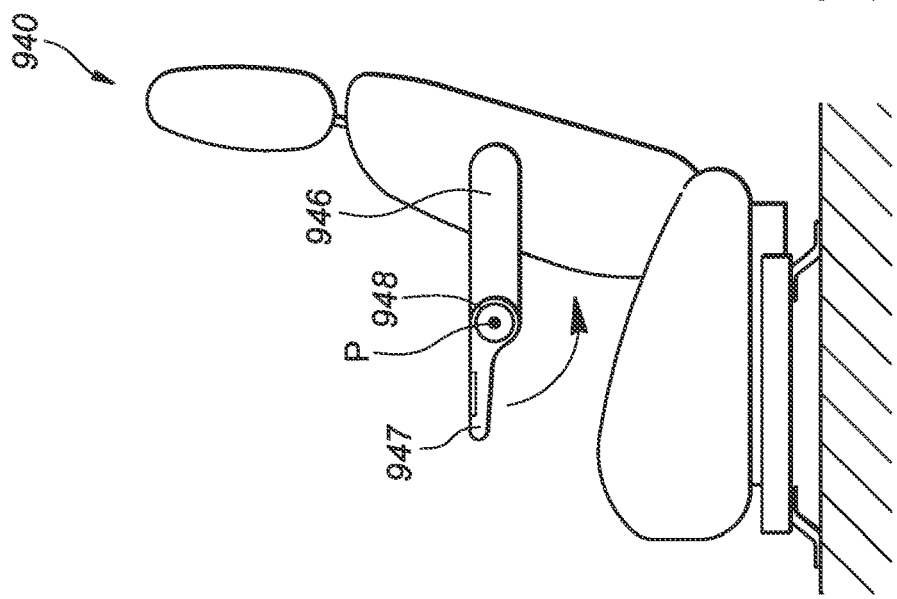

As shown in FIGS. 31A and 31B, the controller part 947 may be rotatably connected (hingedly connected) to the armrests body 946 to be rotatable (tiltable) about an axis P extending in the left-right direction, relative to the armrest body 946. In this case, controller part 947 may be comprised primarily of a plate-like member, and the controller part 947 may be configured to be displaceable between a retracted position, in which the controller part 947 is positioned below the armrest body 946, and a use position, in which the top surface of the controller part 947 is horizontally flush with that of the armrest body 946.

As shown in FIG. 31C, the controller part 947 may be rotatably connected to the armrest body 946 so that the controller part 947 can be rotated to extend diagonally frontward relative to the armrest body 946. In this case, the armrest 941 is provided with a locking mechanism so that a seated person can lock and unlock the controller part 947 rotated to at a predetermined rotational angle with respect to the armrest body 946.

In cases where the controller part 947 can be rotated to extend diagonally frontward relative to the armrest body 946 and a passenger seat is a driver's seat, when a seated driver is moving the arms in order to grasp or operate the steering wheel, the controller part 947 which is extending out diagonally frontward, may get in the way preventing the driver from extending the driver's elbows. Thus, the controller part 947 is preferably positioned in front of an elbow of a seated person with a standard body shape. This feature allows the driver to move the controller part 947 to the retracted position (e.g., FIGS. 31A and 31B) and to operate the steering wheel without any interference by the controller part 947. Moreover, the controller part 947 can be rotated to extend diagonally upward (e.g., FIG. 31C), allowing the driver to easily operate the control switch 942 as necessary.

In other embodiments, as shown in FIGS. 32A and 32B, a passenger seat 950 may be provided with a seating sensor 951 for detecting the presence of a seated person. In this case, the passenger seat 950 may include an actuator 953 for displacing an armrest 952, and a control device 954 for driving the actuator 953 based on the result of detection by the seating sensor 951; that is, whether or not a seated person is present. In some cases, when the armrest 952 is rotatably connected to the seat back 940A to be rotatable about an axis Q extending in the left-right direction, relative to the seat back 940A, the actuator 953 may be a motor or any other driving mechanism that can be used to rotate the armrest 952. The seating sensor 951 may be a pressure sensor for detecting a pressure applied from a seated person to the seating surface, or a membrane switch or any other switch that is provided along the seating surface so as to be switched on and off by a load applied from a seated person.

The control device 954 drives the actuator 953 to displace the armrest 952 between a use position (FIG. 32A) and a retracted position in which the armrest 952 is retracted (FIG. 32B), depending on the result of detection (i.e., whether a seated person is present or not) by the seating sensor 951. Specifically, when the seating sensor 95 detects the presence of a seated person, the control device 954 may drive the actuator 953 (motor) to rotate the armrest 952 to the use position in which the top surface of the armrest 952 is substantially horizontal. When the seating sensor 951 detects no seated person, the control device 954 may drive the actuator 953 (motor) to rotate the armrest 952, which is provided at a side of the seat back 940A, along the seat back 940A to the retracted position where the armrest 952 extends vertically.

Figure 33A:
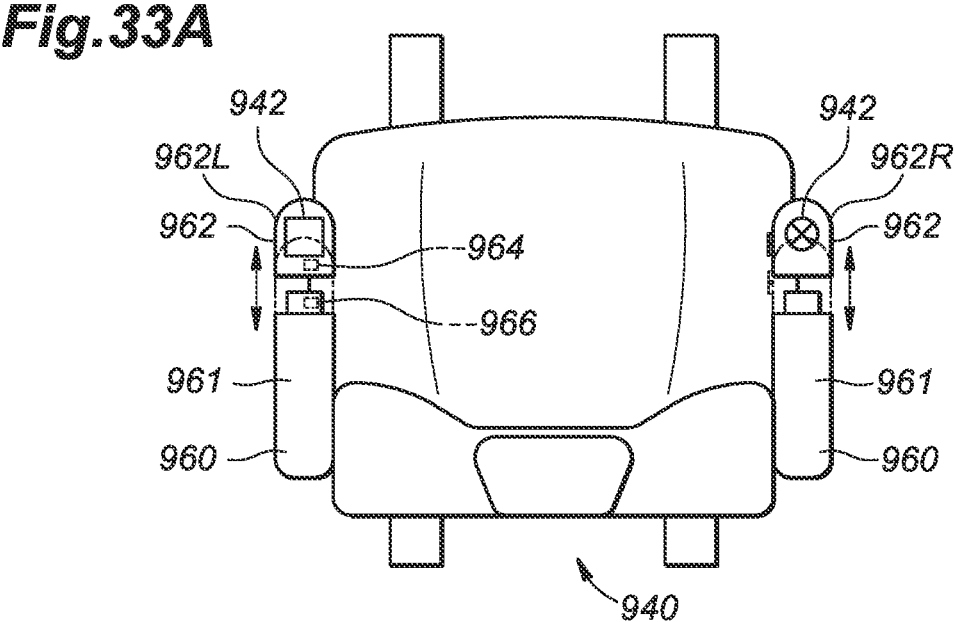
FIG. 33A is a top view of a passenger seat provided with armrests, each armrest comprising an armrest body and a controller part detachably coupled to the armrest body.

In one embodiment, as shown in FIG. 33A, which shows a seat with two armrests 960, each of the armrests 960 includes an armrest body 961 for supporting an arm of a seated person and a controller part 962L or 962R equipped with a control switch 942. Each controller part 962L or 962R may be detachable from a corresponding armrest body 961. In this configuration, when reclining the seat back 940A rearward to a certain angle, a seated person can take the controller parts 962L and/or 962R out of the armrest body 961 for operations. A controller part 962L or 962R may be a terminal device with a touch panel. Each controller part 962L or 962R may include a terminal device (such as a smartphone or tablet) as part of the controller part. A terminal device with a prescribed application installed thereon may function as a control switch 942.

Figure 33B:
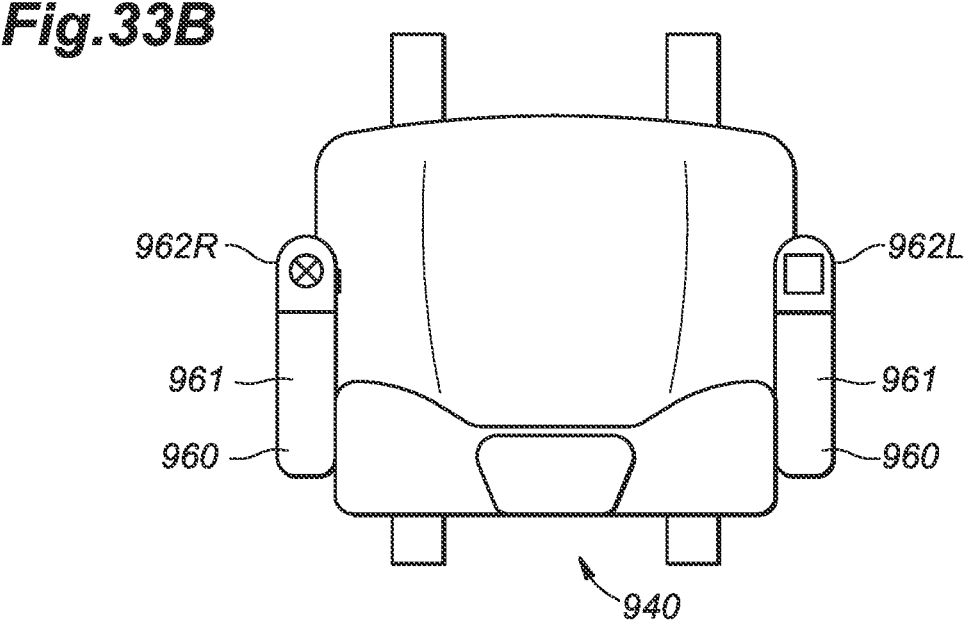
FIG. 33B is a top view of the passenger seat showing after the left and right controller parts are swapped.

The controller parts 962L and 262R on the left and right sides of the seat may be configured such that the controller parts 952L and 262R on the left and right side can be detachably mounted to or into the armrest bodies 961 on the right and left sides of the seat, respectively. This feature allows the controller parts 962L and 962R to be used interchangeably on the left and right sides, as shown in FIG. 33B.

Each of the controller parts 962L and 962R may be provided with a controller part connection sensor 964 configured to detect whether a controller part is connected to the armrest body 961. In this configuration, when a controller part connection sensor 964 detects that a controller part 962L (962R) is connected, the functions or controlled component(s) of the control switch 942 of the connected controller part 962L (962R) may become changeable. Each armrest body 961 may also be provided with an armrest body connection sensor 966 configured to detect whether either of the controller parts 962L and 962R is connected. In this configuration, when an armrest body connection sensor 966 detects that a controller part 962L (962R) is connected to a corresponding armrest body 961, the functions or controlled component(s) of the control switch 942 provided on the connected armrest body 961 become changeable.

For example, when a controller part 962L is attached to the left armrest body 961 (armrest body located on the left side), a control switch 942 provided on the inner side (right side) of the left armrest body 961 or the connected controller part 962L may be activated (i.e., b enabled to receive input operations). In other words, the controller parts 962L and 962R may function as keys for activating the respective control switch 942. In some cases, when a controller part 962L or 962R is connected to an armrest body 961, the functions or controlled component(s) of the control switch 942 of the connected controller part 962L or 962R may become changeable. In other cases, when a controller part 962L or 962R is connected to an armrest body 961, the control switch 942 that can receive input operations (i.e., the activated control switch) may be changed. (For example, the activated control switch is changed from an inner-side control switch 942 located on the inner side of the seat of the armrest 960 to an outer-side control switch 942 located on the outer side of the seat.

Figures 34A, 34B:
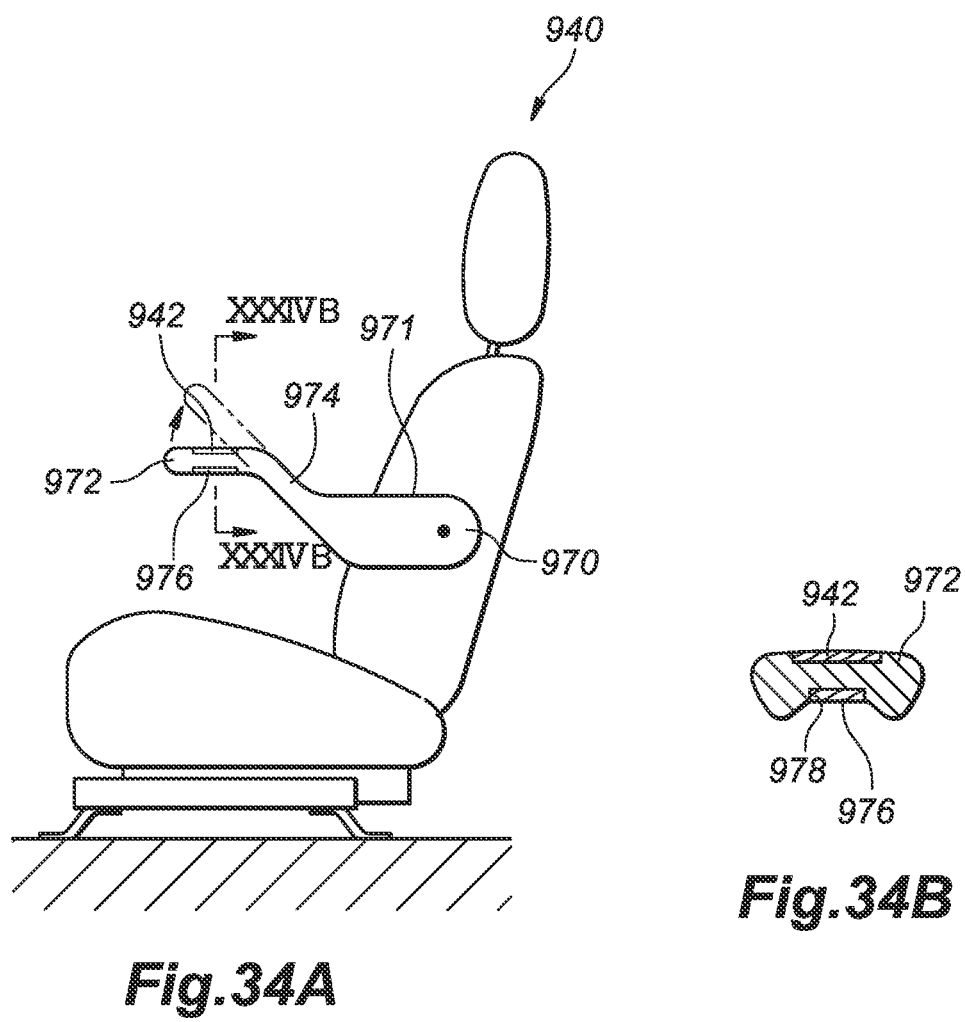
FIG. 34A is a side view of a vehicle seat provided with an armrest, the armrest comprising an armrest body, a controller part, and a connecting part connecting the armrest body and the controller part.
FIG. 34B is a cross-sectional view taken along Line XXXIVB-XXXIVB in FIG. 34A.

As shown in FIG. 34A, an armrest 970 includes an armrest body 971 for supporting a passenger's arm and a controller part 972 having a control switch 942. The armrest body 971 and the controller part 972 may be connected via a connection part 974 comprising an inclined portion extending frontward and upward. The connection part 974 may be connected to the front end of the armrest body 971, extend diagonally frontward, and be connected to the rear end of the controller part 972. The controller part 972 may be positioned so as to extend frontward from its rear end which is connected to the front end of connection part 974. In this configuration, the controller part 972 and the armrest body 971 are connected via the controller part 972 so that the controller part 972 is positioned higher relative to the armrest body 971, which allows a seated person to grip the controller part 972 with the seat passenger's elbow placed on the armrest body 971.

Preferably, the controller part 972 has such a vertical width that a seated person can easily grip the controller part 972. Specifically, the vertical width of the controller part 972 is preferably less than that of the armrest body 971. In some cases, the controller part 972 may be configured such that the connection part 974 is deformable such that the controller part 972 can be changed between two positions; that is, a retracted position (solid line in FIG. 34A), in which the top surface the controller part 972 is flush with the armrest body 971 and does not interfere with a seated person's driving operation, and a use position (dotted line in FIG. 34A), in which the armrest body 971 is moved upward to be inclined relative to the armrest body 971 and a seated person can easily perform input operations. (One example of such deformation of the connection part 974 involves bending the front and rear ends of the connection part 974 where the connection part 974 is connected to the controller part 972 and the armrest body 971, respectively.), The lower side (underside) of the controller part 972 may be provided with a touch sensor 976 configured to detect that a seated person touches a predetermined sensing area. The control switch 942 may be configured such that, when the touch sensor 976 detects a person's touch, the control switch 942 is enabled to receive input operations (i.e., activated).

The lower side (underside) of the controller part 972 may define an underside recess 978 recessed upward (inward) (also called a depression). In this case, the touch sensor 976 may be placed within the underside recess 978. In this configuration, the control switch 942 is not enabled to receive input operations unless a seated person touches the touch sensor 976 in the underside recess 978, which prevents the controller part 972 (the touch sensor 976) from receiving erroneous input operations thereto.

Figure 35A:
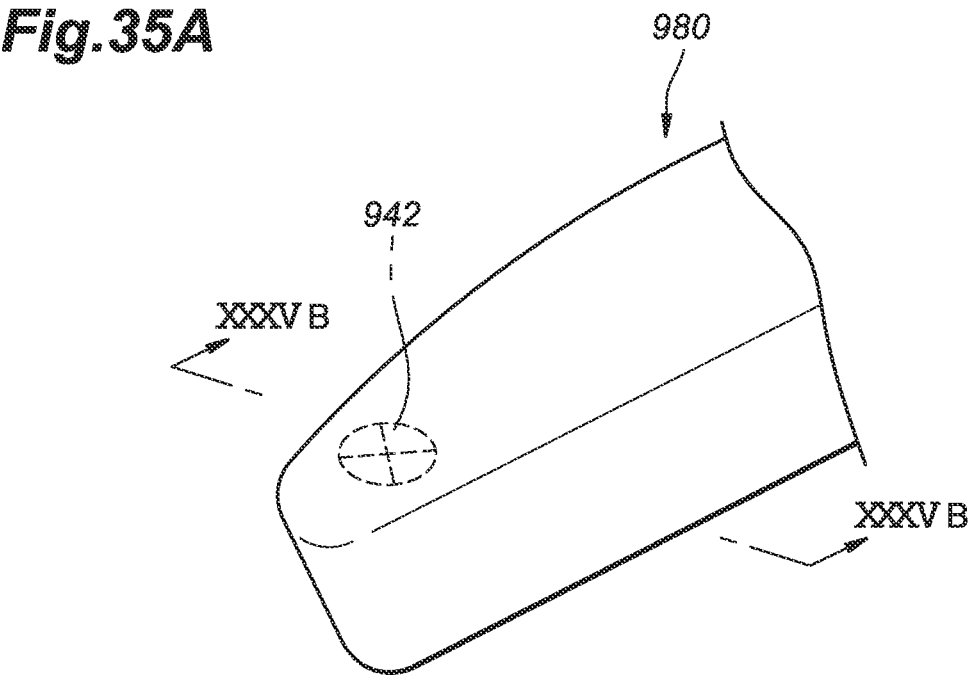
FIG. 35A is a perspective view of an armrest comprising a control switch covered with a skin material.

When the outer surface of an armrest 980 is at least partially covered by a sheet of a skin material 981, the control switch 942 may not be covered by the skin material 981 or may be covered by the skin material 981 (see FIG. 35A). When the control switch 942 is covered by the skin material 981, the outer surface of the skin material 981 preferably has a mark, symbol, or characters, (i.e., some visual indication) over the control switch 942 in order to indicate a location where the control switch 942 is located under the skin material.

Figure 35B:
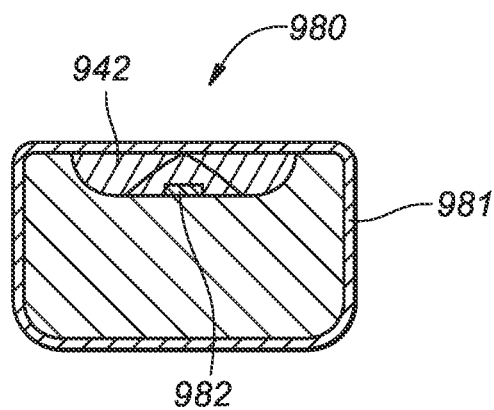
FIG. 35B is a cross-sectional view taken along Line XXXVB-XXXVB in FIG. 35A.

As shown in FIG. 35B, the control switch 942 may have a light emitting element 982, and the skin material 981 covering the control switch 942 may be configured to at least partially transparent to light emitted from the light emitting element 982. In this configuration, the light emitted from the light emitting element 982 can pass through the skin material 981, which enables a seated person to recognize the position of the control switch 942.

An armrest may be provided with an acceleration sensor. For example, the acceleration sensor may be connected to an information processing device that is configured to acquire and process voice uttered by a passenger. The information processing device may be, for example, a so-called AI assistant device that is activated by a voice uttered by a passenger and can provide voice output corresponding to the passenger's voice by using a trained machine learning model. When the acceleration sensor detects that a seated person hits, knocks, or rubs the armrest, the information processing device may perform a related operation, such as providing waking up. In this configuration, a seated person can activate the information processing device not only by issuing voice comments, but also by touching an armrest.

Figure 36:
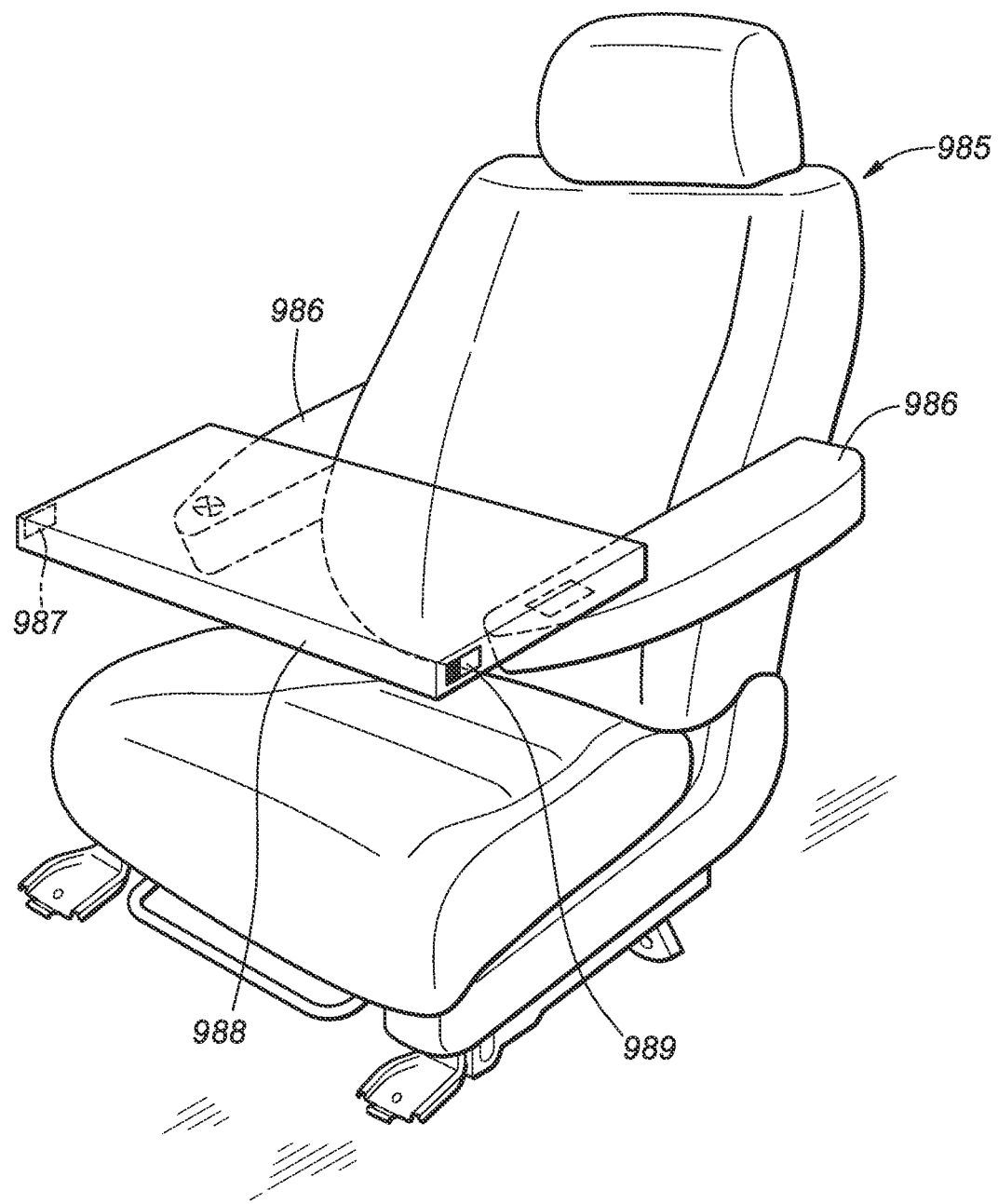
FIG. 36 is a perspective view of a vehicle seat equipped with a table.

As shown in FIG. 36, a vehicle seat 985 may include a plate-like table 988 that is connectable to an armrest 986 and is provided with a control switch 987. When a vehicle seat 985 is provided with a pair of left and right armrests 986, the table 988 may be connectable to one of the two armrests 986 or connectable to both. The table 988 may be non-separable from (i.e., integral with) the armrest 986, or may be separable (detachable) from the armrest 986. The table 988 may be coupled to a seat back, a seat cushion, or a headrest and may be capable of being accommodated therein. The table 988 may be provided with a control switch 987 at location on any of the upper surface, lower surface, left and right side surfaces, and front and rear surfaces of the table 988. Preferably, the table 988 can be provided (unfolded) on the top surface of an armrest so as to horizontally extend out, so that its two surfaces face upward and downward. In this case, the control switch 987 is preferably provided on either one of the left and right side surfaces of the table 988. As a result, even when the table 98 is provided on an armrest to thereby cover over the control switch 942 on the top surface of the armrest 986, a seated person can easily operate the control switch 987.

The control switch 942 on the table 988 may have the same operated (subject) component or function as the control switch 942 on the armrest 986, or may have different subject components or functions. The control switch 942 on the table may or may not have the same function as the control switch 942 on the armrest 986

Figure 37B:
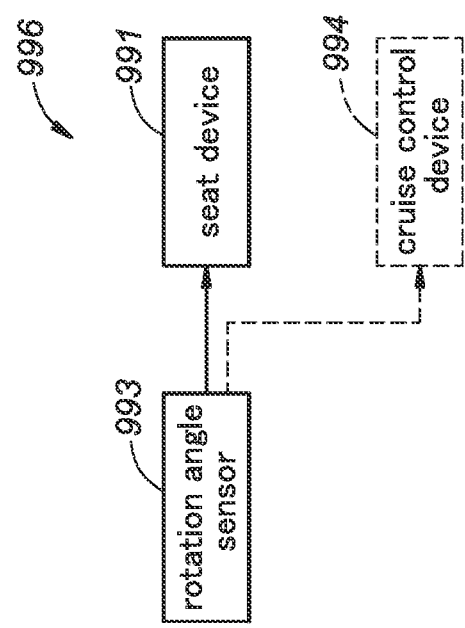
FIG. 37B is a functional block diagram of a manipulation input system for the armrest used as a manipulation input device.
Figure 37A:
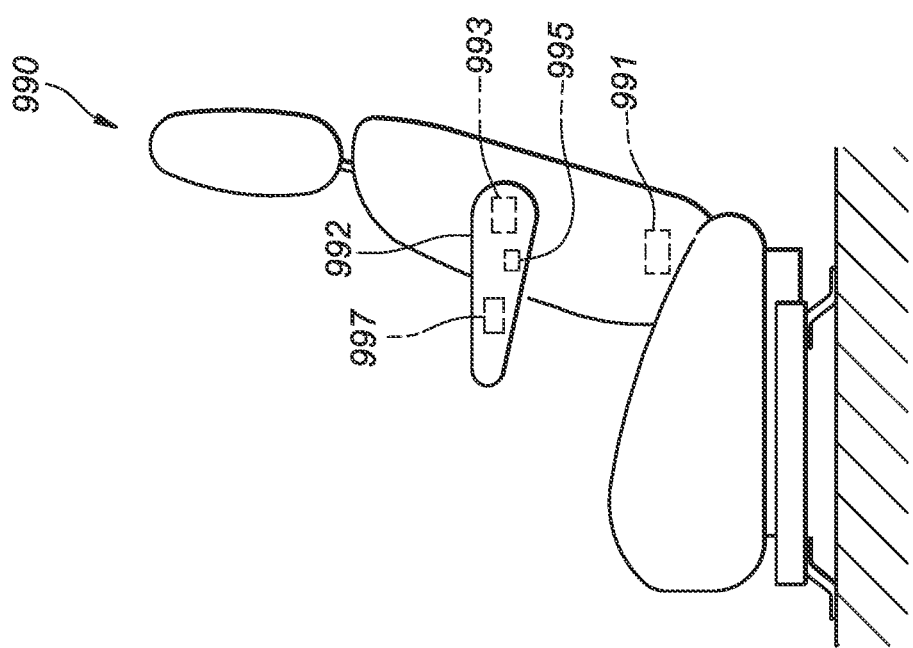
FIG. 37A is a side view of a vehicle seat provided with an armrest that is used as a manipulation input device.

As shown in FIGS. 37A and 37B, a passenger seat 990 is provided with a seat device 991 used to change the position and shape of the seat, an armrest 992 pivotably supported on the seat back or seat cushion, and a rotation angle sensor 993 configured to detect the rotation angle of the armrest 992. The seat device 991 may be configured to be driven by the seat device 991 based on an operational input to the armrest 992 detected by the rotation angle sensor 993.

The seat device 991 changes the position and shape of the seat according to the rotational direction and angle of the armrests 992 detected by the rotation angle sensor 993. The seat device 991 may be configured to move the seat back and forth and/or change the height of the seat surface, for example. The seat device 991 may be configured to change the reclining angle of the seat.

When the rotational direction of the armrest 992 detected by the rotation angle sensor 993 is associated with a lifting motion of the armrest 992, the seat device 991 may be configured to increase the reclining angle to tilt the seatback backward. When the rotational direction of the armrest 992 detected by the rotation angle sensor 993 is associated with a lifting motion of the armrest 992, the seat device 991 may be configured to adjust the height of the seat surface (height adjustment). When the passenger seat 990 is rotatably supported to be rotatable about an axis vertical to the floor, the seat device 991 may rotate the passenger seat 990 according to the rotational angle of the armrest 992 detected by the rotation angle sensor 993.

When a cruise control device 994 for vehicle's cruise control is provided in a vehicle, the cruise control device 994 may change the set speed of the vehicle according to the lifting and pushing down operation of an armrest 992 detected by the rotation angle sensor 993.

A vehicle capable of autonomous driving is provided with a cruise control device 994, which frequently or continuously updates the cruise plan to allow the vehicle to drive autonomously. In this case, when a passenger seat is provided with a pair of left and right armrests 992, the cruise control device 994 may set and change the cruise plan based on the rotations of the left and right armrests 992. For example, the cruise control device 994 may set and change the cruise plan to change lanes based on the direction to which the armrest 992 is operated. In other cases, the cruise control device 994 may set and change the cruise plan to overtake based on rotational operations on the left and right armrests 992.

A passenger seat 990 may be provided with a reaction force adjusting actuator 995 configured to adjust the reaction force to be applied to an armrest 992 when the armrest 992 is rotated. This feature allows for adjustment of the strength of the force (operating force) which a seated person needs to apply to the armrest 992.

In this way, the armrest(s) 992 can be used as a manipulation input device for controlling the driving of a vehicle to thereby build an operation system 996 including the armrest (s) 992 as a manipulation input device. When the left and right armrests 992 are used as manipulation input devices, the control achieved by manipulating the left armrest 992 may be different from that achieved by manipulating the right armrest 992.

When an armrest(s) 992 is used as a manipulation input device for cruise control of a vehicle, a vibrating device 997 may be provided on the armrest 992. The vibrating device 997 may be activated when the rotation angle sensor 993 detects a manipulation input to the armrest 992. This feature can notify a manipulator (driver) of the detection of the manipulation input by the rotation angle sensor 993 (i.e., provide feedback to the manipulator (driver) on the detection of the manipulation input).

Figure 38A:
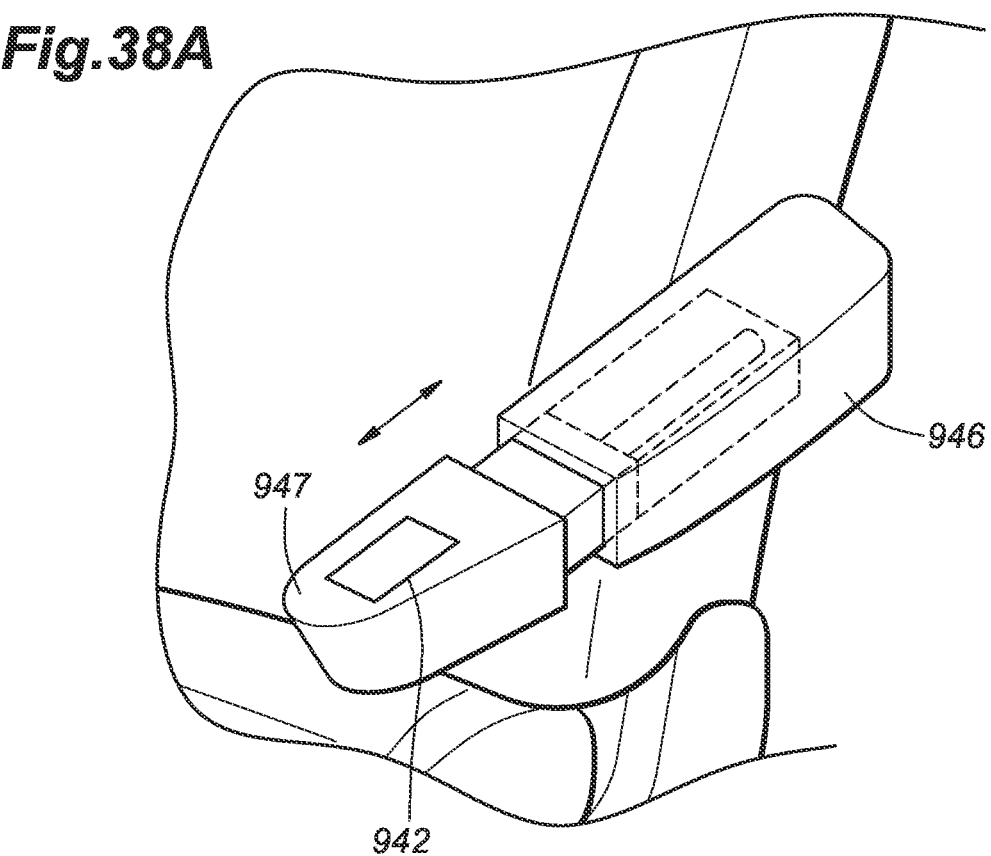
FIG. 38A is a diagram showing a variant of the armrest in which a connecting part connects the armrest body and the controller part.
Figure 38B:
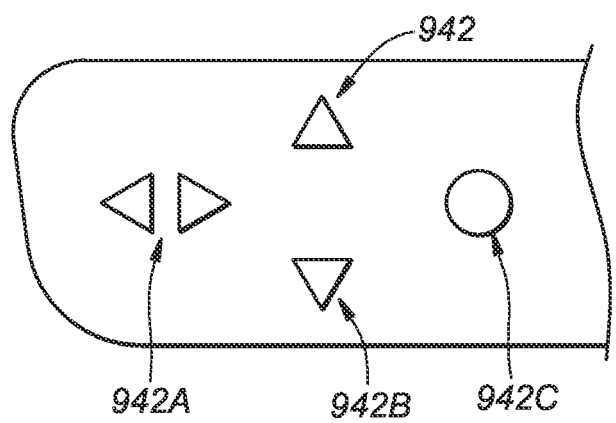
FIG. 38B is a diagram showing a variant of a set of control switches on an armrest.

FIG. 30B shows a configuration in which a controller part 947 is accommodated inside an armrest body 946, the configuration is not limited to this embodiment. For example, as shown in FIG. 38A, a controller part 947 may be slidably supported by an armrest body 946, enabling the controller part 947 to slide back and forth along the armrest body 946. This configuration allows a seated person to move the controller part 947 according to the person's body shape. FIG. 29A shows the forms of a control switch 942 including a circular switch e with four buttons on the front, rear, left and right sides (the control switch 942R on the upper surface of the armrest 941 on the right of a seated person), a touch panel (the control switch 942L on the upper surface of the armrest 941 on the left side of a seated person, but the configuration of a control switch is not limited to this. For example, as shown in FIG. 38B, a control switch 942 may include five buttons consisting of a front-back paired button 942A, a left-right paired button 942B, and a circular button 942C.

Specific embodiments of the present invention are described herein. However, those embodiments are non-limiting embodiments for illustrative purposes and various modifications may be made to the embodiments without departing from the scope of the present invention.

GLOSSARY 1 headrest (first embodiment)
4 seat back
15 device
16 pillar
17 core
19 skin material
21 device-side connector
22 guide rib (rib)

23 locked recess (locked part)
24 leg portion
30 cable
32 body-side connector
40 receiving recess
44 bottom wall
45 locking claw (locking part)
47 guide groove
48 through hole
57 cavity
71 headrest (second embodiment)
72 cable
72A conductor
72B insulator
85 cable
101 headrest (third embodiment)
102 receiving recess
104 lid
151 headrest (fourth embodiment)
154 ear part
201 headrest (fifth embodiment)
202 receiving recess
203 through hole
204 restriction wall
H headrest

The invention claimed is:

1. A headrest, comprising:
a box-shaped core having one or more receiving recesses that are recessed inward from an outer surface thereof;
one or more devices configured to be received in the respective receiving recesses; and
a pillar having a pair of leg portions at the lower end thereof,
wherein the core is composed of a box-shaped core front portion and a box-shaped core rear portion positioned behind the core front portion,
wherein the core front portion and the core rear portion are separate entities,
wherein both of the legs are retained in the core,
wherein the pillar includes extending portions extending frontward and upward at an angle from the upper ends of the corresponding leg portions, and
wherein the bottom surface of the receiving recesses is located forward both of the leg portions, and rearward both of the top edges of the extending portions.

2. The headrest as claimed in claim 1,
wherein each of the receiving recesses are located frontward of both of the leg portions, and the core rear portion is located rearward of both of the leg portions.

3. The headrest as claimed in claim 1, wherein each device is provided with protrusions protruding to be in contact with inner wall surfaces of a receiving recess when the device is accommodated therein.

4. The headrest as claimed in claim 1, wherein a restriction wall being configured to restrict forward movement of the corresponding device is provided at the front surface of the core.

5. The headrest as claimed in claim 1, wherein the devices are received in the respective receiving recesses to be capable of sliding forward and backward.

6. The headrest as claimed in claim 1, wherein each device is provided with a device-side connector at a rear end surface,
wherein a bottom wall of each receiving recess is provided with a body-side connector configured to be connectable to the device-side connector when the device is accommodated in the receiving recess, and
wherein either the device-side connector or the body-side connector is supported in a floatable manner so as to be displaceable in the left-right direction.

7. The headrest as claimed in claim 1, wherein the respective receiving recesses are provided on left and right outer sides of the core, respectively, and
wherein each receiving recess has a corresponding lid capable of covering an opening of the receiving recess, the lid being hingedly connected to the core at a location rearward of the corresponding receiving recess.

8. The headrest as claimed in claim 1, wherein the respective receiving recesses are provided on left and right outer sides of the core, respectively, and
wherein the left and right sides of the core are provided with respective ear parts protruding outward in the left and right directions, respectively, such that each ear part is rotatable around an axis extending in the left-right direction.

9. The headrest as claimed in claim 1, comprising a skin material covering the core and the devices, and one or more pad members located between the skin material and the core.

10. A vehicle seat, comprising the headrest claimed in claim 1.

11. The headrest as claimed in claim 1, wherein the receiving recesses are provided on the left and right of the front surface of the core front portion, one on each side, and
wherein the core front portion and the core rear portion define a cavity.

12. The headrest as claimed in claim 11, wherein a through hole leading to an interior of the cavity is provided on a bottom wall defining the receiving recesses.

13. The headrest as claimed in claim 1, wherein the core rear portion is provided with a rear side recess that is recessed rearward.

14. The headrest as claimed in claim 13, wherein a partition wall is provided at the center of the rear side recess in the left-right direction to separate the rear side recess into left and right parts.

15. The headrest as claimed in claim 13, wherein the rear side recess is provided with one or more connecting parts for connecting to the core front portion.

16. The headrest as claimed in claim 13, wherein a partition wall is provided at the center of the rear side recess in the left-right direction to separate the rear side recess into left and right parts,
wherein the rear side recess is provided with a plurality of connecting parts for connecting to the core front portion, and
wherein the connecting parts are arranged symmetrically with respect to the partition wall.

17. The headrest as claimed in claim 13, wherein one or more ribs are provided at a bottom surface of the rear side recess.

18. A headrest, comprising:
a box-shaped core having one or more receiving recesses which are recessed inward from an outer surface thereof; and
one or more devices configured to be received in the respective receiving recesses;
wherein the core is composed of a box-shaped core front portion and a box-shaped core rear portion positioned behind the core front portion,
wherein the core front portion and the core rear portion are separate entities,
wherein the core rear portion is provided with a rear side recess that is recessed rearward, wherein a partition wall is provided at the center of the rear side recess in the left-right direction to separate the rear side recess into left and right parts, wherein the rear side recess is provided with a plurality of connecting parts for connecting to the core front portion, and wherein the connecting parts are arranged symmetrically with respect to the partition wall.

19. A headrest, comprising:

a box-shaped core having one or more receiving recesses which are recessed inward from an outer surface thereof; and one or more devices configured to be received in the respective receiving recesses;

wherein the core is composed of a box-shaped core front portion and a box-shaped core rear portion positioned behind the core front portion, wherein the core front portion and the core rear portion are separate entities, wherein each device is provided with a device-side connector at a rear end surface, wherein a bottom wall of each receiving recess is provided with a body-side connector configured to be connectable to the device-side connector when the device is accommodated in the receiving recess, and wherein either the device-side connector or the body-side connector is supported in a floatable manner so as to be displaceable in the left-right direction.

* * * * *